United States Patent
Ko et al.

(10) Patent No.: US 12,108,376 B2
(45) Date of Patent: *Oct. 1, 2024

(54) WIRELESS COMMUNICATION METHOD AND WIRELESS COMMUNICATION TERMINAL IN BASIC SERVICE SET OVERLAPPING WITH ANOTHER BASIC SERVICE SET

(71) Applicant: WILUS INSTITUTE OF STANDARDS AND TECHNOLOGY INC., Gyeonggi-do (KR)

(72) Inventors: Geonjung Ko, Gyeonggi-do (KR); Juhyung Son, Gyeonggi-do (KR); Woojin Ahn, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/133,520

(22) Filed: Apr. 11, 2023

(65) Prior Publication Data
US 2023/0247610 A1 Aug. 3, 2023

Related U.S. Application Data

(63) Continuation of application No. 17/227,289, filed on Apr. 10, 2021, now Pat. No. 11,700,597, which is a
(Continued)

(30) Foreign Application Priority Data

| Mar. 4, 2016 | (KR) | 10-2016-0026684 |
| Mar. 12, 2016 | (KR) | 10-2016-0029975 |

(Continued)

(51) Int. Cl.
*H04W 72/0453* (2023.01)
*H04W 48/18* (2009.01)
(Continued)

(52) U.S. Cl.
CPC ....... *H04W 72/0453* (2013.01); *H04W 48/18* (2013.01); *H04W 74/002* (2013.01);
(Continued)

(58) Field of Classification Search
CPC ............. H04W 72/0453; H04W 48/18; H04W 74/002; H04W 24/02; H04W 84/12;
(Continued)

(56) References Cited

U.S. PATENT DOCUMENTS

| 8,483,741 B1 | 7/2013 | Hussain et al. |
| 9,936,537 B2 | 4/2018 | Kwon |

(Continued)

FOREIGN PATENT DOCUMENTS

| CN | 1777169 | 5/2006 |
| CN | 1894914 | 1/2007 |

(Continued)

OTHER PUBLICATIONS

International Search Report for PCT/KR2017/002407 mailed on Jul. 13, 2017 and its English translation from WIPO (now published as WO 2017/150954).

(Continued)

*Primary Examiner* — Kiet Tang
(74) *Attorney, Agent, or Firm* — Womble Bond Dickinson (US) LLP

(57) ABSTRACT

Provided is a wireless communication terminal that communicates wirelessly. The terminal includes: a transceiver; and a processor. The processor is configured to receive a frame through the transceiver, determine whether the frame is classified into an Intra-Basic Service Set (BSS) frame or
(Continued)

an Inter-BSS frame according to a BSS from which the frame is transmitted, and access a channel according to whether the frame is an Intra-BSS frame or an Inter-BSS frame.

18 Claims, 37 Drawing Sheets

Related U.S. Application Data continuation of application No. 16/121,546, filed on Sep. 4, 2018, now Pat. No. 11,129,163, which is a continuation of application No. PCT/KR2017/002407, filed on Mar. 6, 2017.

(30) Foreign Application Priority Data

| Apr. 11, 2016 | (KR) | 10-2016-0044465 |
| May 11, 2016 | (KR) | 10-2016-0057597 |
| Sep. 7, 2016 | (KR) | 10-2016-0114821 |

(51) Int. Cl.
| *H04W 74/00* | (2009.01) |
| *H04W 24/02* | (2009.01) |
| *H04W 84/12* | (2009.01) |
| *H04W 88/06* | (2009.01) |

(52) U.S. Cl.
CPC ............ *H04W 24/02* (2013.01); *H04W 84/12* (2013.01); *H04W 88/06* (2013.01)

(58) Field of Classification Search
CPC . H04W 88/06; H04W 12/08; H04W 52/0248; H04W 88/08; H04W 28/06; H04W 74/0825; H04W 74/0841; Y02D 30/70; H04L 5/0053; H04L 5/0078; H04L 27/2601; H04B 7/2612

See application file for complete search history.

(56) References Cited

U.S. PATENT DOCUMENTS

| 9,974,040 | B1 | 5/2018 | Chu et al. |
| 10,015,821 | B2 | 7/2018 | Oteri et al. |
| 10,045,340 | B1* | 8/2018 | Chu ................ H04W 74/0816 |
| 10,136,450 | B2 | 11/2018 | Lee et al. |
| 10,524,290 | B1 | 12/2019 | Chu et al. |
| 10,785,795 | B2 | 9/2020 | Son et al. |
| 10,863,502 | B1 | 12/2020 | Chu et al. |
| 11,122,495 | B2 | 9/2021 | Ko et al. |
| 11,122,496 | B2 | 9/2021 | Ko et al. |
| 2004/0166851 | A1 | 8/2004 | Backes et al. |
| 2004/0203688 | A1 | 10/2004 | Backes et al. |
| 2006/0085543 | A1 | 4/2006 | Hrastar et al. |
| 2007/0041334 | A1 | 2/2007 | Song et al. |
| 2007/0081477 | A1 | 4/2007 | Jakkahalli et al. |
| 2011/0255401 | A1 | 10/2011 | Seok |
| 2012/0157151 | A1 | 6/2012 | Chu et al. |
| 2012/0178407 | A1 | 7/2012 | Rudolf et al. |
| 2012/0314673 | A1 | 12/2012 | Noh et al. |
| 2012/0327838 | A1 | 12/2012 | Seok |
| 2012/0327870 | A1 | 12/2012 | Grandhi et al. |
| 2013/0121293 | A1 | 5/2013 | Surineni et al. |
| 2013/0148609 | A1 | 6/2013 | Ram et al. |
| 2013/0301553 | A1 | 11/2013 | Klein |
| 2014/0050210 | A1 | 2/2014 | Waters et al. |
| 2014/0362840 | A1 | 12/2014 | Wong et al. |
| 2015/0029977 | A1 | 1/2015 | Seok |
| 2015/0110093 | A1 | 4/2015 | Asterjadhi et al. |
| 2015/0124774 | A1 | 5/2015 | Kaushik et al. |
| 2015/0181620 | A1 | 6/2015 | Seok |
| 2015/0264617 | A1 | 9/2015 | Choudhury |
| 2015/0282043 | A1 | 10/2015 | Fang et al. |
| 2015/0341750 | A1 | 11/2015 | Hayes et al. |
| 2015/0359008 | A1 | 12/2015 | Wang et al. |
| 2016/0050691 | A1 | 2/2016 | Jauh et al. |
| 2016/0081132 | A1 | 3/2016 | Lee et al. |
| 2016/0088558 | A1 | 3/2016 | Chu et al. |
| 2016/0150569 | A1 | 5/2016 | Benveniste |
| 2016/0157195 | A1 | 6/2016 | Wang et al. |
| 2016/0249397 | A1 | 8/2016 | Seok |
| 2016/0353275 | A1 | 12/2016 | Liu et al. |
| 2016/0374087 | A1 | 12/2016 | Liu et al. |
| 2016/0381688 | A1* | 12/2016 | Hedayat ............. H04L 27/0006 370/329 |
| 2017/0006661 | A1 | 1/2017 | Huang et al. |
| 2017/0041798 | A1 | 2/2017 | Li et al. |
| 2017/0048785 | A1 | 2/2017 | Ge et al. |
| 2017/0094685 | A1* | 3/2017 | Noh .................... H04L 27/0006 |
| 2017/0105143 | A1 | 4/2017 | Seok |
| 2017/0251432 | A1 | 8/2017 | Park et al. |
| 2017/0289987 | A1* | 10/2017 | Seok .................... H04W 74/00 |
| 2017/0294949 | A1 | 10/2017 | Zhang et al. |
| 2017/0367078 | A1 | 12/2017 | Chun et al. |
| 2018/0213565 | A1 | 7/2018 | Huang et al. |
| 2018/0220488 | A1 | 8/2018 | Huang et al. |
| 2018/0227952 | A1 | 8/2018 | Kim et al. |
| 2018/0242394 | A1 | 8/2018 | Wong et al. |
| 2018/0248646 | A1 | 8/2018 | Wikströ et al. |
| 2018/0270038 | A1 | 9/2018 | Oteri et al. |
| 2018/0270863 | A1 | 9/2018 | Oteri et al. |
| 2018/0295567 | A1 | 10/2018 | Ko et al. |
| 2018/0317166 | A1 | 11/2018 | Huang et al. |
| 2018/0324859 | A1 | 11/2018 | Kim et al. |
| 2018/0336499 | A1 | 11/2018 | Kneckt et al. |
| 2019/0021091 | A1 | 1/2019 | Ko et al. |
| 2019/0021106 | A1 | 1/2019 | Oteri et al. |
| 2019/0028898 | A1 | 1/2019 | Ko et al. |
| 2019/0029038 | A1 | 1/2019 | Kim et al. |
| 2019/0215054 | A1 | 7/2019 | Zhang et al. |
| 2019/0289625 | A1 | 9/2019 | Kwon et al. |
| 2019/0335394 | A1 | 10/2019 | Kim et al. |
| 2020/0221088 | A1 | 7/2020 | Tourapis |
| 2020/0221388 | A1 | 7/2020 | Oteri et al. |
| 2020/0267741 | A1 | 8/2020 | Kwon et al. |
| 2021/0235448 | A1 | 7/2021 | Ko et al. |
| 2022/0239578 | A1 | 7/2022 | Raleigh et al. |
| 2022/0345341 | A1 | 10/2022 | Lee et al. |
| 2024/0032091 | A1 | 1/2024 | Anepu et al. |

FOREIGN PATENT DOCUMENTS

| CN | 1917462 | 2/2007 |
| CN | 101336540 | 12/2008 |
| CN | 101374321 | 2/2009 |
| CN | 101616408 | 12/2009 |
| CN | 101647299 | 2/2010 |
| CN | 102761938 | 10/2012 |
| CN | 102771059 | 11/2012 |
| CN | 102844999 | 12/2012 |
| CN | 103052077 | 4/2013 |
| CN | 103081539 | 5/2013 |
| CN | 103096492 | 5/2013 |
| CN | 103098514 | 5/2013 |
| CN | 103167471 | 6/2013 |
| CN | 103178931 | 6/2013 |
| CN | 103228046 | 7/2013 |
| CN | 103299686 | 9/2013 |
| CN | 103348742 | 10/2013 |
| CN | 103516461 | 1/2014 |
| CN | 103563457 | 2/2014 |
| CN | 103731858 | 4/2014 |
| CN | 103918346 | 7/2014 |
| CN | 104066091 | 9/2014 |
| CN | 104168662 | 11/2014 |
| CN | 104272797 | 1/2015 |
| CN | 104335510 | 2/2015 |
| CN | 104380683 | 2/2015 |
| CN | 104488347 | 4/2015 |
| CN | 104704868 | 6/2015 |
| CN | 104956735 | 9/2015 |

(56) References Cited

FOREIGN PATENT DOCUMENTS

| | | |
|---|---|---|
| CN | 105075378 | 11/2015 |
| CN | 105379331 | 3/2016 |
| CN | 104641683 | 7/2018 |
| EP | 2011287 | 1/2009 |
| EP | 2 217 030 | 8/2010 |
| EP | 2 451 200 | 5/2012 |
| EP | 2548316 | 1/2013 |
| EP | 3651536 A1 | 6/2016 |
| EP | 3162156 | 5/2017 |
| EP | 3264813 A1 | 1/2018 |
| EP | 3292716 A1 | 3/2018 |
| EP | 3308590 | 4/2018 |
| EP | 3 687 101 | 7/2020 |
| JP | 2004-525586 | 8/2004 |
| JP | 2006-319444 | 11/2006 |
| JP | 2012-070090 | 4/2012 |
| JP | 2014-17866 | 1/2014 |
| JP | 2015-167417 | 9/2015 |
| KR | 10-2013-0005289 | 1/2013 |
| KR | 10-2013-0028972 | 3/2013 |
| KR | 10-2015-0073855 | 7/2015 |
| KR | 10-2015-0090051 | 8/2015 |
| KR | 10-2015-0124389 | 11/2015 |
| TW | 201436610 | 9/2014 |
| WO | 2011/025145 | 3/2011 |
| WO | 2011/108832 | 9/2011 |
| WO | 2011/115408 | 9/2011 |
| WO | 2012/077859 | 6/2012 |
| WO | 2013/085363 | 6/2013 |
| WO | 2014/027838 | 2/2014 |
| WO | 2014/179713 | 11/2014 |
| WO | 2015/011278 | 1/2015 |
| WO | 2015/042018 | 3/2015 |
| WO | 2015/050311 | 4/2015 |
| WO | 2015/061472 | 4/2015 |
| WO | 2015/064943 | 5/2015 |
| WO | 2015/102540 A1 | 7/2015 |
| WO | 2015/112780 | 7/2015 |
| WO | 2015/120488 | 8/2015 |
| WO | 2015/147874 | 10/2015 |
| WO | 2015/156616 | 10/2015 |
| WO | 2015/183199 | 12/2015 |
| WO | 2016/021792 | 2/2016 |
| WO | 2016/136116 | 9/2016 |
| WO | 2016/191087 | 12/2016 |
| WO | 2017/150954 | 9/2017 |

OTHER PUBLICATIONS

Written Opinion of the International Searching Authority for PCT/KR2017/002407 mailed on Jul. 13, 2017 and its English translation from WIPO (now published as WO 2017/150954).
Wilus. "BSS Color Settings for a Multiple BSSID Set", doc.: IEEE 802.11-16/0042rl, pp. 1-11, Jan. 18, 2016.
International Preliminary Report on Patentability (Chapter I) for PCT/KR2017/002407 issued on Sep. 4, 2018 and its English translation from WIPO.
Office Action dated Mar. 19, 2019 for Japanese Application No. 2018-520532 and its English translation provided by Applicant's foreign council.
Extended European Search Report dated Apr. 23, 2019 for European Application No. 16857801.1.
Matthew Fischer et al.: "CID 205 BSSID Color Bits". Sep. 18, 2013, XP055421527, IEEE-SA mentor, Piscataway, NJ USA, Retrieved from the Internet: URL:https://mentor.ieee.org/802.11/dcn/13/11-13-1207-01-00ah-partial-aid-color-bits.pptx [retrieved on Nov. 3, 2014].
John Son (Wilus Institute): "Further Considerations on Enhanced CCA for 11ax; 11-14-0847-01-00ax-further-considerations-on-enhanced-cca-for-11ax", IEEE Draft; 11-14-0847-01-00AX-FURTHER-CONSIDERATIONS-ON-ENHANCED-CCA-FOR-11AX, IEEE-SA Mentor. Piscataway, NJ USA, vol. 802.11 ax, No. 1, Jul. 15, 2014, pp. 1+12, XP068069563 [retrieved on Jul. 15, 2014].

Robert Stacey (Intel): "Spec Framework; 11-15-0132-09-00ax-spec- framework", IEEE Draft; 11-15-0132-09-00AX-SPEC-FRAMEWORK, IEEE-SA Mentor, Piscataway, NJ USA, vol. 802.11ax, No. 9, Sep. 22, 2015, pp. 1-22, XP068097995, [retrieved on Sep. 22, 2015].
Alfred Asterjadhi: Identifiers in HE PPDUs for power saving, IEEE Draft; 11-15-1122-00-00AX-IDENTIFIERS-IN-HE-PPDUS-FOR-POWER-SAVING, IEEE-SA Mentor, Piscataway, NJ USA, vol. 802.11ax Sep. 12, 2015, pp. 1-18, XP068098373, Retrieved from the Internet: URL:https://mentor.ieee.org/802.11/dcn/15/11-15-1122-00-00ax-identifiers-in-he-ppdus-for-power-saving pptx.
Office Action dated Sep. 25, 2019 for U.S. Appl. No. 15/953,404.
Notice of Allowance dated Dec. 4, 2019 for U.S. Appl. No. 16/000,883.
Office Action dated Jun. 27, 2019 for U.S. Appl. No. 16/000,883 (now published as US 2018/0295567).
Notice of Allowance dated Apr. 29, 2020 for U.S. Appl. No. 15/953,404.
Office Action dated May 27, 2020 for Indian Patent Application No. 201827014271.
Office Action dated May 6, 2020 for European Patent Application No. 16857801.1.
Notice of Allowance dated Jul. 1, 2020 for Korean Patent Application No. 10-2018-7016103 and its English translation provided by Applicant's foreign counsel.
Office Action dated Jul. 28, 2020 for Japanese Patent Application No. 2019-142262 and its English translation provided by Applicant's foreign counsel.
Notice of Allowance dated Jul. 24, 2020 for Korean Patent Application No. 10-2018-7010293 and its English translation provided by Applicant's foreign counsel.
Notice of Allowance dated Jan. 13, 2021 for U.S. Appl. No. 16/121,546 (now published as U.S. 2019/0021091).
Final Office Action dated Sep. 3, 2020 for U.S. Appl. No. 16/121,546 (now published as U.S. 2019/0021091).
Office Action dated Mar. 5, 2020 for U.S. Appl. No. 16/121,546 (now published as U.S. 2019/0021091).
Office Action dated Dec. 15, 2022 for Korean Patent Application No. 10-2022-7034781 and its English translation provided by the Applicant's foreign counsel.
Extended European Search Report dated Feb. 3, 2023 for European Patent Application No. 22204381.2.
Notice of Allowance dated Mar. 3, 2023 for U.S. Appl. No. 17/395,384.
Hearing Notice dated Nov. 6, 2022 for Indian Patent Application No. 201827033017.
Office Action dated Nov. 14, 2022 for U.S. Appl. No. 17/395,384.
Office Action dated Nov. 15, 2022 for Korean Patent Application No. 10-2022-7032149 and its English translation provided by the Applicant's foreign counsel.
Notice of Allowance dated Nov. 24, 2022 for Korean Patent Application No. 10-2021-7029783 and its English translation provided by Applicant's foreign counsel.
Office Action dated Apr. 23, 2021 for Chinese Patent Application No. 201680061366.7 and its English translation provided by Applicant's foreign counsel.
First Office Action dated Oct. 15, 2021 for Chinese Patent Application No. 201780015247.2 and its English translation provided by the Applicant's foreign counsel.
Notice of Allowance dated Nov. 3, 2021 for Chinese Patent Application No. 201680071981.6 and its English translation provided by the Applicant's foreign counsel.
Global System for Mobile Communications: "3GPP TR 45.820 v2.0.0_revmarked", $3^{rd}$ Generation Partnership Project; Technical Specification Group GSM/EDGE Radio Access Network; Cellular System Support for Ultra Low Complexity and Low Throughput Internet of Things; (Release 13), Aug. 20, 2015, pp. 1-514.
Han Lihong: "Research on DRX Algorithm based on LTE/LTE-Advanced System", Thesis defense date May 2014, Wuhan University of Technology, China, Apr. 1, 2014, pp. 1-74.
Global System for Mobile Communications: "3GPP TR 45.820 v2.0.0_clean", $3^{rd}$ Generation Partnership Project; Technical Specification Group GSM/EDGE Radio Access Network; Cellular Sys-

(56) References Cited

OTHER PUBLICATIONS tem Support for Ultra Low Complexity and Low Throughput Internet of Things; (Release 13), Aug. 20, 2015, pp. 1-509.
Mahmoud Elsaadany et al.: "Cellular LTE-A Technologies for the Future Internet-of-Things: Physical Layer Features and Challenges", Dec. 7, 2015, pp. 1-28.
Office Action dated Sep. 29, 2021 for U.S. Appl. No. 16/945,937.
Office Action dated Jan. 25, 2022 for Japanese Patent Application No. 2020-200512 and its English translation provided by Applicant's foreign counsel.
Office Action dated Dec. 17, 2021 for U.S. Appl. No. 16/945,934.
Office Action dated Dec. 27, 2021 for Korean Patent Application No. 10-2021-7018658 and its English translation provided by the Applicant's foreign counsel.
Office Action dated Dec. 30, 2021 for Korean Patent Application No. 10-2021-7041433 and its English translation provided by the Applicant's foreign counsel.
Office Action dated Jan. 4, 2022 for Korean Patent Application No. 10-2021-7041428 and its English translation provided by the Applicant's foreign counsel.
Notice of Allowance dated Apr. 29, 2021 for U.S. Appl. No. 16/792,166.
Office Action dated Jan. 25, 2021 for U.S. Appl. No. 16/792,166.
Office Action dated Oct. 12, 2020 for Chinese Patent Application No. 201680061366.7 and its English translation provided by Applicant's foreign counsel.
Office Action dated Jan. 25, 2021 for U.S. Appl. No. 16/792,163.
Notice of Allowance dated Apr. 28, 2021 for U.S. Appl. No. 16/792,163.
Office Action dated Jan. 25, 2021 for Chinese Patent Application No. 201680071981.6 and its English translation provided by Applicant's foreign counsel.
Office Action dated Mar. 17, 2021 for Korean Patent Application No. 10-2018-7025837 and its English translation provided by Applicant's foreign counsel.
Office Action dated Mar. 23, 2021 for Indian Patent Application No. 201827021492.
Office Action dated Apr. 5, 2021 for Indian Patent Application No. 201827033017.
Notice of Grant dated Mar. 17, 2021 for Korean Patent Application No. 10-2020-7028167 and its English translation provided by Applicant's foreign counsel.
Notice of Grant dated Mar. 17, 2021 for Korean Patent Application No. 10-2020-7028169 and its English translation provided by Applicant's foreign counsel.
Notice of Allowance dated May 14, 2021 for U.S. Appl. No. 16/121,546.
Notice of Allowance dated Jul. 20, 2021 for U.S. Appl. No. 16/792,166.
Office Action dated Jan. 13, 2022 for Korean Patent Application No. 10-2021-7029783 and its English translation provided by Applicant's foreign counsel.
Notice of Allowance dated May 18, 2022 for European Patent Application No. 21 167 595.4.
Notice of Allowance dated Jun. 13, 2022 for Chinese Patent Application No. 201780015247.2 and its English translation provided by Applicant's foreign counsel.
Notice of Allowance dated Jul. 6, 2022 for Korean Patent Application No. 10-2021-7018658 and its English translation provided by Applicant's foreign counsel.
Notice of Allowance dated Jul. 26, 2022 for Korean Patent Application No. 10-2021-7041428 and its English translation provided by Applicant's foreign counsel.
Notice of Allowance dated Aug. 2, 2022 for Japanese Patent Application No. 2020-200512 and its English translation provided by Applicant's foreign counsel.
Notice of Allowance dated Jan. 11, 2023 for U.S. Appl. No. 17/227,289 (now published as U.S. 2021/0235448).
Office Action dated Sep. 15, 2022 for U.S. Appl. No. 17/227,289 (now published as U.S. 2021/0235448).
Office Action dated Aug. 23, 2023 for Chinese Patent Application No. 202210048394.2 and its English translation provided by Applicant's foreign counsel.
Notice of Allowance dated Aug. 25, 2023 for Chinese Patent Application No. 202210048421.6 and its English translation provided by Applicant's foreign counsel.
Notice of Allowance dated Sep. 22, 2023 for Korean Patent Application No. 10-2022-7032149 and its English translation provided by Applicant's foreign counsel.
Notice of Allowance dated Oct. 19, 2023 for Korean Patent Application No. 10-2022-7034781 and its English translation provided by Applicant's foreign counsel.
Notice of Hearing dated Feb. 20, 2023 for Indian Patent Application No. 201827021492.
Office Action dated Apr. 18, 2023 for Korean Patent Application No. 10-2023-7006655 and its English translation provided by Applicant's foreign counsel.
Office Action dated Jul. 4, 2023 for Japanese Patent Application No. 2022-139073 and its English translation provided by Applicant's foreign counsel.
IEEE P802.11ah™M/D5.0: "Draft Standard for Information technology—Tele-communications and information exchange between systems Local and metropolitan area networks—Specific requirements; Part 11: Wireless LAN Medium Access Control (MAC) and Physical Layer (PHY) Specifications; Amendment 2: Sub 1 GHZ. License Exempt Operation", IEEE P802.11ah™M/D5.0, Mar. 2015, pp. 1-632.
Yasuhiko Inoue et al.: "Number of BSS Color bits", doc.: IEEE 802.11-15/1075r0, Sep. 14, 2015, slides 1-20.
Office Action dated Feb. 1, 2024 for Korean Patent Application No. 10-2023-7044223 and its English translation provided by Applicant's foreign counsel.
Notice of Allowance dated Jan. 30, 2024 for Japanese Patent Application No. 2022-139073 and its English translation provided by Applicant's foreign counsel.
Office Action dated Jan. 31, 2024 for U.S. Appl. No. 18/199,370.
Notice of Allowance dated Jan. 31, 2024 for Chinese Patent Application No. 202111214481.2 and its English translation provided by Applicant's foreign counsel.
Office Action dated Feb. 8, 2024 for Chinese Patent Application No. 202111214981.6 and its English translation provided by Applicant's foreign counsel.
Office Action dated Feb. 23, 2024 for Korean Patent Application No. 10-2023-7006655 and its English translation provided by Applicant's foreign counsel.
Office Action dated Mar. 4, 2024 for Korean Patent Application No. 10-2024-7002126 and its English translation provided by Applicant's foreign counsel.
Notice of Allowance dated Mar. 6, 2024 for Chinese Patent Application No. 202210048394.2 and its English translation provided by Applicant's foreign counsel.
John (Ju-Hyung) Son et al.: "Legacy Fairness Issues of Enhanced CCA", doc.: IEEE 802.11-15/0085r1, Jan. 12, 2015, slides 1-13.
Yasuhiko Inoue, IEEE 802.11-15/1093r0, Minutes of the TGax full meetings from the IEEE 802.11 Sep. 2015 session, Sep. 13-18, 2015, 36 pp.
Geonjung Ko et al., IEEE 802.11-16/0640r3, BSS Color Collision, May, 16, 2016, 14 pp.
Robert Stacey, IEEE 802.11-15/0132r15, Specification Framework for Tgax (IEEE), Mar. 17, 2016, 50 pp.
Office Action dated Apr. 23, 2024 for European Patent Application No. 22204381.2, 8 pp.
Statement of Defense Dated Mar. 7, 2024 in the matter of Wilus Institute of Standards and Technology Inc. against Acer Computer GmbH and others, File No. 7 O 14196/23 (EP 550), English translation provided by Applicant's foreign counsel, 86 pp.
Action for Annulment Dated Mar. 7, 2024 in the matter of Acer Computer GmbH against Wilus Institute of Standards and Technology Inc., and SK Telecom Co, Ltd, File No. 7 O 14196/23 (EP 550), English translation provided by Applicant's foreign counsel, 80 pp.
IEEE Std 802.Nov. 2012, IEEE Standard for Information technology—Telecommunications and information exchange between systems Local and metropolitan area networks—Specific requirements, Part

(56) References Cited

OTHER PUBLICATIONS

11: Wireless LAN Medium Access Control (MAC) and Physical Layer (PHY) Specifications, Mar. 29, 2012, 2793 pp.
Office Action dated Jun. 6, 2024 for Chinese Patent Application No. 202111214474.2 and its English translation provided by Applicant's foreign counsel.
Notice of Allowance dated Jun. 12, 2024 for U.S. Appl. No. 18/199,370.
Office Action dated Jun. 26, 2024 for Chinese Patent Application No. 202111214981.6 and its English translation provided by Applicant's foreign counsel.
Abhishek Patil et al.: "Proposed Resolution for CID 193 (BSS Color Disable Indication)", doc: IEEE 802.11-16/1413r0, Nov. 2016, pp. 1-3.
Geonjung Ko et al.: "Discussions on Partial BSS Color", doc.: IEEE 802.11-16/0918r1, Sep. 12, 2016, slides 1-14.
Geonjung Ko et al.: "BSS Color Collision", doc.: IEEE 802.11-16/0640r0, May 16, 2016, slides 1-13.
Geonjung Ko et al.: "Issues on BSS Color Bits Collision", doc .: IEEE 802.11-16/0396r0, Mar. 14, 2016, slides 1-18.

\* cited by examiner

| Bits | Field |
|---|---|
| B0 - B6 | Scrambler Initialization |
| B7 - B12 | BSS Color |
| B13 - B15 | Reserved |

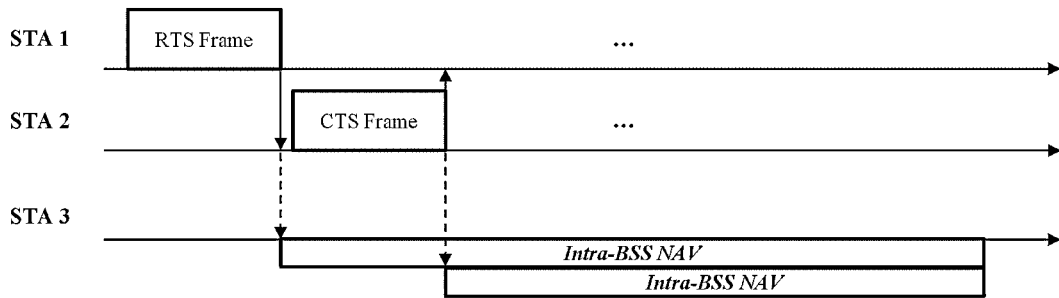

FIG. 17

| Condition | Group ID | Partial AID |
|---|---|---|
| Addressed to AP | 0 | BSSID[39:47] |
| Addressed to Mesh STA | 0 | RA[39:47] |
| Sent by an AP and addressed to a STA associated with that AP or sent by a DLS or TDLS STA in a direct path to a DLS or TDLS peer STA | 63 | $(dec(AID[0:8]) + dec(BSSID[44:47]$ XOR $BSSID[40:43])$ $* 2^5) \mod 2^9$<br><br>where<br>XOR is a bitwise exclusive OR operation<br>mod X indicates the X-modulo operation<br>dec(A[b:c]) is the cast to decimal operator where b is scaled by $2^0$ and c by $2^{(c-b)}$ |
| Otherwise | 63 | 0 |

FIG. 18

| Variant | B0 (value) | B1 (value) | B2 - B29 | B30 | B31 |
|---|---|---|---|---|---|
| HT variant | VHT (0) | HT Control Middle | | | |
| VHT variant | VHT (1) | HE (0) | VHT Control Middle | AC Constraint | RDG/More PPDU |
| HE variant | VHT (1) | HE (1) | Aggregated Control | AC Constraint | RDG/More PPDU |

*FIG. 26*

(a) Aggregated Control
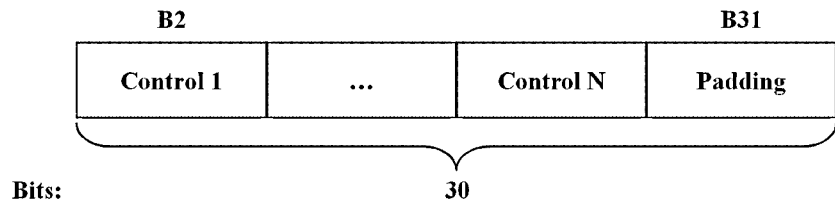
(b) Control
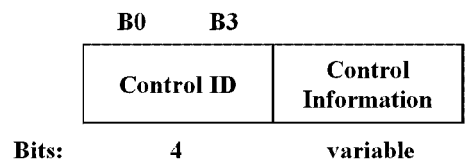
FIG. 27
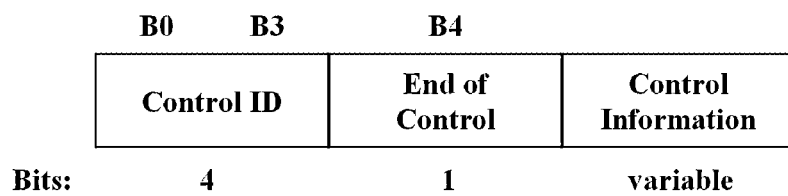
FIG. 28

| Frame Control | Duration | RA | TA | Common Info | Per User Info 1 | ... | Per User Info N | Padding | FCS |
|---|---|---|---|---|---|---|---|---|---|
| 2 | 2 | 6 | 6 | | | | | | 4 |

Octets

*FIG. 34*

(a) Common Info field

| Length | Cascade Indication | CS Required | HE-SIG-A Info | CP and LTF Type | Trigger Type | Trigger Dependent Common Info |
|---|---|---|---|---|---|---|
| Bits | | | | | | |
| 12 | 1 | 1 | | | | variable |

(b) Per User Info field

| User Identifier | RU Allocation | Coding Type | MCS | DCM | SS Allocation | Trigger Dependent Per User Info |
|---|---|---|---|---|---|---|
| Bits | | | | | | |
| 12 | | | | | | variable |

*FIG. 35*

(a) Common Info field

| Length | Cascade Indication | CS Required | Spatial Reuse | BW | CP and LTF Type | MU MIMO LTF Mode | Number of LTFs | STBC | LDPC Extra Symbol | AP TX Power | Packet Extension | Trigger Type | Trigger Dependent Common Info |
|---|---|---|---|---|---|---|---|---|---|---|---|---|---|
| 12 | 1 | 1 | ≥2 | | | 1 | 3 | 1 | 1 | | ≥3 | 4 | variable |

Bits (b) Per User Info field

| User Identifier | RU Allocation | Coding Type | MCS | DCM | SS Allocation | Target RSSI | Trigger Dependent Per User Info |
|---|---|---|---|---|---|---|---|
| 12 | 8 | 1 | 4 | 1 | | | variable |

Bits

*FIG. 36*

(a) Trigger Dependent Common Info field
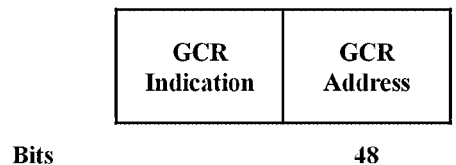
(b) Trigger Dependent Per User Info field
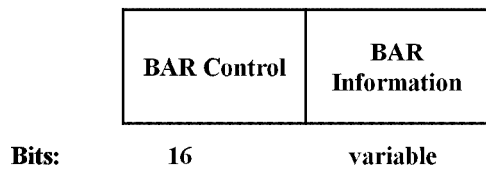
FIG. 37
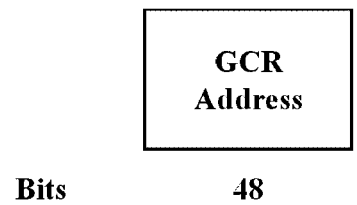
FIG. 38

| Frame Control | Duration | RA (GCR Address) | TA | Common Info | Per User Info 1 (GCR Group) | ... | Per User Info N (GCR Group) | Padding | FCS |
|---|---|---|---|---|---|---|---|---|---|
| 2 | 2 | 6 | 6 | | | | | | 4 |

Octets

*FIG. 39*

| Frame Control | Duration | RA (Broadcast) | TA | Common Info | Per User Info 1 (GCR Group) | ... | Per User Info N1 (GCR Group) | ... | Per User Info N2 | Padding | FCS |
|---|---|---|---|---|---|---|---|---|---|---|---|
| 2 | 2 | 6 | 6 | | | | | | | | 4 |

Octets

FIG. 40

(a) BAR Control field

| B0 | B1 | B2 | B3 | B4　　　B11 | B12　　　B15 |
|---|---|---|---|---|---|
| BAR ACK Policy | Multi-TID | Compressed Bitmap | GCR | Reserved | TID_INFO |

Bits: 1　　1　　1　　1　　8　　4

(b) BlockACKReq variant encoding

| Multi-TID subfield value | Compressed Bitmap subfield value | GCR subfield value | BlockACKReq variant |
|---|---|---|---|
| 0 | 0 | 0 | Basic BlockACKReq |
| 0 | 1 | 0 | Compressed BlockACKReq |
| 1 | 0 | 0 | Extended Compressed BlockACKReq |
| 1 | 1 | 0 | Multi-TID BlockACKReq |
| 0 | 0 | 1 | Reserved |
| 0 | 1 | 1 | GCR BlockACKReq |
| 1 | 0 | 1 | *Reserved* |
| 1 | 1 | 1 | *Reserved* |

*FIG. 41*

WIRELESS COMMUNICATION METHOD AND WIRELESS COMMUNICATION TERMINAL IN BASIC SERVICE SET OVERLAPPING WITH ANOTHER BASIC SERVICE SET

CROSS-REFERENCE TO RELATED APPLICATIONS

This application is a continuation of U.S. patent application Ser. No. 17/227,289 filed on Apr. 10, 2021, which is a continuation of U.S. patent application Ser. No. 16/121,546 filed on Sep. 4, 2018, now issued as U.S. Pat. No. 11,129,163 dated Sep. 21, 2021, which is a continuation of International Patent Application No. PCT/KR2017/002407 filed on Mar. 6, 2017, which claims the priority to Korean Patent Application No. 10-2016-0026684 filed in the Korean Intellectual Property Office on Mar. 4, 2016, Korean Patent Application No. 10-2016-0029975 filed in the Korean Intellectual Property Office on Mar. 12, 2016, Korean Patent Application No. 10-2016-0044465 filed in the Korean Intellectual Property Office on Apr. 11, 2016, Korean Patent Application No. 10-2016-0057597 filed in the Korean Intellectual Property Office on May 11, 2016, and Korean Patent Application No. 10-2016-0114821 filed in the Korean Intellectual Property Office on Sep. 7, 2016, the entire contents of which are incorporated herein by reference.

TECHNICAL FIELD

The present invention relates to a wireless communication method and a wireless communication terminal in a situation where a basic service set overlaps.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

DISCLOSURE

Technical Problem

An embodiment of the present invention is to provide a wireless communication method and a wireless communication terminal in a situation where a basic service set overlaps.

Technical Solution

According to an embodiment of the present invention, a wireless communication terminal that communicates wirelessly includes: a transceiver; and a processor. The processor is configured to transmit a BSS color indicating a BSS including the wireless communication terminal when communicating with another wireless communication terminal through the transceiver, and transmit a predetermined value as the BSS color when the wireless communication terminal fails to receive information signaling the BSS color.

When the wireless communication terminal fails to make any association with a wireless communication terminal, which is an AP, the processor may transmit a predetermined value as the BSS color.

When the wireless communication terminal receives signaling information indicating that an operation based on the BSS color is not allowed, the processor may be configured to transmit a predetermined value as the BSS color.

The predetermined value may be 0.

A PLCP Protocol Data Unit (PPDU) signaling the predetermined value as the BSS color may not be identified as an Inter-BSS PPDU or an Intra-BSS PPDU based on the BSS color, which is the predetermined value, the Intra-BSS PPDU may indicate a PPDU transmitted from the same BSS as the BSS including the wireless communication terminal, and the Inter-BSS PPDU may indicate a PPDU transmitted from a BSS other than the BSS including the wireless communication terminal.

According to an embodiment of the present invention, a wireless communication terminal that communicates wirelessly includes: a transceiver; and a processor. The processor is configured to receive a PLCP Protocol Data Unit (PPDU) through the transceiver and access a channel based on whether the PPDU is an Inter-BSS PPDU or an Intra-BSS PPDU, the Intra-BSS PPDU indicates a PPDU transmitted from the same BSS as the BSS including the wireless communication terminal, and the Inter-BSS PPDU indicates a PPDU transmitted from a BSS other than the BSS including the wireless communication terminal.

When the PPDU satisfies both an Inter-BSS PPDU condition and an Intra-BSS PPDU condition, the PPDU may be identified as an Inter-BSS PPDU.

When the PPDU is not identified as the Inter-BSS PPDU or the Intra-BSS PPDU, the processor may set a Basic NAV instead of an Intra-BSS Network Allocation Vector (NAV) based on the PPDU, the Intra-BSS NAV may be set based on the PPDU transmitted from the same BSS as the wireless communication terminal, and the Basic NAV may be set based on the PPDU transmitted from the BSS other than that of the wireless communication terminal When the wireless communication terminal is not able to identify whether the PPDU is the Intra-BSS PPDU or the Inter-BSS PPDU based on the BSS color, the processor may be configured not to set an Intra-BSS Network Allocation Vector (NAV) based on the BSS color and a TXOP Duration field of an HE-SIG-A field of the PPDU, and the Intra-BSS NAV may be set based on the PPDU transmitted from the same BSS as that of the wireless communication terminal.

When receiving signaling information indicating that an operation based on the BSS color is not allowed, the processor may be configured not to set the Intra-BSS NAV based on the BSS color and the TXOP Duration field of the HE-SIG-A field of the PPDU.

When the wireless communication terminal is recognize that the BSS color of the BSS including the wireless communication terminal is the same as the BSS color of another BSS, an Intra-BSS NAV may not be set based on the BSS color and the TXOP Duration field of the HE-SIG-A field of the PPDU.

When the wireless communication terminal is not able to identify whether the PPDU is the Intra-BSS PPDU or the Inter-BSS PPDU based on the BSS color, the processor may be configured not to enter a power save mode based on the BSS color.

When the wireless communication terminal is an AP and the PPDU is a trigger-based PPDU transmitted from a wireless communication terminal that is not triggered by the wireless communication terminal, the processor may be configured to determine that the PPDU is an Inter-BSS PPDU.

When the wireless communication terminal is an AP and the PPDU is a PPDU including a trigger frame, the processor may be configured to determine that the PPDU is an Inter-BSS PPDU.

The processor may be configured to determine whether the PPDU includes the trigger frame based on information related to a Spatial Reuse (SR) operation included in the PPDU.

Based on that information related to the SR operation included in the PPDU indicates whether the SR operation is restrictively allowed or the SR operation is delayed while the PPDU is transmitted, the processor may be configured to determine whether the PPDU includes the trigger frame.

According to an embodiment of the present invention, a wireless communication terminal that communicates wirelessly includes: a transceiver; and a processor. The processor is configured to receive a PLCP Processing Data Unit (PPDU) through the transceiver, and not to perform an operation based on the BSS color when the BSS color indicated by the PPDU is a predetermined value.

When the BSS color indicated by the PPDU is a predetermined value, the processor may not perform the SR operation for the PPDU.

When the BSS color indicated by the PPDU is a predetermined value, the processor may regard the PPDU as an Intra-BSS PPDU.

The predetermined value may be a reserved value that is not used in the BSS color when the AP selects the BSS color.

Advantageous Effects

An embodiment of the present invention provides a wireless communication method and a wireless communication terminal in a situation where a basic service set overlaps.

DESCRIPTION OF DRAWINGS

FIG. 17 shows an operation of setting a NAV according to an embodiment of FIG. 15 to FIG. 16 by a wireless communication terminal according to an embodiment of the present invention.

FIG. 18 shows a method of setting a partial AID and a Group ID field of VHT-SIG-A by a wireless communication terminal according to an embodiment of the present invention.

FIG. 26 is a view illustrating a variant of an HT Control field according to an embodiment of the present invention.

FIG. 27 shows the format of the A-Control subfield according to an embodiment of the present invention.

FIG. 28 shows the format of an A-Control sub-field of a control sub-field according to another embodiment of the present invention.

FIG. 34 shows a format of a trigger frame according to an embodiment of the present invention.

FIG. 35 shows the format of a Common Info field and a Per User Info field of a trigger frame according to the embodiment of the present invention.

FIG. 36 shows a Common Info field and a Per User Info field of a trigger frame according to another embodiment of the present invention.

FIG. 37 shows a Trigger Dependent Common Info field and a Trigger Dependent Per User Info field of an MU-BAR type trigger frame according to an embodiment of the present invention.

FIG. 38 shows the format of the Trigger Dependent Common Info field of the MU-BAR type trigger frame according to an embodiment of the present invention.

FIG. 39 shows a format of an MU-BAR type trigger frame for GCR according to an embodiment of the present invention.

FIG. 40 shows a format of an MU-BAR type trigger frame for GCR according to an embodiment of the present invention.

FIG. 41 shows the format of the BAR Control field and the encoding value of the BlockACKReq variant according to an embodiment of the present invention.

MODE FOR CARRYING OUT THE INVENTION

Figure 1:
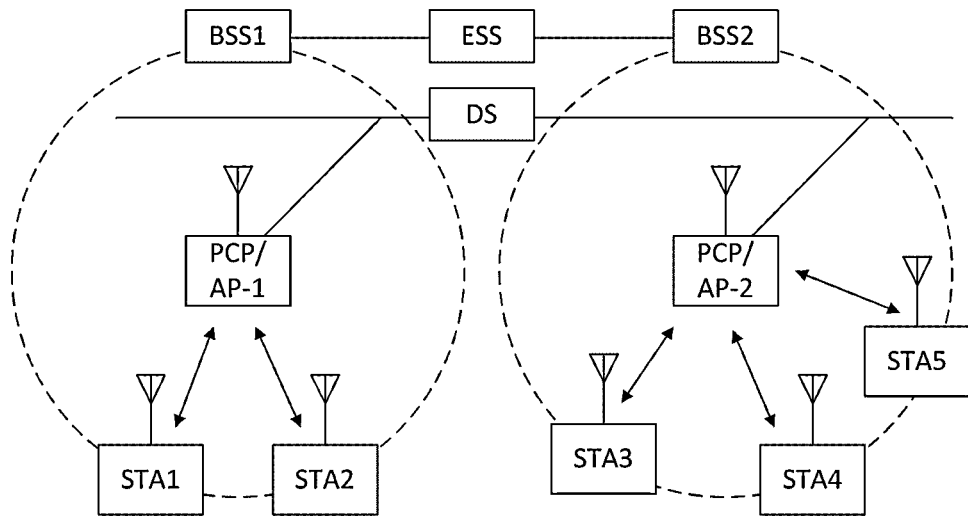
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0026684 (2016 Mar. 4), Nos. 10-2016-0029975 (2016 Mar. 12), Nos. 10-2016-0044465 (2016 Apr. 11), Nos. 10-2016-0057597 (2016 May 11), and Nos. 10-2016-0114821 (2016 Sep. 7) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
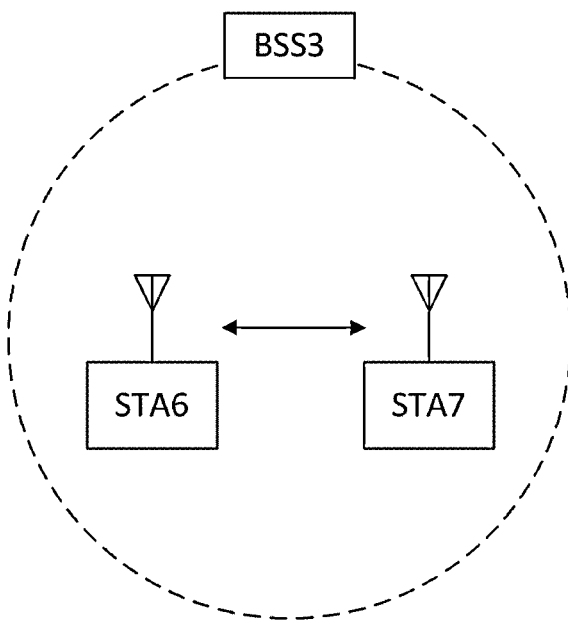
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
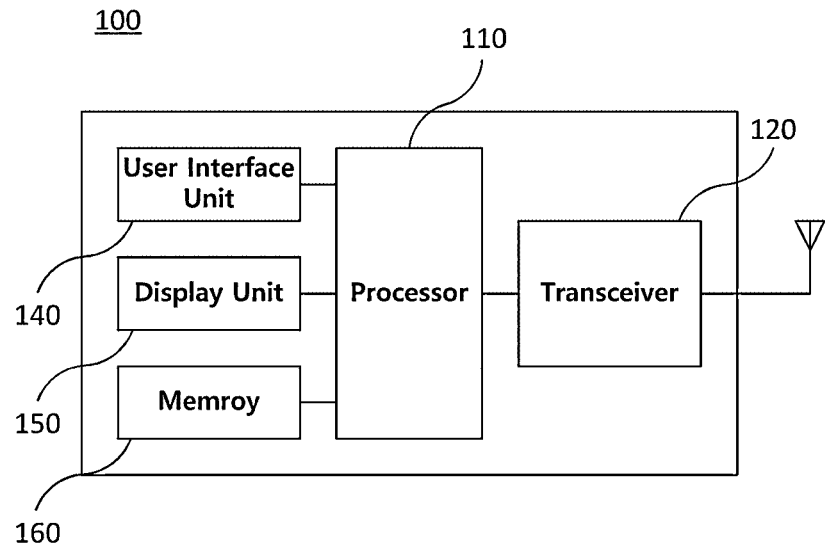
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
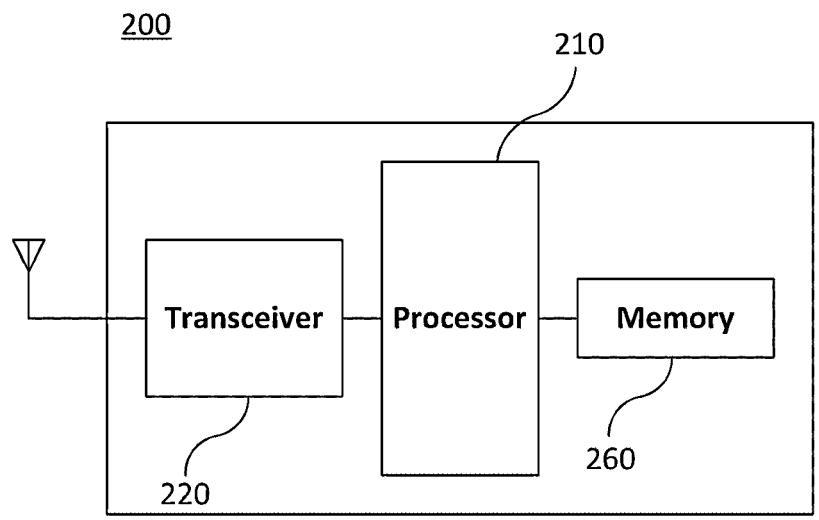
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
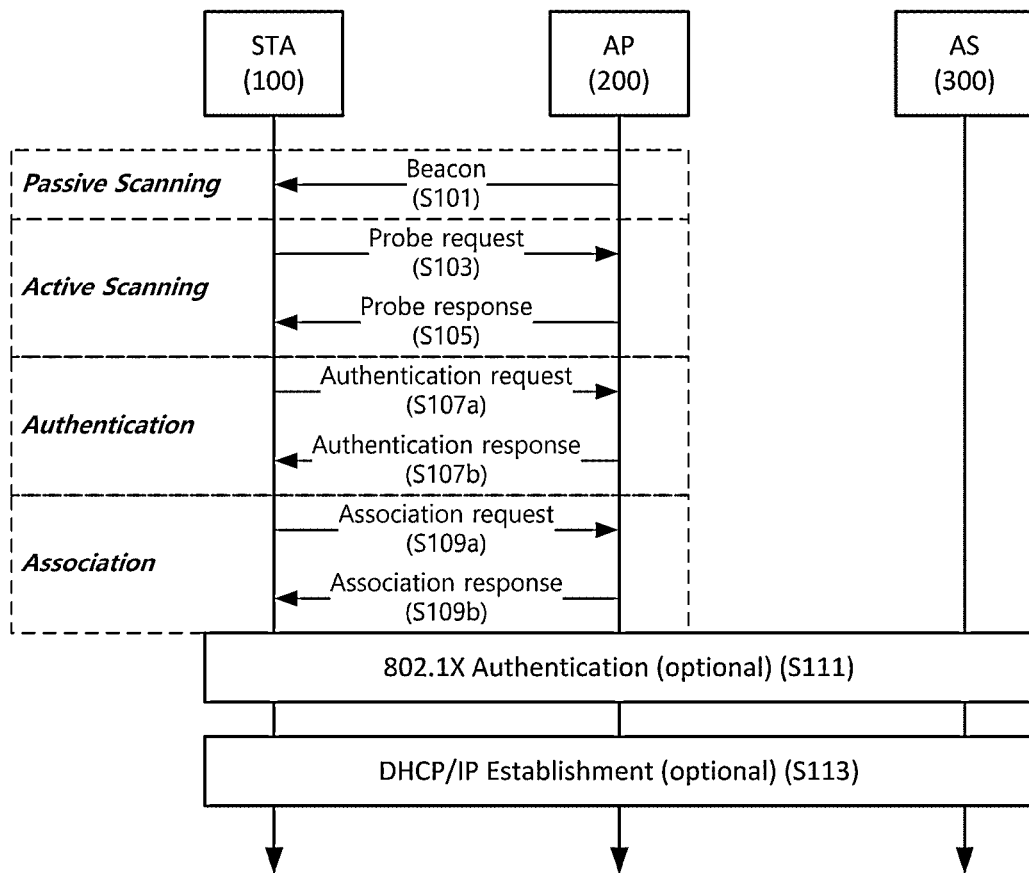
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP.

Due to the spread of mobile devices and the supply of wireless communication, wireless communication terminals are increasingly communicating in a dense environment. Particularly, the number of cases where a wireless communication terminal communicates in an environment in which a plurality of BSSs are overlapped is increasing. When multiple BSSs are overlapped, the communication efficiency of the wireless communication terminal may be degraded due to interference with other wireless communication terminals. In particular, when a frequency band is used through a contention procedure, a wireless communication terminal may not secure even a transmission opportunity due to interference with other wireless communication terminals. To solve this problem, a wireless communication terminal may perform a spatial reuse (SR) operation. Specifically, the SR operation may include an operation of accessing the channel depending on whether the received frame is a MAC frame transmitted from a BSS including a wireless communication terminal or a MAC frame transmitted from another BSS. For convenience of description, when a frame is used without any description in the following description, it is assumed to refer to a MAC frame.

In a specific embodiment, the operation of accessing the channel may include a setting NAV and resetting NAV operation, a CCA operation, and a deferral operation. For example, the wireless communication terminal may adjust a Clear Channel Assessment (CCA) threshold value according to whether a frame received by the wireless communication terminal is a frame transmitted from a BSS including a wireless communication terminal or a frame transmitted from an OBSS. Also, the wireless communication terminal may adjust the transmission power of the PPDU to be transmitted according to the CCA threshold value adjustment during the SR operation.

Specifically, the wireless communication terminal may apply the CCA threshold value according to whether the received PPDU is Inter-BSS PPDU or Intra-BSS PPDU while the received PPDU is being transmitted. In the specific embodiment, the CCA threshold value according to whether the received PPDU is Inter-BSS PPDU or Intra-BSS PPDU while the payload of the received PPDU is being transmitted may be applied. Also, the wireless communication terminal may receive the first PPDU and receive the second PPDU while applying the CCA threshold according to whether the first PPDU is the Inter-BSS PPDU or the Intra-BSS PPDU. Specifically, the wireless communication terminal may apply the CCA threshold value according to whether the received PPDU is Inter-BSS PPDU or Intra-BSS PPDU while the received PPDU is being transmitted. Specifically, when the wireless communication terminal receives the Inter-BSS PPDU and applies the CCA threshold value corresponding to the Inter-BSS PPDU, it may receive the Intra-BSS PPDU. At this time, the wireless communication terminal may apply the CCA threshold value corresponding to the Intra-BSS PPDU instead of the CCA threshold value corresponding to the Inter-BSS PPDU. However, when the wireless communication terminal receives the Intra-BSS PPDU and applies the CCA threshold value corresponding to the Intra-BSS PPDU, and the wireless communication terminal may receive the Inter-BSS PPDU while the transmission of the Intra-BSS PPDU is not completed. At this time, the wireless communication terminal may maintain the CCA threshold value corresponding to the Intra-BSS PPDU until the transmission of the intra-BSS PPDU is completed. Specifically, the wireless communication terminal may not apply the CCA threshold value corresponding to the inter-BSS PPDU until the transmission of the Intra-BSS PPDU is completed. In the above-described operations, the CCA threshold value corresponding to the Inter-BSS PPDU may be equal to or greater than the CCA threshold value corresponding to the Intra-BSS PPDU.

In addition, the wireless communication terminal may enter the power save mode depending on whether the frame received by the wireless communication terminal is a frame transmitted from a BSS including a wireless communication terminal or a frame transmitted from an OBSS.

For convenience of explanation, a BSS including a wireless communication terminal is referred to as Intra-BSS, and a basic service set overlapped with Intra-BSS is referred to as an Overlapped Basic Service Set (OBSS). In addition, a BSS different from the Intra-BSS is referred to as Inter-BSS. In addition, a frame transmitted in the Intra-BSS is referred to as an Intra-BSS frame, and a frame transmitted in the OBSS is referred to as an OBSS frame or an Inter-BSS frame. In addition, the PPDU transmitted from the Intra-BSS is referred to as an Intra-BSS PPDU, and the PPDU transmitted from the OBSS is referred to as an OBSS PPDU or an Inter-BSS PPDU.

Figure 6:
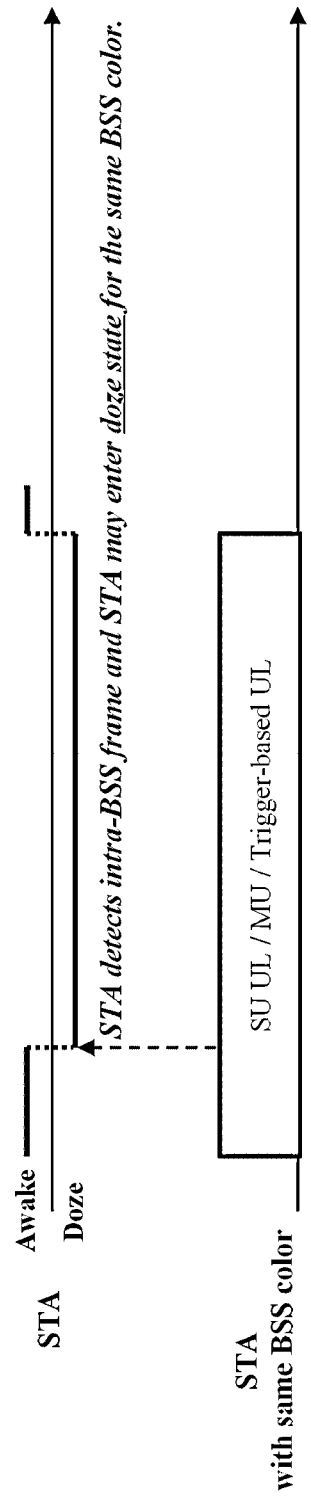
FIG. 6 shows that a wireless communication terminal according to an embodiment of the present invention enters a power save mode based on a BSS color.

FIG. 6 shows that a wireless communication terminal according to an embodiment of the present invention enters a power save mode based on a BSS color.

The non-AP wireless communication terminal may enter the power save mode when the recipient of the PPDU transmitted in the Intra-BSS does not include the non-AP wireless communication terminal. Specifically, the non-AP wireless communication terminal may enter the power save mode under the following conditions. When the PPDU received by the non-AP wireless communication terminal is the HE-MU-PPDU, the BSS color value signaled by the corresponding PPDU indicates the BSS associated with the wireless communication terminal, the corresponding PPDU is not an uplink PPDU, the non-AP wireless communication terminal is not included in the address of the receiving wireless communication terminal which is signaled by the PPDU, and it is not a broadcast address indicating a non-AP wireless communication terminal, the non-AP wireless communication terminal may enter the power save mode. Also, when the PPDU received by the non-AP wireless communication terminal is any one of the HE-MU-PPDU, the HE-SU-PPDU, and the HE-extended range SU-PPDU, the BSS color value signaled by the corresponding PPDU indicates the BSS with which the non-AP wireless communication terminal is associated, and the corresponding PPDU is an uplink PPDU, the non-AP wireless communication terminal may enter the power save mode. Also, when the PPDU received by the non-AP wireless communication terminal is a trigger-based PPDU and the BSS color value signaled by the PPDU indicates a BSS associated with a non-AP wireless communication terminal, the non-AP wireless communication terminal may enter the power save mode. In a specific embodiment, the non-AP wireless communication terminal may determine whether the PPDU is a PPDU for uplink transmission according to the UL_FLAG value of the RXVECTOR. In addition, the non-AP wireless communication terminal may determine whether the wireless communication terminal is included in the address of the receiving wireless communication terminal that the PPDU signals according to the STA_ID_LIST of the RXVECTOR. Also, the non-AP wireless communication terminal may leave the power save mode at the time when the corresponding PPDU is not transmitted. At this time, the RXVECTOR is a parameter set indicating the information of the PPDUs received from the module of the physical layer by the module of the MAC layer when the wireless communication terminal receives the PPDU.

Also, the non-AP wireless communication terminal may determine that the wireless medium is busy in a power save state. Accordingly, the wireless communication terminal does not access the wireless medium in the power save state. In addition, the non-AP wireless communication terminal may operate a network allocation vector (NAV) timer in a power save mode and access the wireless medium when the NAV timer expires. Also, when the power save mode option of the non-AP wireless communication terminal is activated and the current state of the non-AP wireless communication terminal is not in the power save mode, the non-AP wireless communication terminal may enter the power save mode. At this time, the state where the power save mode option is activated may be a case where the value of dot11IntraPPDUPowerSaveOptionActivated is True. Also, the power save mode is referred to as a doze state, and a state that is not a power save mode may be referred to as an awake state.

In the embodiment of FIG. 6, the station STA detects a PPDU signaling the same BSS color as that of the BSS in which the station is included. At this time, the station STA identifies the detected PPDU as Intra-BSS PPDU based on the BSS color. Thus, the station STA may enter the power save mode. Specifically, when at least one of the above conditions is satisfied, the station STA may enter the power save mode. In addition, the station STA leaves the power save mode at the time when transmission of the corresponding PPDU is terminated.

Since the size of the field indicating the BSS color is limited, different BSSs may be set to the same BSS color. For convenience of description, a case where different BSSs correspond to the same BSS color is referred to as Inter-BSS color collision or BSS color collision.

Figure 7:
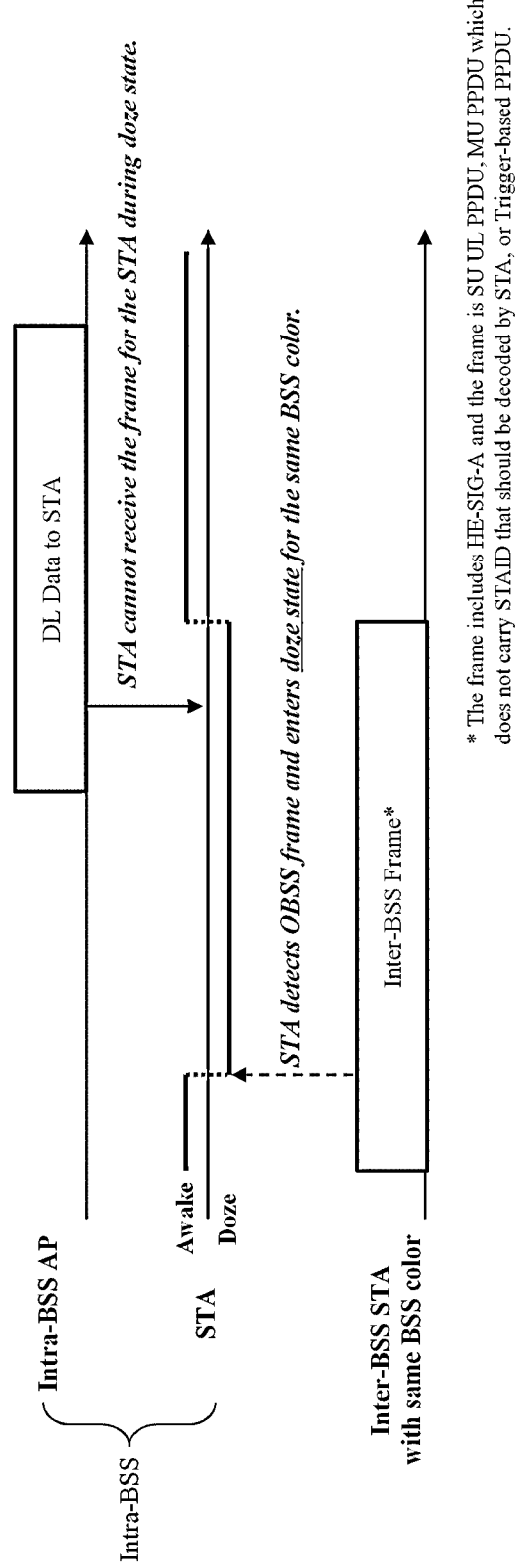
FIG. 7 shows that a wireless communication terminal according to an embodiment of the present invention enters a power save mode during inter-BSS color collision.

FIG. 7 shows that a wireless communication terminal according to an embodiment of the present invention enters a power save mode during Inter-BSS color collision.

When Inter-BSS color collision occurs and the non-AP wireless communication terminal receives the Inter-BSS PPDU signaling the same BSS color as that of the BSS associated with the non-AP wireless communication terminal, the non-AP wireless communication terminal may enter the power save mode. Accordingly, the non-AP wireless communication terminal may not receive the PPDU transmitted by the AP associated with the non-AP wireless communication terminal as in the embodiment of FIG. 7. At this time, the BSS color signaled by the PPDU may be the BSS color signaled by the BSS color field of the PPDU. Specifically, the BSS color that the PPDU signals may be the BSS color that the BSS color field of the HE-SIG-A of the PPDU signals.

Therefore, when the wireless communication terminal is not able to identify the BSS to which the corresponding PPDU is transmitted based on the BSS color signaled by the PPDU, the wireless communication terminal may not perform the operation based on the BSS color. Specifically, when the wireless communication terminal is not able to identify the BSS based on the BSS color signaled by the PPDU, the wireless communication terminal may not perform an operation based on the BSS color that is the same as that of the inter-BSS. For example, when the wireless communication terminal is not able to identify the BSS based on the BSS color signaled by the PPDU, even when the wireless communication terminal receives the PPDU indicating the same BSS color as that of the Inter-BSS, the wireless communication terminal may not treat the PPDU as Inter-BSS PPDU.

When the non-AP wireless communication terminal is not able to identify whether the PPDU is an Inter-BSS PPDU or an Intra-BSS PPDU based on the BSS color signaled by the PPDU, the non-AP wireless communication terminal may not enter the power save mode based on the BSS color signaled by the PPDU. Specifically, when the non-AP wireless communication terminal recognizes a BSS color collision, the non-AP wireless communication terminal may not enter the power save mode based on the BSS color signaled by the PPDU. In a specific embodiment, the non-AP wireless communication terminal may not enter the power save mode based on the BSS color value from a time when the BSS color collision is recognized to a predetermined time point. In another specific embodiment, the non-AP wireless communication terminal may not operate in the Intra-PPDU power save mode based on the BSS color value from a time when the BSS color collision is recognized to a predetermined time point. Also, the predetermined time point may indicate a time point at which the BSS color collision is resolved. In another specific embodiment, the predetermined time point may be a time point at which the association of the AP with the non-AP wireless communication terminal is disassociated. In yet another specific embodiment, the non-AP wireless communication terminal may stop entering power save mode from when the non-AP wireless communication terminal detects a BSS color collision.

In addition, when the wireless communication terminal is not able to identify whether the PPDU is an Inter-BSS PPDU or an Intra-BSS PPDU based on the BSS color signaled by the PPDU, the wireless communication terminal may not set the NAV based on the BSS color. Specifically, when the wireless communication terminal is not able to identify whether the PPDU is the Inter-BSS PPDU or the Intra-BSS PPDU based on the BSS color signaled by the PPDU, the wireless communication terminal may not set the Intra-BSS NAV based on the BSS color and the TXOP Duration field of the HE-SIG-A field. First, the operation of the wireless communication terminal to set two NAVs will be described, and when the wireless communication terminal is not able to identify whether the PPDU is the Inter-BSS PPDU or the Intra-BSS PPDU based on the BSS color signaled by the PPDU, a method of setting the NAV by the wireless communication terminal will be described.

The wireless communication terminal may maintain two NAVs, that is, an Intra-BSS NAV set based on the PPDU identified as the Intra-BSS PPDU and a Basic NAV set based on the PPDU identified as the Inter-BSS PPDU. At this time, the wireless communication terminal may set the Basic NAV based on the PPDU that may not be identified as the Inter-BSS PPDU or the Intra-BSS PPDU. Specifically, the wireless communication terminal may maintain two NAVs through the following operations.

When the wireless communication terminal receives at least one valid frame from the PSDU and identifies the frame as an Intra-BSS frame, the wireless communication terminal may set the Intra-BSS NAV based on the valid Duration field value of the PSDU. In addition, when the wireless communication terminal receives at least one valid frame from the PSDU and identifies the frame as an Inter-BSS frame, the wireless communication terminal may set the Basic NAV based on the valid Duration field value of the PSDU. Also, when the wireless communication terminal receives at least one valid frame from the PSDU and may not determine the frame as an Intra-BSS frame or Inter-BSS frame, the wireless communication terminal may set the Basic NAV based on the valid Duration field value of the PSDU.

The wireless communication terminal receives the signaling field of the PPDU including the BSS identification information from the PPDU, and the wireless communication terminal may set two NAVs based on the BSS identification information that the signaling field of the PPDU signals. At this time, the PPDU may be the HE-PPDU, and the signaling field of the PPDU may be the HE-SIG-A field. In addition, the BSS identification information may be a BSS color. Also, the wireless communication terminal may set the NAV based on the TXOP Duration field of the HE-SIG-A field. Specifically, when the wireless communication terminal receives the signaling field of the PPDU including the BSS identification information from the PPDU and the BSS identification information that the signaling field of the PPDU signals is identified as Intra-BSS, the wireless communication terminal may set the Intra-BSS NAV based on the signaling field of the PPDU. Further, when the wireless communication terminal receives the signaling field of the PPDU including the BSS identification information from the PPDU, and the BSS identification information that the signaling field of the PPDU signals is identified as Inter-BSS, the wireless communication terminal may set the Basic NAV based on the signaling field of the PPDU.

When the Receiver Address RA of the frame received by the wireless communication terminal is the same as the MAC address of the wireless communication terminal, the wireless communication terminal may not set the Intra-BSS NAV or the Basic NAV from the Duration field of the corresponding frame. In addition, when the wireless communication terminal receives the valid signaling field of the PPDU from the PPDU and receives a valid PSDU from the corresponding PPDU, the wireless communication terminal may not set the Intra-BSS NAV or the Basic NAV based on the TXOP Duration field included in the signaling field of the corresponding PPDU.

When the value of the duration field of the frame identified as the Intra-BSS frame by the wireless communication terminal is larger than the value of the current Intra-BSS NAV, the wireless communication terminal may set the Intra-BSS NAV based on the value of the duration field of the frame. When the value of the Duration field of the frame in which the wireless communication terminal is not able to identify whether the frame is the Intra-BSS frame or the Inter-BSS frame is larger than the value of the current basic NAV, the wireless communication terminal may set the Basic NAV based on the Duration field value of the frame.

When the value of the TXOP Duration field of the signaling field of the PPDU identified by the wireless communication terminal as Intra-BSS PPDU is larger than the value of the current intra-BSS NAV, the wireless communication terminal may set the Intra-BSS NAV based on the TXOP Duration field value of the signaling field of the PPDU identified as the Intra-BSS PPDU. In addition, when the value of the TXOP Duration field of the signaling field of the PPDU identified by the wireless communication terminal as the Inter-BSS PPDU is larger than the value of the current basic NAV, the wireless communication terminal may set the Basic NAV based on the TXOP Duration field value of the signaling field of the corresponding PPDU.

When the wireless communication terminal receives the CF-End frame, the wireless communication terminal may reset the NAV. At this time, the wireless communication terminal may determine whether to reset the NAV according to the BSS from which the CF-End frame is transmitted. Specifically, the wireless communication terminal may reset the currently set NAV when the BSS from which the PPDU setting the currently set NAV is transmitted and the BSS from which the CF-End frame is transmitted are the same. Additionally, the wireless communication terminal may not reset the NAV when the BSS from which the PPDU setting the currently set NAV is transmitted and the BSS from which the CF-End frame is transmitted are different. In a specific embodiment, when the wireless communication terminal receives the CF-End frame from the BSS which does not correspond to the BSS indicated by the multiple BSSID set including Inter-BSS or the BSSID of the Intra-BSS, and the latest NAV is set by the PPDU transmitted from any of the BSSs indicated by the multiple BSSID set including the Intra-BSS or the BSSID of the Intra-BSS, the wireless communication terminal may not reset the NAV. In another specific embodiment, when the wireless communication terminal receives the CF-End frame from the BSS, which is one of the BSSs indicated by the multiple BSSID sets including the Intra-BSS or Intra-BSS BSSID and the most recent NAV is set by a PPDU that does not correspond to the BSS indicated by the set of multiple BSSIDs including the BSSID of the Inter-BSS or the Intra-BSS, the wireless communication terminal may not reset the NAV.

The trigger frame transmitted by the AP may trigger the uplink transmission of the wireless communication terminal receiving the trigger frame. At this time, the wireless communication terminal may start UL MU transmission based on the trigger frame without considering the NAV according to a certain condition. Specifically, when the NAV is set by the frame transmitted by the AP that transmitted the trigger frame, the wireless communication terminal may start the UL MU transmission based on the trigger frame without considering the NAV. Also, when the response to be transmitted by the wireless communication terminal includes an ACK frame or a Block ACK frame and the duration of the trigger-based PPDU is smaller than a predetermined value, the wireless communication terminal may start the UL MU transmission based on the trigger frame without considering the NAV. Further, when the NAV is set by a frame transmitted by another wireless communication terminal included in the Intra-BSS, the wireless communication terminal may start the UL MU transmission based on the trigger frame without considering the NAV. Also, when a field indicating whether or not channel sensing is required of the trigger frame indicates that channel sensing is not required, the wireless communication terminal may start the UL MU transmission based on the trigger frame without considering the NAV. Specifically, the field indicating whether or not the trigger frame requires channel sensing may be a CS Required field.

However, when NAV is set as in the above embodiments, BSS color collision may occur. The NAV setting and transmission operation of the wireless communication terminal may be a problem. This will be described with reference to FIGS. 8 to 9.

Figure 8:
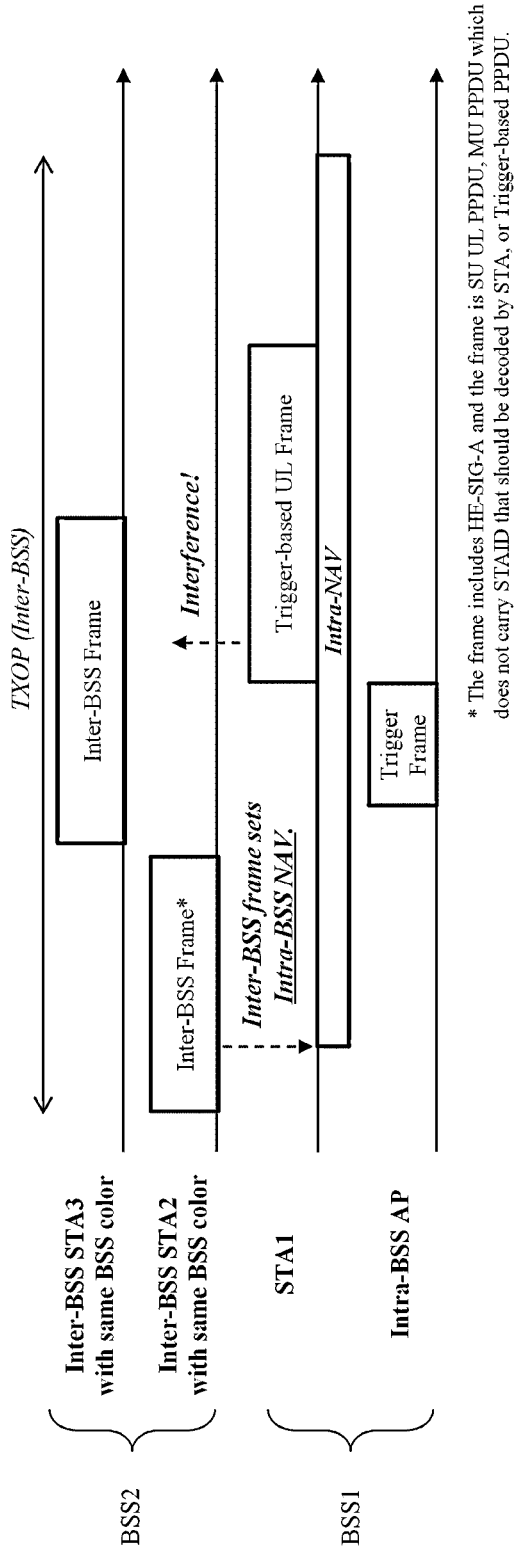
FIG. 8 shows the operation of setting a NAV by a wireless communication terminal according to an embodiment of the present invention when a BSS color collision occurs.

FIG. 8 shows the operation of setting a NAV by a wireless communication terminal according to an embodiment of the present invention when a BSS color collision occurs.

In the embodiment of FIG. 8, the BSS color of the first BSS BSS1 including the first station STA1 and the BSS color of the second BSS BSS2 including the second station STA2 and the third station STA3 are the same. The first station STA1 receives the Inter-BSS frame transmitted by the second station STA2 included in the first BSS BSS1. At this time, the station STA identifies the Inter-BSS frame as an Intra-BSS frame based on the BSS color indicated by the HE-SIG-A field of the PPDU including the Inter-BSS frame. The first station STA1 sets the Intra-BSS NAV according to the value of the TXOP Duration field of the signaling field of the PPDU including the Inter-BSS frame. Then, the first station STA1 receives the trigger frame from the Intra-BSS AP of the Intra-BSS. As described above, when the NAV is set by a frame transmitted by another wireless communication terminal included in the Intra-BSS, the wireless communication terminal may start the UL MU transmission based on the trigger frame without considering the NAV. Therefore, the first station STA1 may start the uplink transmission based on the trigger frame transmitted by the AP of the first BSS BSS1. At this time, since the frame is being transmitted from the third station STA3 to the second station STA2, interference occurs in the second BSS BSS2 due to a Trigger-based UL Frame based on the trigger frame transmitted by the first station STA1. Therefore, there is a need for a method of operating a wireless communication terminal capable of minimizing the influence of a BSS color collision when the BSS color collision occurs. For example, in the embodiment of FIG. 8, when the first station STA1 sets the Basic NAV instead of the Intra-BSS NAV based on the frame transmitted by the second station STA2, it is possible to prevent interference occurring in the second BSS BSS2 by transmission of the first station STA1. This will be described with reference to FIG. 9.

Figure 9:
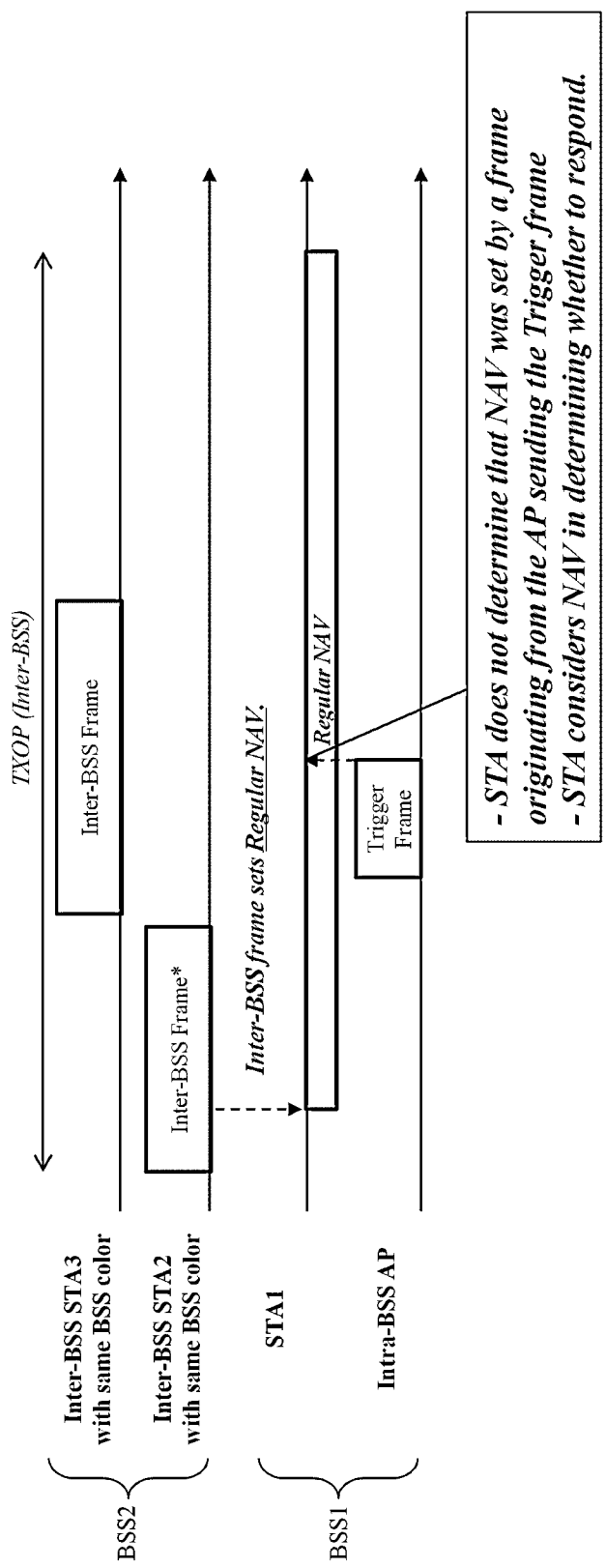
FIG. 9 shows a NAV setting operation of a wireless communication terminal according to another embodiment of the present invention when a BSS color collision occurs.

FIG. 9 shows a NAV setting operation of a wireless communication terminal according to another embodiment of the present invention when a BSS color collision occurs.

When the wireless communication terminal is not able to identify whether the PPDU is the Intra-BSS PPDU or the Inter-BSS PPDU based on the BSS color value indicated by the signaling field of the PPDU, the wireless communication terminal may not set the intra-BSS NAV based on the TXOP Duration field indicated by the signaling field of the PPDU. As described above, the BSS color that the PPDU signals may be the BSS color that the BSS color field of the PPDU signals. Specifically, the BSS color that the PPDU signals may be the BSS color that the BSS color field of the HE-SIG-A of the PPDU signals. Specifically, when the wireless communication terminal may not determine whether the PPDU is the Intra-BSS PPDU or the Inter-BSS PPDU based on the BSS color value indicated by the signaling field of the PPDU, the wireless communication terminal may recognize the BSS color collision. Also, when the wireless communication terminal is not able to identify whether the PPDU is the Intra-BSS PPDU or the Inter-BSS PPDU based on the BSS color value indicated by the signaling field of the PPDU and other parameters and other conditions of the RXVECTOR, the wireless communication terminal may not set the Intra-BSS NAV based on the TXOP Duration field indicated by the signaling field of the PPDU. In a specific embodiment, when the wireless communication terminal is not able to identify whether the PPDU is the Intra-BSS PPDU or the Inter-BSS PPDU based on the BSS color value indicated by the signaling field of the PPDU, the wireless communication terminal may set the Basic NAV based on the TXOP Duration field indicated by the signaling field of the PPDU. At this time, when the wireless communication terminal is not able to identify whether the PPDU is the Intra-BSS PPDU or the Inter-BSS PPDU based on the BSS color value indicated by the signaling field of the PPDU and other parameters and other conditions of the RXVECTOR, the wireless communication terminal may set the Basic NAV based on the TXOP Duration field indicated by the signaling field of the PPDU. That is, when the wireless communication terminal is not able to identify whether the PPDU received is the Intra-BSS PPDU or the Inter-BSS PPDU, the wireless communication terminal may set the Basic NAV based on the PPDU. Specifically, when the PPDU received by the wireless communication terminal may not be identified as Intra-BSS PPDU or Inter-BSS PPDU, the wireless communication terminal may set the Basic NAV based on the TXOP Duration field of the corresponding PPDU. At this time, the TXOP Duration field of the PPDU may be the TXOP Duration field of the HE-SIG-A field.

Also, when the wireless communication terminal is not able to identify whether the PPDU is the Intra-BSS PPDU or the Inter-BSS PPDU based on the BSS color value indicated by the signaling field of the PPDU and is able to identify whether the PPDU is an Intra-BSS PPDU or an Inter-BSS PPDU based on other parameters and other conditions of the RXVECTOR, the wireless communication terminal may set Intra-BSS NAV or Basic NAV based on other parameters or other conditions of the RXVECTOR. A case where the corresponding PPDU is not identified, based on other parameters and other conditions of the RXVECTOR, as Intra-BSS PPDU or Inter-BSS PPDU may include a case where the MAC frame included in the PPDU is not decoded. Also, a case where the corresponding PPDU is not identified, based on other parameters and other conditions of the RXVECTOR, as Intra-BSS PPDU or Inter-BSS PPDU may include a case where the corresponding PPDU is not identified as Intra-BSS PPDU or Inter-BSS PPDU through at least one of the format and use of the PPDU. The wireless communication terminal may prevent interference with transmission in the OBSS, which may occur with BSS color collision, through these embodiments.

In the embodiment of FIG. 9, the BSS color of the first BSS BSS1 including the first station STA1 and the BSS color of the second BSS BSS2 including the second station STA2 and the third station STA3 are the same. At this time, the first station STA1 may determine that the PPDU may not be identified whether the PPDU is the Intra-BSS PPDU or the Inter-BSS PPDU based on the BSS color value indicated by the HE-SIG-A field of the PPDU. For example, the first station STA1 may determine that a BSS color collision occurs. The first station STA1 receives the Inter-BSS frame transmitted by the second station STA2 included in the first BSS BSS1. However, since the first station STA1 may not be able to identify whether the PPDU is the Intra-BSS PPDU or the Inter-BSS PPDU based on the BSS color value indicated by the signaling field of the PPDU, the first station STA1 sets a Basic NAV. Therefore, since the Basic NAV is set even when the first station STA1 receives the trigger frame from the AP of the first BSS BSS1, the first station STA1 does not start the uplink transmission based on the trigger.

As described above, when the wireless communication terminal maintains two NAVs, the wireless communication terminal may reset the NAV according to the BSS in which the CF-End frame is transmitted and the BSS in which the frame that sets the NAV is transmitted. Therefore, when the BSS color collision occurs, the operation of the wireless communication terminal may be problematic when the NAV is reset through the CF-End frame. This will be described with reference to FIGS. 10 and 11.

Figure 10:
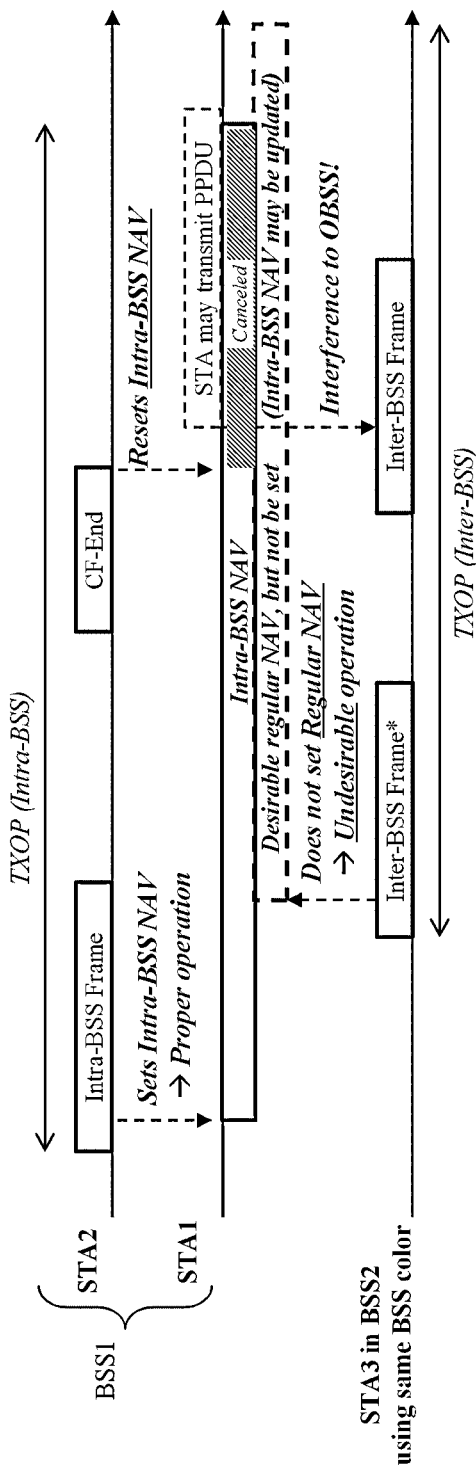
FIG. 10 shows an operation of a wireless communication terminal according to an embodiment of the present invention to determine whether to reset a NAV based on a CF-End frame when a BSS color collision occurs.

FIG. 10 shows an operation of a wireless communication terminal according to an embodiment of the present invention to determine whether to reset a NAV based on a CF-End frame when a BSS color collision occurs.

In the embodiment of FIG. 10, the first station STA1 and the second station STA2 are included in the first BSS BSS1. The third station STA3 is included in the second BSS BSS2. At this time, a BSS color collision occurs from which the first BSS BSS1 and the second BSS BSS2 use the same BSS color. The first station STA1 receives a frame (Intra-BSS Frame) from the second station STA2. The first station STA1 sets the intra-BSS NAV based on the frame transmitted from the second station STA2. Also, the first station STA1 receives a frame (Inter-BSS Frame) from the third station STA3. However, since the first BSS BSS1 and the second BSS BSS2 have the same BSS color, the first station STA1 identifies the frame received from the third station STA3 as an Intra-BSS frame. Therefore, the first station STA1 sets the intra-BSS NAV based on the frame received from the third station STA3. However, when the value of the Duration field indicated by the frame received from the third station STA3 is smaller than the value of the currently set NAV, the first station STA1 does not set the intra-BSS NAV. Then, the first station STA1 receives the CF-End frame from the second station STA2. The first station STA1 resets the Intra-BSS NAV based on the CF-End frame received from the second station STA2. Thereafter, the first station STA1 may transmit a frame even while attempting the transmission of the third station STA3. Therefore, the transmission of the first station STA1 may collide with the transmission of the third station STA3.

The problems described in the embodiment of FIG. 10 may be solved through the embodiments described with reference to FIG. 10. However, even if the embodiments described with reference to FIG. 9 are followed, the operation of the wireless communication terminal receiving the CF-End frame may be a problem. This will be described with reference to FIG. 11.

Figure 11:
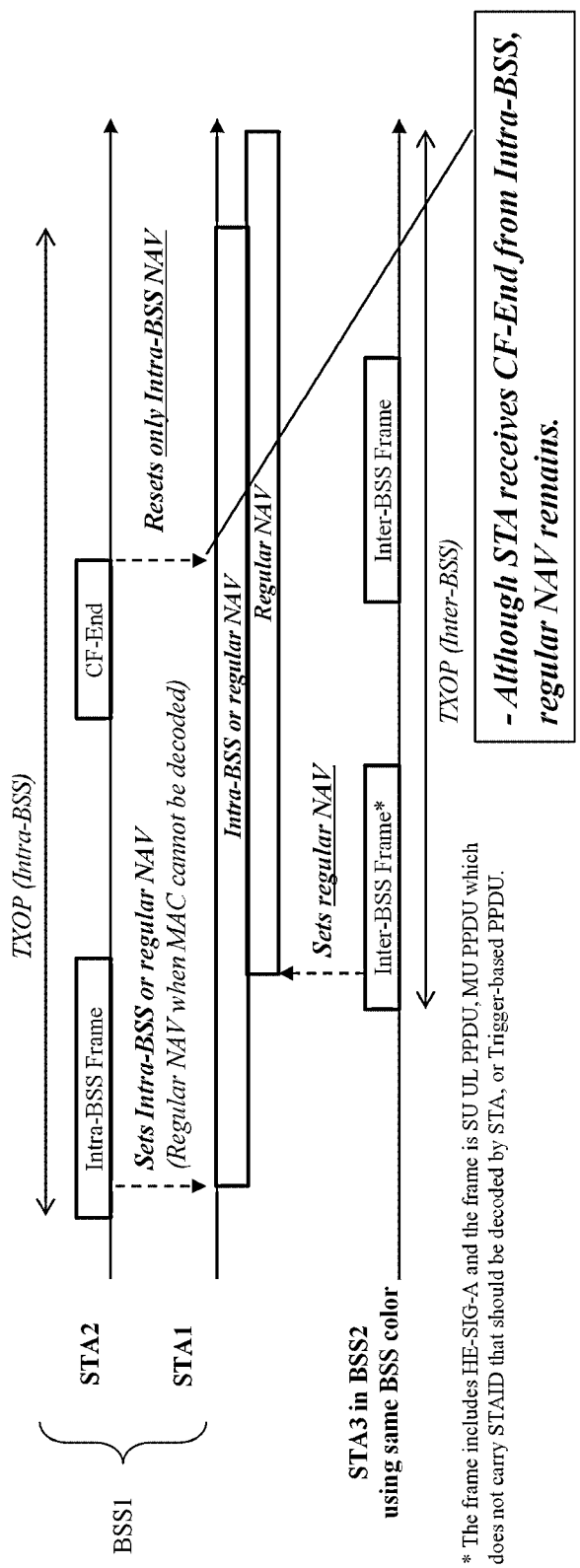
FIG. 11 shows an operation of a wireless communication terminal according to another embodiment of the present invention to determine whether to reset a NAV based on a CF-End frame when a BSS color collision occurs.

FIG. 11 shows an operation of a wireless communication terminal according to another embodiment of the present invention to determine whether to reset a NAV based on a CF-End frame when a BSS color collision occurs.

As described above, the wireless communication terminal may determine whether to reset the NAV according to the BSS in which the CF-End frame is transmitted. Specifically, the wireless communication terminal may reset the currently set NAV when the BSS from which the PPDU setting the currently set NAV is transmitted and the BSS from which the CF-End frame is transmitted are the same. Additionally, the wireless communication terminal may not reset the NAV when the BSS from which the PPDU setting the currently set NAV is transmitted and the BSS from which the CF-End frame is transmitted are different.

Also, when the NAV is set by the PPDU that is not identified whether the PPDU is the Intra-BSS PPDU or the Inter-BSS PPDU based on the BSS color value indicated by the signaling field of the PPDU, the wireless communication terminal may not reset the NAV based on the CF-End frame transmitted from the Intra-BSS. Also, when the NAV is set by the PPDU that is not identified whether the PPDU is the Intra-BSS PPDU or the Inter-BSS PPDU based on the BSS color value indicated by the signaling field of the PPDU, the wireless communication terminal may not reset the NAV based on the CF-End frame transmitted from the BSS corresponding to the multiple-BSSID set including the BSSID corresponding to the BSS of the wireless communication terminal. Through this embodiment, the wireless communication terminal may prevent interference with transmission in the OBSS, which is caused by BSS color collision. In addition, as described above, the BSS color that the PPDU signals may be the BSS color that the BSS color field of the PPDU signals. Specifically, the BSS color that the PPDU signals may be the BSS color that the BSS color field of the HE-SIG-A of the PPDU signals.

As described above, a case where the wireless communication terminal is not be able to identify whether the PPDU is the Intra-BSS PPDU or the Inter-BSS PPDU based on the BSS color value indicated by the signaling field of the PPDU may include a case where the wireless communication terminal recognizes a BSS color collision. A method of determining whether a wireless communication terminal collides with a BSS color will be described in detail with reference to FIG. 12.

Figure 12:
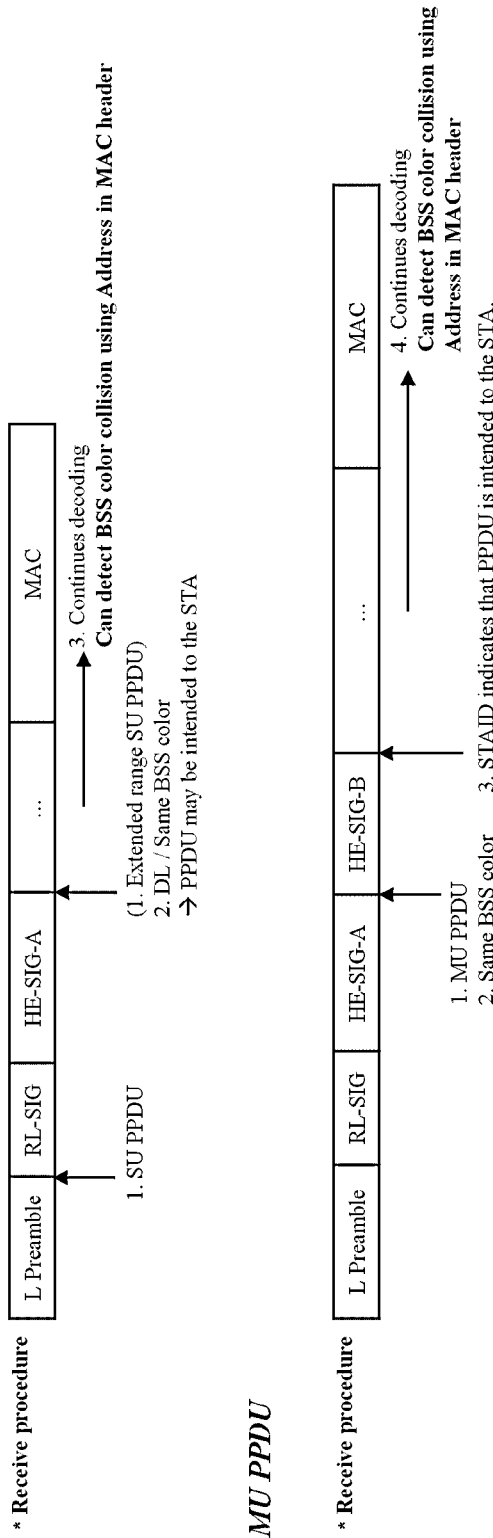
FIG. 12 shows an operation of a wireless communication terminal recognizing a BSS color collision according to an embodiment of the present invention.

FIG. 12 shows an operation of a wireless communication terminal recognizing a BSS color collision according to an embodiment of the present invention.

The wireless communication terminal may determine the BSS color collision based on the MAC header. Specifically, the wireless communication terminal may determine the BSS color collision based on the Address field of the MAC header. In a specific embodiment, if there are two or more MAC address fields in the MAC header, at least one of the MAC address fields corresponds to the BSSID of the Intra-BSS, or at least one of the MAC address fields corresponds to a multiple BSSID set in the BSSID including the BSSID of the Intra-BSS, the wireless communication terminal may determine the corresponding PPDU as an Intra-BSS PPDU. This is because in case of BSS color, collision may occur due to size limitation of BSS color field but the MAC address indicated by the Address field of the MAC header is a unique value for each wireless communication terminal and there is no possibility of collision.

However, the wireless communication terminal may determine that the destination of the MAC frame included in the PPDU is not the wireless communication terminal based on at least one of the signaling field of the PPDU and the PPDU format, and may not decode the MAC header. Specifically, when the non-AP wireless communication terminal receives the HE Single User (SU) PPDU, the BSS color indicated by the signaling field of the corresponding PPDU is equal to the BSS color of the Intra-BSS, and the corresponding PPDU is the downlink transmission PPDU, the non-AP wireless communication terminal may continue decoding. At this time, the non-AP wireless communication terminal may determine that the corresponding PPDU is an SU PPDU through L-SIG signaling. Also, the non-AP wireless communication terminal may determine that the corresponding PPDU is an extended range SU PPDU based on the L-SIG signaling and the HE-SIG-A modulation method. Also, the non-AP wireless communication terminal may determine whether the corresponding PPDU is a PPDU for downlink transmission based on the DL/UL field of the HE-SIG-A field.

However, when the PPDU received by the non-AP wireless communication terminal is an uplink transmission PPDU, the non-AP wireless communication terminal may not decode the MAC frame included in the corresponding PPDU. This is because it is clear that the PPDU is a PPDU for uplink transmission and that the destination of the PPDU is not a non-AP wireless communication terminal. Also, when the PPDU received by the non-AP wireless communication terminal is an MU PPDU and the identifier of the non-AP wireless communication terminal is not included in the wireless communication terminal identifier (STAID) field of the signaling field of the PPDU, the non-AP wireless communication terminal may not decode the MAC frame included in the corresponding PPDU. At this time, the signaling field of the PPDU may be HE-SIG-B. Also, a case where the wireless communication terminal identifier (STAID) field of the signaling field of the PPDU does not include the identifier of the non-AP wireless communication terminal may include a case where the wireless communication terminal (STAID) field of the signaling field of the PPDU does not include a broadcast address/multicast address including a non-AP wireless communication terminal.

The non-AP wireless communication terminal may decode the MAC frame included in the corresponding PPDU even when it is clear that the destination of the MAC frame included in the PPDU is not a wireless communication terminal. Specifically, even when the destination of the MAC frame included in the PPDU is not a wireless communication terminal, the non-AP wireless communication terminal may decode the header of the MAC frame included in the PPDU. Specifically, a case where it is clear that the destination of the MAC frame included in the PPDU is not the wireless communication terminal may include a case where the corresponding PPDU described above is a HE Single User (SU) PPDU, the BSS color indicated by the signaling field of the corresponding PPDU is the same as the BSS color of the Intra-BSS, and the corresponding PPDU is a downlink PPDU. In addition, a case where it is clear that the destination of the MAC frame included in the PPDU is not the wireless communication terminal may include a case where as described above, the identifier of the non-AP wireless communication terminal is not included in the wireless communication terminal identifier (STAID) field of the signaling field of the PPDU.

When the wireless communication terminal is not be able to identify whether the PPDU is the Intra-BSS PPDU or the Inter-BSS PPDU based on the BSS color value indicated by the signaling field of the PPDU, the other wireless communication terminals may not identify whether the PPDU transmitted from the corresponding BSS is the Intra-BSS PPDU or the Inter-BSS PPDU, so that it may malfunction. In addition, another wireless communication terminal is not able to identify whether the PPDU transmitted by the wireless communication terminal is the Intra-BSS PPDU or the Inter-BSS PPDU, so that the PPDU transmitted by the wireless communication terminal may cause malfunction of other wireless communication terminals. In order to prevent such a malfunction problem, the wireless communication terminal may operate as in the following embodiments.

Specifically, the wireless communication terminal may transmit the PPDU by including signaling information indicating that the operation based on the BSS color is not allowed in the signaling field of the PPDU. At this time, the wireless communication terminal receiving the PPDU including the signaling information indicating that the operation based on the BSS color is not allowed may not perform the operation based on the BSS color. In a specific embodiment, the wireless communication terminal may transmit the BSS color value indicated by the signaling field of the PPDU by setting it to a predetermined value. At this time, the predetermined value may be a reserved value which is not used in the BSS color when the BSS color is selected by the AP. For example, the predetermined value may be zero.

Further, when the wireless communication terminal receives the signaling information indicating that the operation based on the BSS color is not allowed, the wireless communication terminal may not perform the operation based on the BSS color value. Specifically, when the BSS color value indicated by the signaling field of the PPDU received by the wireless communication terminal is a predetermined value, the wireless communication terminal may not perform the SR operation described above based on the BSS color value. In addition, the wireless communication terminal may transmit the PPDU by including the signaling information in the signaling field of the PPDU indicating that operation based on the BSS color is not allowed through the legacy PPDU. Specifically, the wireless communication terminal may transmit signaling information indicating that the operation based on the BSS color is not allowed even by using the BW signaling method of the MAC address or using the reserved bit of the MAC header.

In addition, when the wireless communication terminal receives the PPDU indicating the predetermined value in the BSS color, the wireless communication terminal may not perform the operation based on the BSS color. Specifically, when the wireless communication terminal receives a PPDU indicating a predetermined value as a BSS color, the wireless communication terminal may not perform the SR operation on the corresponding PPDU. In a specific embodiment, when the wireless communication terminal receives a PPDU indicating a predetermined value as a BSS color, the wireless communication terminal may treat the PPDU as an Intra-BSS PPDU. Accordingly, when the wireless communication terminal receives a PPDU indicating a predetermined value as a BSS color, the wireless communication terminal may not discard the corresponding PPDU.

In addition, the wireless communication terminal receiving the signaling information indicating that the operation based on the BSS color is not allowed may access the channel without using the SR operation. Specifically, the wireless communication terminal receiving the signaling information indicating that the operation based on the BSS color is not allowed may access the channel without using the BSS color value.

Even if the non-AP wireless communication terminal that does not receive the signaling signal for the BSS color arbitrarily selects the BSS color, this may cause the malfunction of the wireless communication terminal operating based on the BSS color. There is a need for a method to prevent this.

An AP operating a BSS may select a BSS color corresponding to the BSS. The non-AP wireless communication terminal may obtain the BSS color allocated to the non-AP wireless communication terminal from the BSS Color field included in the HE Operation element received from the AP. Specifically, the non-AP wireless communication terminal may receive the management frame from the AP associated with the non-AP wireless communication terminal, and obtain the BSS color allocated to the non-AP wireless communication terminal from the BSS Color field of the HE Operation element included in the received management frame. At this time, the management frame may be any one of a beacon frame, an association request frame, an association response frame, a reassociation request frame, a reassociation response frame, a probe request frame, and a probe response frame.

When the non-AP wireless communication terminal fails to receive information signaling the BSS color, the non-AP wireless communication terminal may use a predetermined value as a BSS color value when communicating with another wireless communication terminal. At this time, the predetermined value may be a reserved value which is not used in the BSS color when the BSS color is selected by the AP. For example, the predetermined value may be zero. Specifically, if the non-AP wireless communication terminal does not receive the information signaling the BSS color, the non-AP wireless communication terminal may set the BSS color value that the PPDU transmitted by the non-AP wireless communication terminal signals to a predetermined value. Also, when the non-AP wireless communication terminal fails to receive information signaling the BSS color, the non-AP wireless communication terminal may set the BSS color value which is signaled by the frame transmitted by the non-AP wireless communication terminal to a predetermined value. When the non-AP wireless communication terminal does not receive information signaling the BSS color, this is because there is no BSS color. Specifically, when the non-AP wireless communication terminal does not receive the information signaling the BSS color, the non-AP wireless communication terminal may not associate with any AP. In addition, a case where the non-AP wireless communication terminal does not receive the information signaling the BSS color may include a case where the non-AP wireless communication terminal may establish a tunneled direct link setup (TDLS) link, a direct link setup (DLS) link, or an IBSS (Independent) membership. Also, a case where the non-AP wireless communication terminal does not receive information signaling the BSS color may include a case where the non-AP wireless communication terminal does not receive the information on the changed BSS color value after receiving the signaling information indicating that the operation based on the BSS color value is not allowed from the AP.

In a specific embodiment, when the non-AP wireless communication terminal fails to receive the HE Operation element, the non-AP wireless communication terminal may set the BSS color value included in the PPDU transmitted by the non-AP wireless communication terminal to a predetermined value. For example, the non-AP wireless communication terminal may use a predetermined value as a BSS color value when transmitting a probe request frame. Specifically, the non-AP wireless communication terminal may set the value of the BSS color field included in the HE Operation element to a predetermined value when transmitting a probe request frame. When transmitting the probe request frame, the non-AP wireless communication terminal may set the value of the BSS color field of the HE-SIG-A field of the PPDU including the probe request frame to a predetermined value.

In another specific embodiment, when transmitting a PPDU to a wireless communication terminal of an Inter-BSS, the wireless communication terminal may set a BSS color value indicated by the PPDU to a predetermined value. There is a high possibility that the wireless communication terminal may not know the BSS color of the Inter-BSS. In addition, this is because the wireless communication terminal of the Inter-BSS may ignore the PPDU indicating the BSS color of the BSS including the wireless communication terminal.

In addition, when the wireless communication terminal receives the PPDU indicating the predetermined value as the BSS color, the wireless communication terminal may not perform the operation based on the BSS color. Specifically, when the wireless communication terminal receives a PPDU indicating a predetermined value as a BSS color, the wireless communication terminal may not perform the SR operation on the corresponding PPDU. In a specific embodiment, when the wireless communication terminal receives a PPDU indicating a predetermined value as a BSS color, the wireless communication terminal may treat the PPDU as an Intra-BSS PPDU. Accordingly, when the wireless communication terminal receives a PPDU indicating a predetermined value as a BSS color, the wireless communication terminal may not discard the corresponding PPDU.

The non-legacy PPDU includes a signaling field indicating a BSS color, e.g., a HE-SIG-A field, and the wireless communication terminal may perform various SR operations described above based on the signaling field indicating the BSS color. However, the legacy PPDU does not include a signaling field that indicates the BSS color. Therefore, the wireless communication terminal receiving the legacy PPDU must perform the SR operation based on the MAC frame included in the PPDU. However, there is a MAC frame including only a Receiver Address RA without including a Transmitter Address TA. When an operation based on BSS color may not be performed because a MAC frame including only a receiver address is transmitted via a legacy PPDU or a BSS color collision occurs, the SR operation for the MAC frame including only the receiver address may be a problem. An embodiment of the wireless communication terminal related thereto will be described with reference to FIG. 13 and FIG. 14.

Figure 13:
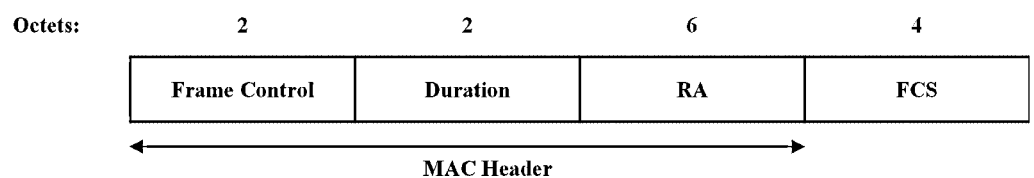
FIG. 13 shows a MAC frame format of a Clear To Send (CTS) frame and an ACK frame according to an embodiment of the present invention.
Figure 14:
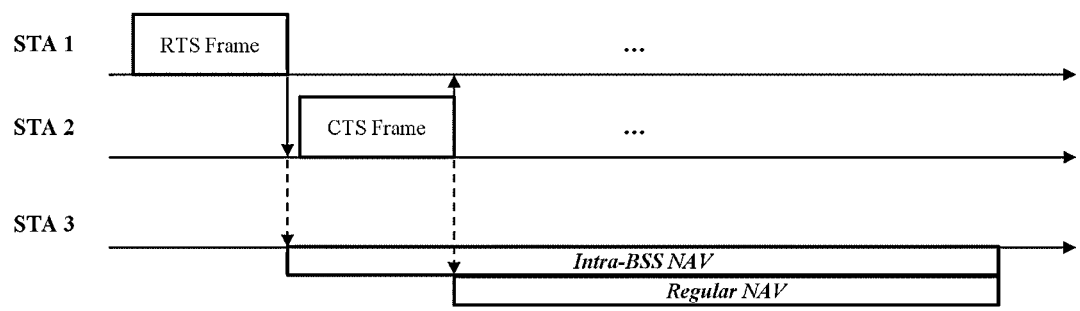
FIG. 14 shows an operation in which a wireless communication terminal according to an embodiment of the present invention sets a NAV based on an RTS frame and a CTS frame.

FIG. 13 shows a MAC frame format of a Clear To Send (CTS) frame and an ACK frame according to an embodiment of the present invention. FIG. 14 shows an operation in which a wireless communication terminal according to an embodiment of the present invention sets a NAV based on an RTS frame and a CTS frame.

The MAC frame of the CTS frame and the ACK frame may include a Frame Control field including information on frame control. In addition, the MAC frame of the CTS frame and the ACK frame may include a duration field used for NAV setting. In addition, the MAC frame of the CTS frame and the ACK frame may include an RA field indicating a receiver address. In addition, the MAC frame of the CTS frame and the ACK frame may include an FCS field indicating whether the MAC frame includes an error.

The RA field of the CTS frame may be set based on the TA field of the RTS frame. Specifically, the value of the TA field of the RA field RTS frame of the CTS frame may be a value that sets the Individual/Group bit to zero. Also, when the CTS frame is the first frame of the transmission sequence, the RA field may be set to the MAC address of the transmitter.

The RA field of the ACK frame may be set based on the Address 2 field of a data frame, a management frame, a BlockACKReq frame, a BlockACK frame, or a PS-Poll frame, which is transmitted to one wireless communication terminal. Specifically, the RA field of the ACK frame may set the Address 2 field value of a data frame, a management frame, a BlockACKReq frame, a BlockACK frame, or a PS-Poll frame, which is transmitted to one wireless communication terminal, to the non-bandwidth signaling TA value. Also, the RA field of the ACK frame may be set to the MAC address of the receipient.

When the wireless communication terminal may not determine whether the frame is an Intra-BSS frame or an Inter-BSS frame based on the CTS frame or the Address field of the ACK frame, the wireless communication terminal may set the Basic NAV based on the corresponding frame. Specifically, when the wireless communication terminal may not determine whether the frame is an Intra-BSS frame or an Inter-BSS frame based on a PPDU including a CTS frame or an ACK frame and may not determine whether the frame is an Intra-BSS frame or an Inter-BSS frame based on the CTS frame or the Address field of the ACK frame, the wireless communication terminal may set the Basic NAV based on the frame. Also, the case where the wireless communication terminal may not determine whether the frame is an Intra-BSS frame or an Inter-BSS frame based on the CTS frame or the Address field of the ACK frame may be a case where the address field of the CTS frame or the ACK frame is one, and the corresponding address field does not indicate the AP address or the BSSID. In a specific embodiment, the non-AP wireless communication terminal may receive a downlink (DL) CTS frame. At this time, the address field of the corresponding CTS frame may include the address of the non-AP wireless communication terminal and may not include the address or the BSSID of the wireless communication terminal that is the AP. Accordingly, the wireless communication terminal receiving the corresponding CTS frame may not determine whether the corresponding CTS frame is an Inter-BSS frame or an Intra-BSS frame based on the Address field of the corresponding CTS frame. Also, when the wireless communication terminal may not determine whether the frame is an Intra-BSS frame or an Inter-BSS frame based on a PPDU including a CTS frame or an ACK frame, the corresponding PPDU may be a legacy PPDU. This is because the legacy PPDU may not include information indicating the BSS color. In addition, a case where the wireless communication terminal may not be able to determine whether the frame is an Intra-BSS frame or an Inter-BSS frame based on a PPDU including a CTS frame or an ACK frame may be a case where the wireless communication terminal may not be able to determine whether the frame is an Intra-BSS frame or an Inter-BSS frame based on the BSS color indicated by the signaling field of the corresponding PPDU as in the above-described embodiments.

In another specific embodiment, when the wireless communication terminal receives one frame, the wireless communication terminal may set the Basic NAV based on the frame regardless of the value of the address field of the frame. For example, when receiving a downlink (DL) CTS frame or an uplink (UL) CTS frame, the wireless communication terminal may set a Basic NAV based on the frame.

Also, when the wireless communication terminal maintains one NAV, the wireless communication terminal may regard that the NAV set by the corresponding frame is not set by the Intra-BSS frame, instead of setting the Basic NAV based on the corresponding frame in the above-described embodiments. Specifically, when the wireless communication terminal may not determine whether the frame is an Intra-BSS frame or an Inter-BSS frame based on the CTS frame or the Address field of the ACK frame, the wireless communication terminal may regard that the NAV set on the basis of the frame is not set by the Intra-BSS frame. In addition, when the wireless communication terminal receives one frame, the wireless communication terminal may regard that the NAV set based on the frame is not set by the Intra-BSS frame regardless of the value of the address field of the frame.

In the embodiment of FIG. 14, the first to third stations STA1 to STA3 are all included in the same BSS. The first station STA1 transmits the RTS frame and the second station STA2 transmits the CTS frame in response to the RTS frame. The third station STA3 sets the Intra-BSS NAV based on the RTS frame. Since the address field of the CTS frame transmitted by the second station STA2 includes only the address of the first station STA1, the third station STA3 may not clearly determine whether the CTS frame transmitted by the second station STA2 is transmitted from the Intra-BSS frame. Therefore, the third station STA3 sets the basic NAV based on the CTS frame transmitted by the second station STA2 as in some embodiments described above.

At this time, when the third station STA3 receives the CF-End frame transmitted from the first station STA1 or the second station STA2, the third station STA3 identifies the received CF-End frame as an Intra-BSS frame. Therefore, even if the third station STA3 receives the CF-End frame transmitted from the first station STA1 or the second station STA2, the third station STA3 resets only the intra-NAV based on the received CF-End frame, and the basic NAV is maintained. When the third station STA3 does not receive the RTS frame but receives the CF-End frame from the Inter-BSS in a state where only the CTS frame is received, the third station STA3 may initiate transmission during the transmission procedure of the first station STA1 and the second station STA2 to cause interference.

To solve this problem, the wireless communication terminal may transmit a PPDU including only one address field in a format of a PPDU signaling a BSS color. However, when the PPDU signaling the BSS color is transmitted, the legacy wireless communication terminal may not decode the PPDU. Also, the wireless communication terminal may infer the BSS of the CTS frame and the ACK frame from the frame transmitted before the CTS frame or ACK frame. For this, there is a problem that a wireless communication terminal may be required to receive a previously transmitted frame and store information on the received frame. Therefore, the wireless communication terminal may transmit information identifying the BSS through the legacy PPDU. This will be described with reference to FIGS. 15 to 17.

Figures 15, 16:
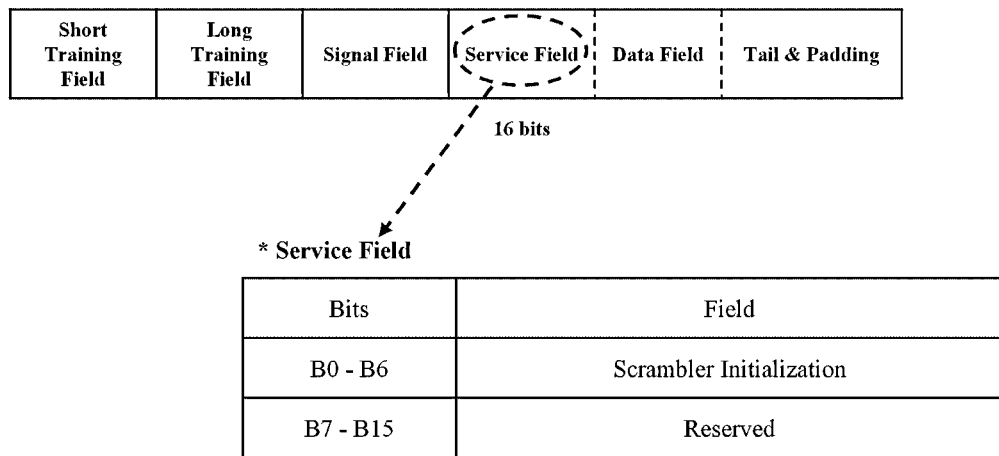
FIG. 15 shows a format of an 802.11a PPDU according to an embodiment of the present invention.
FIG. 16 shows a format of a service field of a PPDU according to an embodiment of the present invention.

FIG. 15 shows a format of an 802.11a PPDU according to an embodiment of the present invention.

The 802.11a PPDU includes a Short Training field including a relatively short training signal, a Long Training field including a relatively long training signal, a Signal field including signaling information, and a Data field including data. The data field may include a Service field, a PSDU, and a tail bit. The data field may also include a Padding bit as needed. Specifically, the format of the 802.11a PPDU may be the same as that of FIG. 15.

At this time, the wireless communication terminal may transmit information identifying the BSS using the service field. Specifically, the wireless communication terminal may transmit information identifying the BSS using the reserved bits of the service field. Specifically, the bits from the first bit B0 to the seventh bit B6 of the service field may be scrambler initialization bits. The remaining nine bits except the scrambler initialization bit are reserved. Therefore, the wireless communication terminal may transmit information identifying the BSS using part or all of the nine reserved bits.

Further, the information identifying the BSS may be any one of a BSS color, a BSSID, and a partial BSS color. In addition, the information identifying the BSS may be a partial AID generated based on the BSS color. In addition, the information identifying the BSS may be part of the BSSID or information generated based on the BSSID. At this time, the information generated based on the BSSID may be a value obtained by calculating a partial value of the BSSID or a value obtained by calculating the BSSID.

The wireless communication terminal may also transmit information identifying a BSS through a field other than a service field according to another specific embodiment. Specifically, the wireless communication terminal may transmit information identifying the BSS through a signal field.

Further, the wireless communication terminal may transmit information identifying the BSS by combining a plurality of reserved fields.

In these embodiments, the wireless communication terminal receiving the PPDU may obtain information identifying the BSS based on the reserved field of the PPDU. In addition, the wireless communication terminal receiving the PPDU may determine whether the corresponding PPDU is the Inter-BSS PPDU or the Intra-BSS PPDU based on the obtained information identifying the BSS.

FIG. 16 shows a format of a service field of a PPDU according to an embodiment of the present invention.

As described with reference to FIG. 15, the wireless communication terminal may transmit information identifying the BSS using the reserved bits of the service field. Specifically, the wireless communication terminal may transmit information identifying the BSS using the eighth bit B7 to the thirteenth bit B12 of the service field. Since the reserved bits are used in the embodiments described with reference to FIG. 15 to FIG. 16, a legacy wireless communication terminal that does not support the embodiment of the present invention may not decode information identifying the BSS, but may successfully receive a PPDU according to an embodiment of the present invention.

The wireless communication terminal may apply the embodiment described with reference to FIG. 15 to FIG. 16 when the address field of the MAC frame is one. However, the embodiment described with reference to FIGS. 15 to 16 is not limited thereto, and the wireless communication terminal may also apply the embodiments described with reference to FIGS. 15 to 16 even when the number of address fields of the MAC frame is two or more.

FIG. 17 shows an operation of setting a NAV according to an embodiment of FIG. 15 to FIG. 16 by a wireless communication terminal according to an embodiment of the present invention.

In the embodiment of FIG. 17, the first to third stations STA1 to STA3 are all included in the same BSS. The first station STA1 transmits the RTS frame and the second station STA2 transmits the CTS frame in response to the RTS frame. The third station STA3 sets the Intra-BSS NAV based on the RTS frame. The address field of the CTS frame transmitted by the second station STA2 includes only the address of the first station STA1, but as in the embodiments described with reference to FIGS. 15 to 16, the reserved field of the PPDU including the CTS frame transmitted by the second station STA2 includes information identifying the BSS. At this time, the reserved field may be the reserved bit in the service field. The third station STA3 obtains information identifying the BSS based on the reserved field. The third station STA3 may set the Intra-BSS NAV based on the information identifying the BSS. In the embodiment of FIG. 17, the third station STA3 does not set the value of Intra-BSS NAV because the value of the Intra-BSS NAV already set is equal to the value of NAV indicated by the duration field of the CTS frame.

Therefore, the third station STA3 may correctly set the intra-BSS NAV and the basic NAV even when the address field of the MAC frame is one. Thereafter, when the third station STA3 receives the CF-End frame from the Intra-BSS, the third station STA3 may reset the Intra-BSS NAV. In addition, when the third station STA3 receives the CF-End frame from the Inter-BSS, the third station STA3 may not reset the Intra-BSS NAV.

FIG. 18 shows a method of setting a partial AID and a Group ID field of VHT-SIG-A by a wireless communication terminal according to an embodiment of the present invention.

The VHT-SIG-A field may include a partial AID field and a Group ID field. The partial AID field may indicate information identifying the connection between the AP and the wireless communication terminal and information identifying the BSS. Specifically, the partial AID field of the PPDU transmitted to the AP may indicate the BSSID of the AP. Also, the partial AID field of the PPDU transmitted to the non-AP wireless communication terminal may be an identifier obtained by combining the AID of the non-AP wireless communication terminal and the BSSID of the AP associated with the non-AP wireless communication terminal. Also, when the PPDU is transmitted to the mesh station, the value of the partial AID field may be a value corresponding to the last 9 bits of the receiver address. In a specific embodiment, the partial AID field may be a 9-bit field.

The Group ID field may indicate whether the data in the data field is for multiple user (MU). Specifically, when the data of the data field is for a single user (SU), the value of the Group ID field may be 0 or 63. In a specific embodiment, if the PPDU is transmitted to the AP, the value of the Group ID field may be zero. Also, when the PPDU is transmitted to the non-AP wireless communication terminal, the value of the Group ID field may be 63. In addition, when the PPDU is transmitted to the mesh station, the value of the Group ID field may be zero. In a specific embodiment, the Group ID field may be a 6-bit field.

The wireless communication terminal may transmit information identifying the BSS through the Partial AID field and the Group ID field of VHT-SIG-A. Specifically, a wireless communication terminal, which is an AP, may set a partial AID field value to a non-AP wireless communication terminal according to the following equation.

$$(dec(AID[0:8])+dec(BSSID[44:47] \text{ XOR } BSSID[40:43])*2^5) \bmod 2^9$$

XOR represents an exclusive OR operation of the bit operation, mod X represents the remaining value when divided by X, and dec (A [b: c]) represents the number of binary digits from b+1th bit to c+1th bit of A in decimal again.

At this time, the wireless communication terminal, which is an AP, may set the Group ID field to 63.

Also, the wireless communication terminal may set the partial AID field of the PPDU according to the above formula when the wireless communication terminal is a Direct Link Setup (DLS) station or a Tunneled Direct Link Setup (TDLS) station, and the wireless communication terminal transmits the PPDU in a direct path, and the receiver of the PPDU or PSDU is a DLS station or a TDLS station. At this time, the wireless communication terminal may set the Group ID field to 63.

Figure 19:
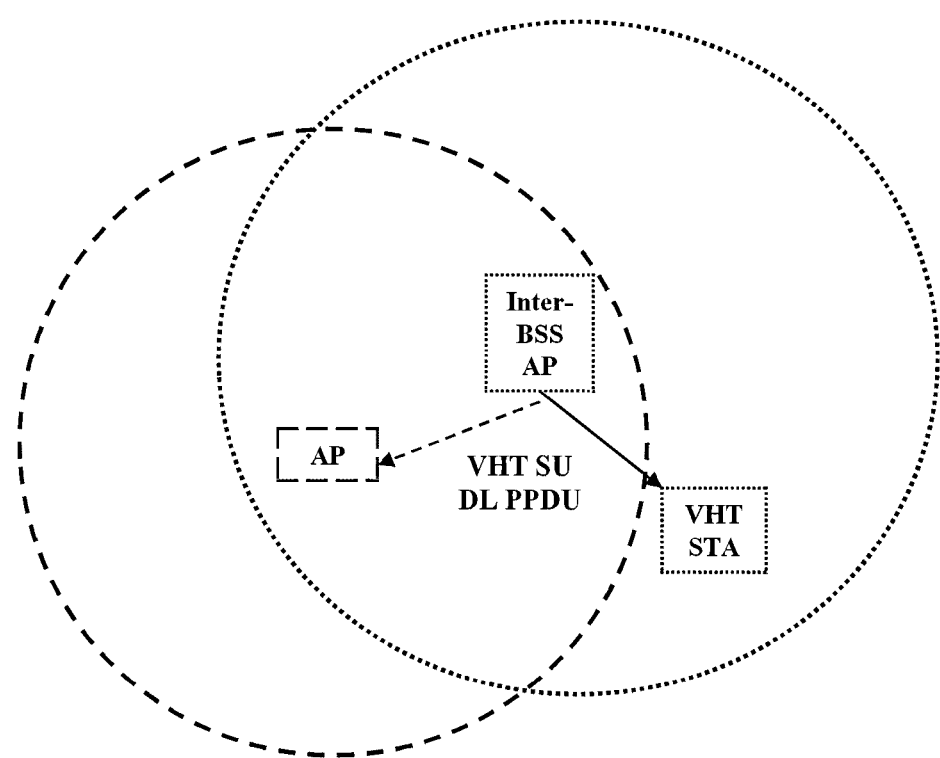
FIG. 19 shows a method of determining whether a corresponding PPDU is an Inter-BSS PPDU or an Intra-BSS PPDU based on whether a PPDU received by a wireless communication terminal is a downlink PPDU according to an embodiment of the present invention.
Figure 20:
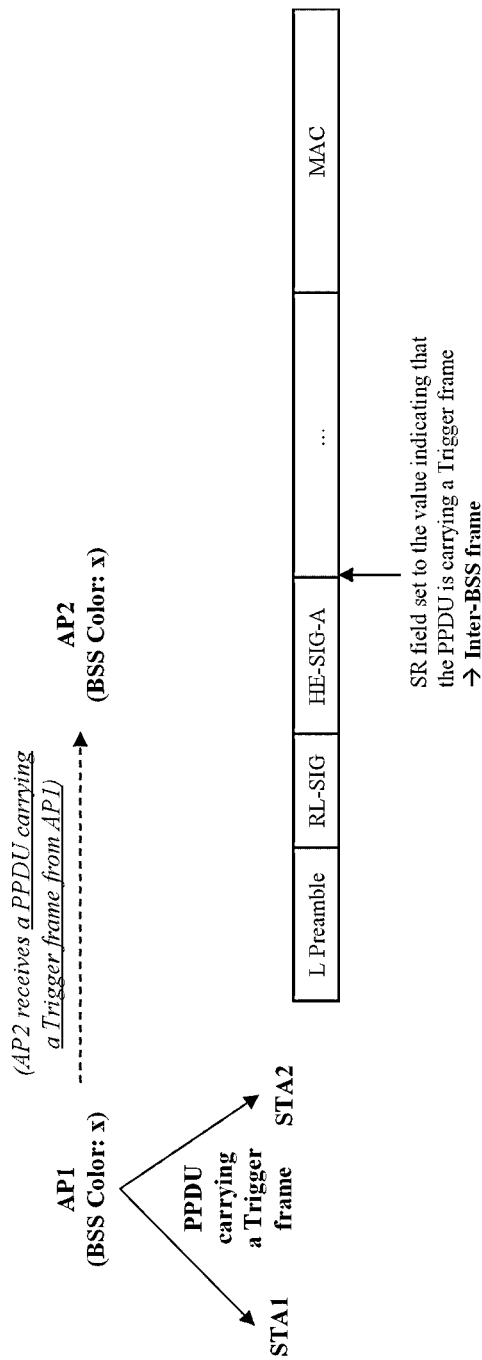
FIG. 20 shows a method for identifying whether a MAC frame received is an Intra-BSS frame or an Inter-BSS frame based on SR-related information by a wireless communication terminal according to an embodiment of the present invention.

FIGS. 19 to 20 show a method of determining whether a frame received by a wireless communication terminal is an Inter-BSS frame or an Intra-BSS frame according to an embodiment of the present invention.

FIG. 19 shows a method of determining whether a corresponding PPDU is an Inter-BSS PPDU or an Intra-BSS PPDU based on whether a PPDU received by a wireless communication terminal is a downlink PPDU according to an embodiment of the present invention.

As described above, the wireless communication terminal may perform identification based on the BSS color indicated by the signaling field of the PPDU. Also, the wireless communication terminal may identify whether the frame received based on the MAC header of the frame is an Inter-BSS frame or an Intra-BSS frame. Specifically, when the receiver address RA or the transmitter address TA of the MAC header of the frame received by the wireless communication terminal is a BSSID of a BSS including a wireless communication terminal or a bandwidth signaling variant of a BSSID, the wireless communication terminal may identify the received frame as an Intra-BSS frame.

The wireless communication terminal may identify whether the received PPDU is an Inter-BSS PPDU or an Intra-BSS PPDU based on information other than the BSS color value indicated by the MAC address and the signaling field of the PPDU. Specifically, the wireless communication terminal may identify whether the received PPDU is an Inter-BSS PPDU based on other parameter values of the RXVECTOR. In particular, when a BSS color collision occurs, the wireless communication terminal may identify whether the PPDU received is an Inter-BSS PPDU or an Intra-BSS PPDU based on information other than the BSS color value indicated by the signaling field of the PPDU. Specifically, when the frame received by the wireless communication terminal is a downlink frame, the wireless communication terminal may identify the frame as an inter-BSS frame. In a specific embodiment, even if the BSS color value indicated by the BSS color field of the signaling field of the PPDU or the BSS color indicated by the partial AID field is the same as the BSS color of the BSS including the wireless communication terminal, when the frame received by the wireless communication terminal, which is an AP, is a downlink frame, the wireless communication terminal may identify the frame as an Inter-BSS frame. For example, in the embodiment of FIG. 19, the AP receives a PPDU for downlink transmission and determines the PPDU as an Inter-BSS frame.

In addition, when the value of the Group ID field of the VHT-SIG-A field of the PPDU received by the wireless communication terminal is 63, the wireless communication terminal may identify the received PPDU as an Inter-BSS PPDU. This is because, as described with reference to FIG. 18, the Group ID field of the PPDU transmitted to the non-AP wireless communication terminal is set to 63. At this time, the wireless communication terminal, which is an AP, may identify the received PPDUs as Inter-BSS PPDUs only when the DLS protocol or the TDLS protocol is not used. As described above, this is because even when a DLS wireless communication terminal or a TDLS wireless communication terminal transmits a PPDU to a DLS wireless communication terminal or a TDLS wireless communication terminal through a direct path, the value of the Group ID field is set to 63.

Also, the wireless communication terminal, which is an AP, may identify whether the VHT PPDU is the Inter-BSS PPDU or the Intra-BSS PPDU based on the partial AID field of the VHT PPDU. Specifically, the wireless communication terminal, which is an AP, may identify whether the VHT PPDU is an Inter-BSS PPDU or an Intra-BSS PPDU based on the partial AID field and the Group ID field of the VHT PPDU. In the specific embodiment, when the value of the partial AID field is a value that does not exist in the BSS operated by the wireless communication terminal, the AP may identify the corresponding PPDU as an Inter-PPDU.

In addition, when the wireless communication terminal, which is an AP, receives the VHT MU PPDU, the wireless communication terminal may identify the PPDU as an Inter-PPDU. This is because the VHT MU PPDU may only be used for downlink transmission. Specifically, the wireless communication terminal, which is an AP, may determine that the corresponding PPDU is a VHT MU PPDU through auto detection and the VHT-SIG-A field. In addition, If the group ID of the VHT-SIG-A is not 0 or 63, the wireless communication terminal, which is an AP, may identify the corresponding PPDU as the MU PPDU.

Also, when the wireless communication terminal, which is an AP, receives the HE PPDU and the UL/DL field of the HE-SIG-A field indicates downlink transmission, the wireless communication terminal, which is an AP, may identify the corresponding PPDU as the Inter-BSS PPDU. At this time, the value of the UL/DL field may be zero. At this time, the wireless communication terminal, which is an AP, may identify the received PPDUs as Inter-BSS PPDUs only when the DLS protocol or the TDLS protocol is not used.

When the wireless communication terminal of the AP receives the HE PPDU and the corresponding PPDU is not transmitted to the wireless communication terminal included in the IBSS and the UL_FLAG field of the HE-SIG-A field indicates the downlink transmission, the wireless communication terminal, which is an AP, may identify the PPDU as an Inter-BSS PPDU. At this time, the wireless communication terminal, which is an AP, may determine whether the DLS protocol or the TDLS protocol is used, and thus may determine whether the received PPDU is not transmitted to the wireless communication terminal included in the IBSS.

When a wireless communication terminal, which is an AP, receives a trigger-based PPDU from a wireless communication terminal that is not triggered by the wireless communication terminal, which is an AP may identify the corresponding PPDU as an Inter-BSS PPDU. Specifically, when a wireless communication terminal, which is an AP, receives a trigger-based PPDU without transmitting a trigger frame, the wireless communication terminal, which is an AP, may identify the PPDU as an Inter-BSS PPDU.

FIG. 20 shows a method for identifying whether a MAC frame received is an Intra-BSS frame or an Inter-BSS frame based on SR-related information by a wireless communication terminal according to an embodiment of the present invention.

As described above, when a wireless communication terminal that is an AP receives a PPDU for downlink transmission, the wireless communication terminal that is an AP may identify the PPDU as an Inter-PPDU. This is because the PPDU that is the destination of the wireless communication terminal, which is an AP in the Intra-BSS, is the PPDU for the uplink transmission. In addition, the AP, which is an AP, may identify whether the corresponding PPDU is the Inter-BSS PPDU based on the SR-related information indicated by the PPDU. The SR-related information included in the PPDU may indicate that the PPDU includes a trigger frame. Also, the trigger frame is used only for downlink transmission. Therefore, the wireless communication terminal, which is an AP, may determine whether the corresponding PPDU is a PPDU for downlink transmission based on whether the PPDU includes a trigger frame. Therefore, the wireless communication terminal may identify whether the corresponding PPDU is an Inter-BSS PPDU based on the SR-related information.

At this time, the SR related information may be the SR field of the signaling field of the PPDU. Specifically, the signaling field of the PPDU may indicate whether or not the SR operation is allowed while the corresponding PPDU is being transmitted, and may indicate an allowable condition. At this time, the signaling field may be the HE-SIG-A field. Specifically, the SR field may indicate an SR_Delay indicating that the SR operation is to be delayed. If the PPDU is a HE SU PPDU or a HE extended range SU PPDU, and the corresponding PPDU includes a trigger frame, the SR field indicates SR_Delay.

In addition, the SR field may indicate SR_Restricted, which indicates that SR operation is restrictively allowed. Specifically, when the SR field of the PPDU has the SR_Restricted value, during the SR operation of the Inter-BSS wireless communication terminal, the TXOP duration of the transmission of the Inter-BSS wireless communication terminal may be restricted to the PPDU including the trigger frame. Also, when the PPDU is an HE MU PPDU and the corresponding PPDU includes a trigger frame, the SR field indicates SR_Restricted.

Also, the SR field may indicate SR_Disallowed indicating that the SR operation is not allowed. A wireless communication terminal transmitting a PPDU including a trigger frame indicates that the PPDU includes a trigger frame through the SR field of the PPDU and may protect the transmission sequence based on the trigger frame.

Therefore, when the SR field value of the PPDU received by the wireless communication terminal, which is an AP, is SR_Restricted or SR_Delay, the wireless communication terminal, which is an AP, may identify the PPDU as an Inter-BSS PPDU based on the type of the PPDU and the SR field. Specifically, when the PPDU received by the wireless communication terminal AP is a HE Single User (SU) PPDU or a HE extended range SU PPDU, and the SR field signaled by the corresponding PPDU indicates SR_Restricted, the wireless communication terminal, which is an AP, may identify the PPDU as an Inter-BSS PPDU. Also, when the PPDU received by the wireless communication terminal is an HE MU PPDU and the value of the SR field signaled by the PPDU indicates SR_Delayed, the wireless communication terminal, which is an AP, may identify the PPDU as an Inter-BSS PPDU. At this time, the HE SU PPDU indicates a PPDU for transmission to a single wireless communication terminal. Also, the HE extended range SU PPDU indicates a PPDU for transmission to a single wireless communication terminal. Also, the HE MU PPDU indicates a PPDU for a plurality of wireless communication terminals.

Also, in a specific embodiment, when the PPDU received by the non-AP wireless communication terminal is an Inter-BSS PPDU or an Intra-BSS PPDU, the non-AP wireless communication terminal may prioritize the determination based on the SR-related information indicated by the PPDU over the determination based on the BSS color value indicated by the PPDU signaling field.

In the embodiment of FIG. 20, the first AP AP1 transmits a trigger frame for triggering the transmission of the first station STA1 and the second station STA2. At this time, the second AP AP2 receives the PPDU including the trigger frame transmitted by the first AP AP1. The second AP AP2 may recognize that the corresponding PPDU is the PPDU including the trigger frame through the SR field value of the PPDU including the trigger frame transmitted by the first AP AP1. Accordingly, the second AP AP2 may identify the PPDU including the trigger frame transmitted by the first AP AP1 as the Inter-BSS PPDU. Particularly, even when the BSS color x of the BSS operated by the second AP AP2 is the same as the BSS color x of the BSS operated by the first AP AP1, the second AP AP2 may identify the PPDU including the trigger frame transmitted by the first AP AP1 as the Inter-BSS PPDU.

Figure 21:
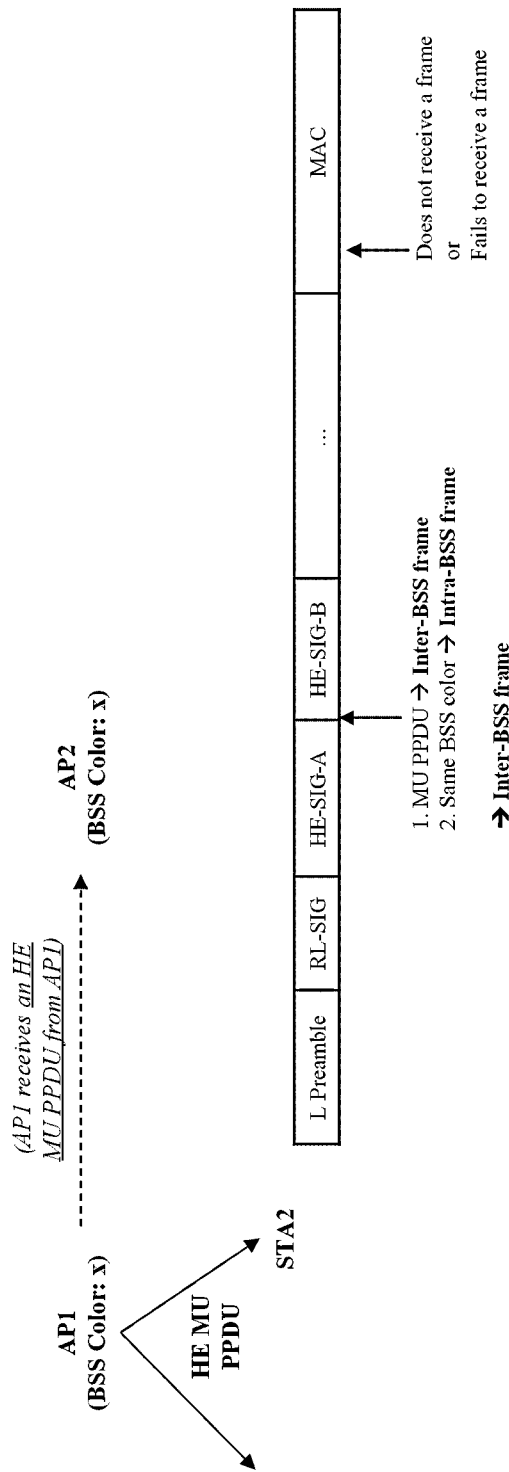
FIG. 21 shows a method for a wireless communication terminal to determine whether the corresponding PPDU is an Inter-BSS PPDU or an Intra-BSS PPDU when the PPDU received by the wireless communication terminal according to the embodiment of the present invention satisfies both the Inter-BSS PPDU condition and the Intra-BSS PPDU condition.

FIG. 21 shows a method for a wireless communication terminal to determine whether the corresponding PPDU is an Inter-BSS PPDU or an Intra-BSS PPDU when the PPDU received by the wireless communication terminal according to the embodiment of the present invention satisfies both the Inter-BSS PPDU condition and the Intra-BSS PPDU condition.

When the frame received by the wireless communication terminal satisfies both the Inter-BSS frame condition and the Intra-BSS frame condition, the wireless communication terminal may identify the frame as an Inter-BSS frame. Specifically, when the frame received by the wireless communication terminal satisfies both the Inter-BSS frame condition and the Intra-BSS frame condition and the wireless communication terminal is not able to identify whether the frame is an Inter-BSS frame or an Intra-BSS frame based on the MAC address, the wireless communication terminal may identify the frame as an Inter-BSS frame. In this case, a case where the wireless communication terminal is not able to identify the Inter-BSS frame or the Intra-BSS frame based on the MAC address may include a case where the wireless communication terminal is not able to decode the MAC header of the corresponding frame.

In addition, the Inter-BSS frame condition and the Intra-BSS frame condition may include all conditions for identifying whether the wireless communication terminal is an Inter-BSS frame or an Intra-BSS frame in the above-described embodiments. For example, the wireless communication terminal may identify whether the frame is an Inter-BSS frame or an Intra-BSS frame based on the BSS color value indicated by the BSS color field of the signaling field of the PPDU including the MAC frame. As described above, the BSS color that the PPDU signals may be the BSS color that the BSS color field of the PPDU signals. Specifically, the BSS color that the PPDU signals may be the BSS color that the BSS color field of the HE-SIG-A of the PPDU signals.

Also, the wireless communication terminal may identify whether the frame is an Inter-BSS frame or an Intra-BSS frame based on the value of the partial AID field of the signaling field of the PPDU including the frame. Also, the wireless communication terminal may identify whether the frame is an Inter-BSS frame or an Intra-BSS frame based on the Address field of the frame. In addition, when the wireless communication terminal is an AP and the wireless communication terminal receives a downlink transmission PPDU, the wireless communication terminal may identify a frame included in the corresponding PPDU as an Inter-BSS frame.

If the PPDU includes a BSS color field, the partial AID field is less likely to include information on the BSS color. Therefore, a case where the Intra-BSS frame condition and Inter-BSS color condition are satisfied at the same time may include a case where when the wireless communication terminal performs determination based on the BSS color field or the partial AID field, the corresponding PPDU is identified as an Intra-BSS PPDU, and when the wireless communication terminal performs determination based on the address field of the frame, the corresponding PPDU may be identified as an Inter-BSS PPDU. Or, when the wireless communication terminal performs determination based on the BSS color field or the partial AID field, the corresponding MAC frame is identified as an Intra-BSS frame, and when the wireless communication terminal performs determination based on whether the PPDU including the MAC frame is an uplink transmission format, the corresponding PPDU is identified as an Inter-BSS PPDU. Since the number of bits representing the BSS color is limited, a BSS color collision may occur as described above. Therefore, when the frame received by the wireless communication terminal satisfies both the Inter-BSS frame condition and the Intra-BSS frame condition, the wireless communication terminal may identify whether the frame received based on a condition other than the BSS color indicated by the PPDU is an Inter-BSS frame or an Intra-BSS frame. Specifically, when the frame received by the wireless communication terminal satisfies both the Inter-BSS frame condition and the Intra-BSS frame condition, the wireless communication terminal may identify whether the received frame is an Inter-BSS frame or an Intra-BSS frame based on a condition other than the BSS color field or the partial AID field of the PPDU. At this time, other conditions may be identified based on the Address field of the MAC header described above. Further, another condition may be that the PPDU including the frame is a PPDU for downlink transmission.

In the embodiment of FIG. 21, the first AP AP1 transmits an HE MU PPDU including a trigger frame to the first station STA1 and the second station STA2. At this time, the second AP AP2 receives the HE MU PPDU including the trigger frame transmitted by the first AP AP1. The BSS color of the BSS operated by the first AP AP1 and the second AP is equal to x. Therefore, the BSS color indicated by the HE-SIG-A field of the HE MU PPDU transmitted by the first AP AP1 satisfies the Intra-BSS color condition. However, when the HE MU PPDU transmitted by the first AP AP1 is the PPDU for downlink transmission including the trigger frame and as in the above-described embodiment, since the determination based on whether or not the PPDU for downlink transmission is prior to the determination based on the BSS color when the wireless communication terminal determine that the frame received by the wireless communication terminal is an Inter-BSS frame or an Intra-BSS frame, the second AP AP2 identifies the HE MU PPDU transmitted by the first AP AP1 as an Inter-BSS PPDU.

The wireless communication terminal may identify the received frame as an Intra-BSS frame according to any one condition, and then, identify the received frame as an Inter-BSS frame according to the determination priority order described above. At this time, the wireless communication terminal may use the enhanced CCA level. Specifically, the wireless communication terminal may use the CCA level corresponding to the inter-BSS frame. In a specific embodiment, the CCA level corresponding to the Inter-BSS frame may be referred to as the OBSS PD level.

As described above, the wireless communication terminal may enter the power save state based on the MAC header. At this time, the specific operation of the wireless communication terminal will now be described in detail with reference to FIGS. 22 to 23.

Figure 22:
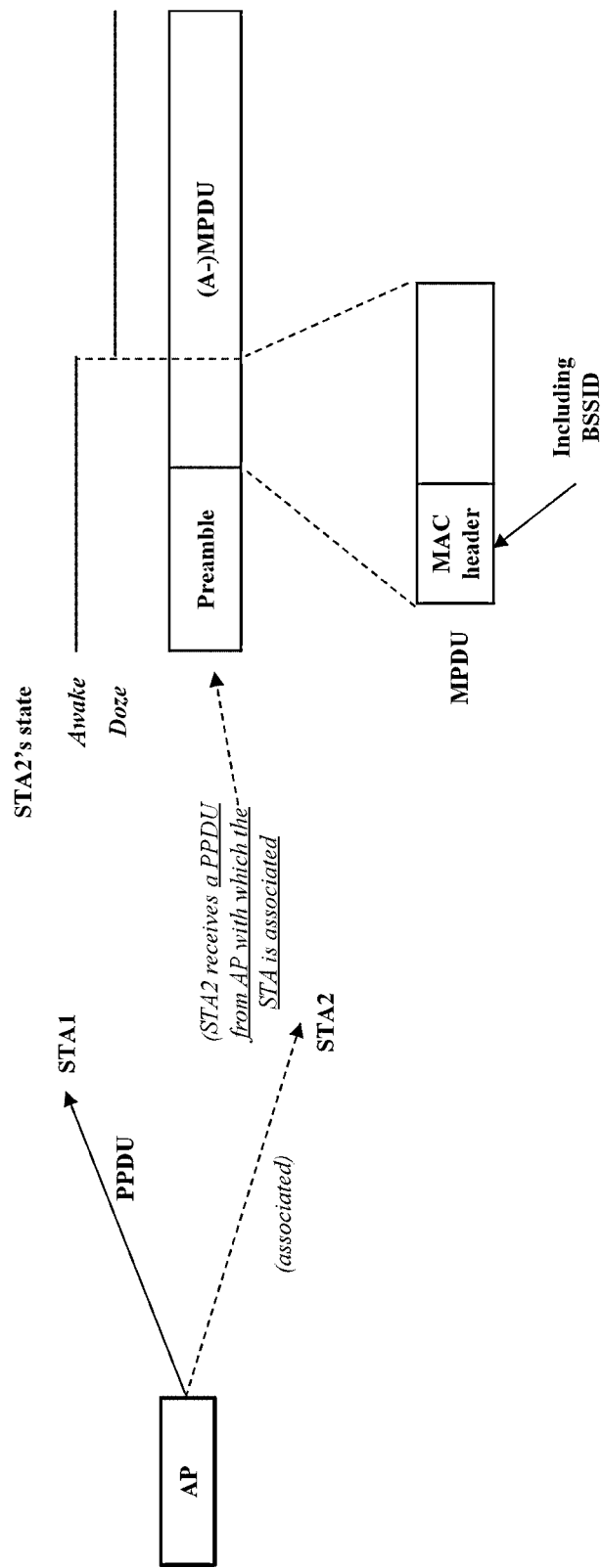
FIG. 22 shows a case where a wireless communication terminal according to an embodiment of the present invention enters a power save state based on a MAC header of a frame received by the wireless communication terminal.
Figure 23:
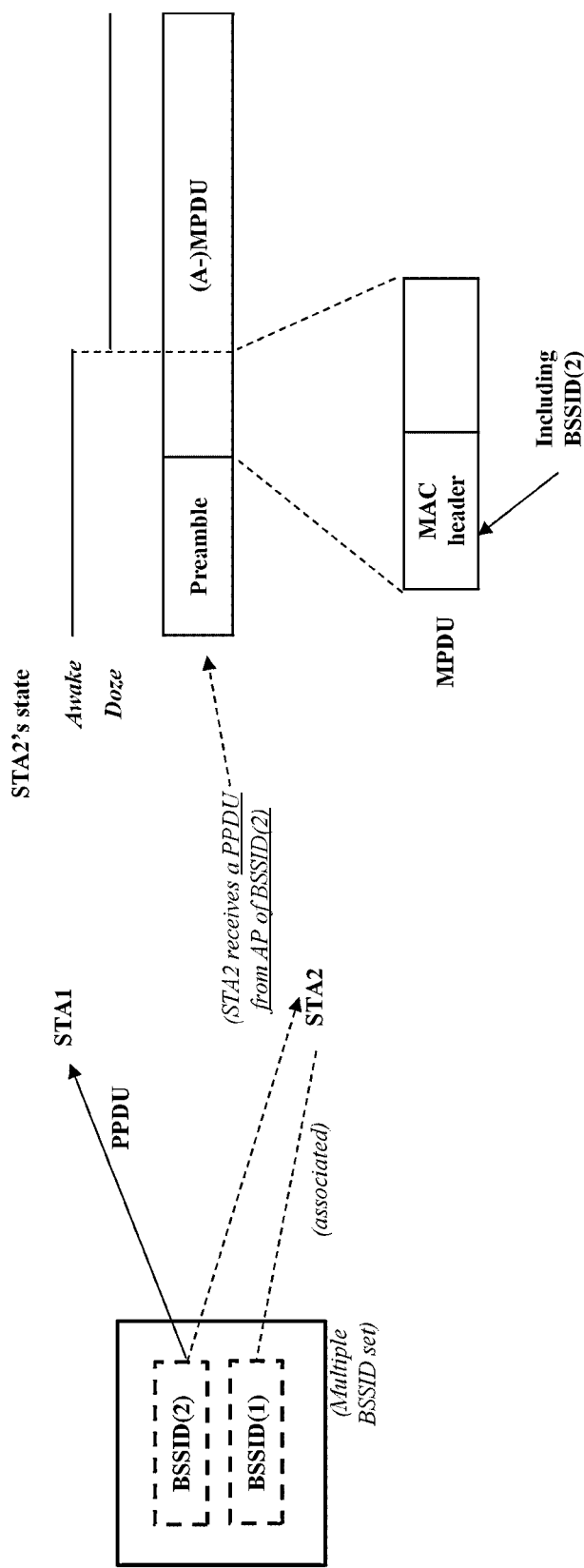
FIG. 23 shows a case where, when a wireless communication terminal according to an embodiment of the present invention is included in a BSS corresponding to a multiple BSSID set, the wireless communication terminal enters a power save state based on a MAC header of a frame received by the wireless communication terminal.

FIG. 22 shows a case where a wireless communication terminal according to an embodiment of the present invention enters a power save state based on a MAC header of a frame received by the wireless communication terminal. Also, FIG. 23 shows a case where, when a wireless communication terminal according to an embodiment of the present invention is included in a BSS corresponding to a multiple BSSID set, the wireless communication terminal enters a power save state based on a MAC header of a frame received by the wireless communication terminal.

When a Transmitter Address TA or a Receiver Address RA indicated by a MAC header of a received frame corresponds to another BSSID of a multiple BSSID set that includes a BSSID of a BSS including a wireless communication terminal, the wireless communication terminal may determine the received frame as an Intra-BSS frame. When the frame received by the wireless communication terminal is an Intra-BSS frame and the wireless communication terminal is not the recipient of a received frame, the wireless communication terminal may enter the power save state. At this time, the wireless communication terminal may maintain the power save state until the end of the duration of the PPDU including the received frame.

In the embodiment of FIG. 22, the first station STA1 and the second station STA2 are associated with the same access point AP. When the access point AP transmits the PPDU to the first station STA1, the second station STA2 may receive the PPDU. At this time, the second station STA2 determines whether the received PPDU is an intra-BSS frame. When the received PPDU is an Intra-BSS frame, the second station STA2 determines whether the recipient of the received PPDU is the second station STA2. Specifically, the second station STA2 may determine whether the receiver of the PPDU received based on the MAC header is the second station STA2. At this time, when the second station STA2 is not the receiver of the received PPDU, the second station STA2 may enter the power save state.

When entering the power save state, the wireless communication terminal may determine whether the Receiver Address RA of the frame indicates a plurality of wireless communication terminals including the corresponding wireless communication terminal. Specifically, when the received frame is an Intra-BSS frame, the Receiver Address RA of the received frame is not the MAC address of the wireless communication terminal, and the Receiver Address RA of the received frame does not correspond to the broadcast address, the wireless communication terminal may enter the power save state. At this time, when the Receiver Address RA of the received frame does not correspond to the multicast address that the wireless communication terminal is required to receive and the Receiver Address RA of the received frame does not correspond to the group address that the wireless communication terminal is required to receive, the wireless communication terminal may enter the power save state.

In a specific embodiment, even when the Receiver Address RA of the trigger frame or the Receiver Address RA of a multi-station block ACK (Multi-STA BlockACK) frame does not match the MAC address of the wireless communication terminal, the wireless communication terminal may be required to receive a trigger frame or a multi-station block ACK frame. Specifically, when the receiver of the trigger frame is a plurality of wireless communication terminals, the Receiver Address RA of the trigger frame may be a broadcast address. At this time, the number of User Info fields of the trigger frame may be two or more. Also, when the receiver of the multi-station block ACK frame is a plurality of wireless communication terminals, the Receiver Address RA of the multi-station block ACK may be a broadcast address. At this time, the number of AID fields in the Per STA Info subfield of the multi-station block ACK may be two or more. At this time, the broadcast address may indicate a plurality of wireless communication terminals or one wireless communication terminal.

Accordingly, when the received frame is an Intra-BSS frame, the Receiver Address RA of the received frame is not the MAC address of the wireless communication terminal, the received frame is a trigger frame, and the Receiver Address RA of the received frame does not correspond to the broadcast address, the wireless communication terminal may enter the power save state. In addition, when the received frame is an Intra-BSS frame, the Receiver Address RA of the received frame is not the MAC address of the wireless communication terminal, the received frame is a trigger frame, and the Receiver Address RA of the multi-station block ACK frame does not correspond to the broadcast address, the wireless communication terminal may enter the power save state.

Specifically, when the receiver of the trigger frame or the multi-station block ACK frame is a plurality of wireless communication terminals, the Receiver Address RA may be a multicast address or a group address. Therefore, when the wireless communication terminal receives the trigger frame or the multi-station block ACK frame and the Receiver Address RA of the received frame is not a multicast address and a group address including the wireless communication terminal, the wireless communication terminal may enter the power save state.

When any one of the BSSIDs included in the multiple BSSID set is set to the Receiver Address RA of the frame or the Transmitter Address TA of the frame, only the wireless communication terminal included in the BSS identified by the corresponding BSSID may be a recipient or a transmitter of the corresponding frame. Specifically, for a frame transmitted to a plurality of wireless communication terminals included in each of two or more BSSs corresponding to a multiple BSSID set, a modified value may be set based on the BSSID in the Transmitter Address of the frame. At this time, the wireless communication terminal may not separately determine whether the Receiver Address RA and the Transmitter Address TA are the broadcast address or the multicast address including the address of the wireless communication terminal. For convenience of explanation, the BSSID of the BSS including the wireless communication terminal is referred to as a first BSSID, and the first BSSID and a different BSSID are referred to as a second BSSID. Specifically, when the second BSSID is included in the multiple BSSID set including the first BSSID and the Receiver Address RA or the Transmitter Address TA of the frame received by the wireless communication terminal matches the second BSSID, the wireless communication terminal may enter the power save state.

In the embodiment of FIG. 23, the multiple BSSID set includes a first BSSID BSSID(1) and a second BSSID BSSID(2). The first station STA1 is included in the BSS identified by the second BSSID BSSID(2) and the second station STA2 is included in the BSS identified by the first BSSID BSSID(1). At this time, the virtual access point having the second BSSID BSSID(2) transmits the PPDU to the first station STA1. The second station STA2 receives the corresponding PPDU. The second station STA2 determines whether the received PPDU is an intra-BSS frame. Specifically, the second station STA2 may determine whether the MAC address signaled by the MAC header of the received PPDU is the BSSID of the multiple BSSID set including the first BSSID. Since the Transmitter Address TA of the received PPDU is the second BSSID BSSID(2), the second station STA2 determines the received PPDU as an intra-BSS frame. Also, since the receiver of the received PPDU is a wireless communication terminal included in the BSS identified by the second BSSID BSSID(2), the second station STA2 enters the power save state.

When the received PPDU is an Inter-BSS frame, the second station STA2 determines whether the recipient of the received PPDU is the second station STA2. Specifically, the second station STA2 may determine whether the recipient of the PPDU received based on the MAC header is the second station STA2. At this time, when the second station STA2 is not the receiver of the received PPDU, the second station STA2 may enter the power save state.

In another specific embodiment, if the reference BSSID is set to the Transmitter Address TA of the frame, it may indicate that the Transmitter Address TA is transmitted to a plurality of wireless communication terminals included in two or more BSSs corresponding to the multiple BSSID set. When the second BSSID is included in the multiple BSSID set including the first BSSID, the second BSSID is not the reference BSSID, and the Receiver Address RA or the Transmitter Address TA of the frame received by the wireless communication terminal is transmitted from the second BSSID, the wireless communication terminal may enter the power save state.

As described above, the wireless communication terminal may signal various information through the signaling field of the PPDU. The format of the signaling field will be described with reference to FIG. 24.

Figure 24:
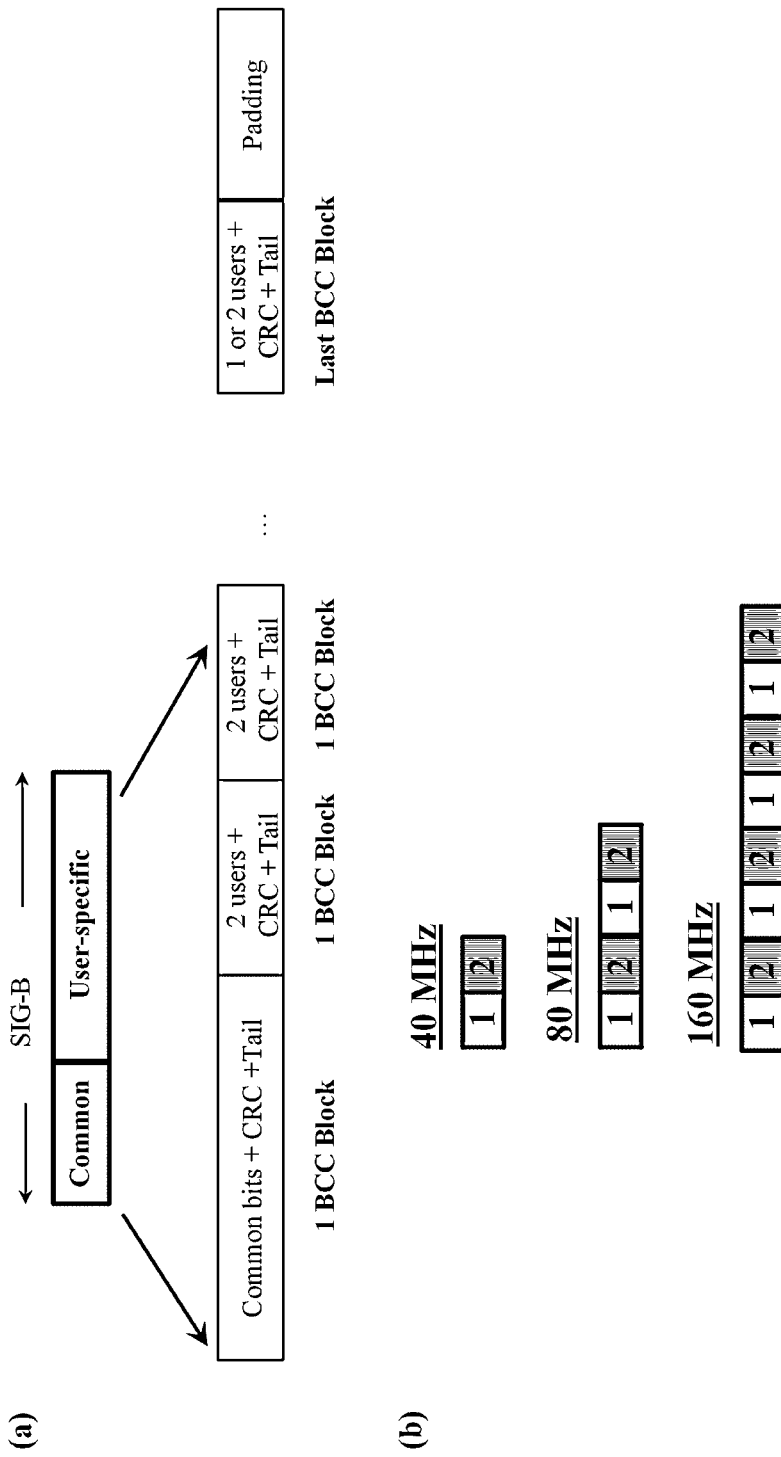
FIG. 24 shows the format of the HE-SIG-B field according to an embodiment of the present invention.

FIG. 24 shows the format of the HE-SIG-B field according to an embodiment of the present invention.

The HE MU PPDU may include a HE-SIG-B field that signals information necessary for multi-user transmission. Specifically, the HE-SIG-B field may be classified into a common field for signaling information commonly applied to wireless communication terminals participating in multi-user transmission and a user-specific field for signaling information for each of a plurality of wireless communication terminals participating in multi-user transmission. Both the common field and the user-specific field may be encoded based on 20 MHz. Specifically, the common field may include information on resource allocation such as a resource unit RU allocated to a plurality of wireless communication terminals participating in multi-user transmission and a number of users in the MU-MIMO. Further, in the user-specific field, information on each of the plurality of wireless communication terminals may be arranged in the order listed in the RU allocation field in the common field.

Specifically, the user-specific field includes information on a station identifier (STAID), a number of spatial streams, a transmit beamforming (TxBF), a modulation and coding scheme (MCS), a dual sub-carrier modulation (DCM), and Coding. In addition, the user-specific field may include information on Spatial Configuration Fields, MCS, DCM, and Coding when a plurality of wireless communication terminals are allocated to one RU. At this time, information on coding may indicate whether LDPC is used or not. The common field may include one Binary Block Code (BCC) block. The user-specific field includes information on the two wireless communication terminals in one BCC block. At this time, the last BCC block may include information on one wireless communication terminal. Also, the information on the individual wireless communication terminals may be referred to as Per-user content. One BCC block may include CRC and Tail bits. In addition, the HE-SIG-B field may also include padding to align the OFDM symbol boundaries. The format of the specific HE-SIG-B field may be as shown in FIG. 24(a).

When a wireless communication terminal transmits a PPDU over a frequency bandwidth of 40 MHz or more, the wireless communication terminal may repeatedly transmit two HE-SIG-B fields each having a frequency bandwidth of 20 MHz every 40 MHz by the entire frequency bandwidth. At this time, the two HE-SIG-B fields may include different information. In addition, each of the two HE-SIG-B fields may include information on an RU included in the frequency bandwidth in which the corresponding HE-SIG-B field is transmitted. The wireless communication terminal receiving the PPDU may recognize the configuration of the entire MU PPDU by decoding two HE-SIG-B fields. Specifically, the wireless communication terminal may transmit the HE-SIG-B field in the form as shown in FIG. 24(b).

In a specific embodiment, the wireless communication terminal may indicate a wireless communication terminal corresponding to per-user content through an identifier of the wireless communication terminal in a user-specific field of the HE-SIG-B field. At this time, the identifier of the wireless communication terminal may be an association identifier (AID). If multiple BSSID sets are used, the wireless communication terminal uses the assigned AID according to the group addressed AID assignment method in the multiple BSSID TIM Operation so that it is possible to broadcast a PPDU to wireless communication terminals included in any one of a plurality of BSSs corresponding to multiple BSSIDs. For example, there are N BSSs corresponding to a set of multiple BSSIDs, and each of the N BSSs may have one of the values from 0 to N−1 as an AID. At this time, the wireless communication terminal may broadcast the PPDU to the wireless communication terminal of the BSS corresponding to the AID of 0 by designating the wireless communication terminal identifier as 0 in the per-user content of the user-specific field. When multiple BSSID sets are used, the wireless communication terminal may broadcast PPDUs to wireless communication terminals included in all BSSs corresponding to multiple BSSID sets using a specific AID. At this time, the specific AID may be an unassigned value in a multiple BSSID TIM operation. In a specific embodiment, the specific AID may be 2047.

A frame to be transmitted to a plurality of wireless communication terminals and a frame to be transmitted to any one wireless communication terminal may be included in one MU PPDU. At this time, a plurality of RUs to which the PPDUs are transmitted may be divided into RUs used for a plurality of wireless communication terminals and RUs used for transmission to any one wireless communication terminal. When the wireless communication terminal receives the MU PPDU, the wireless communication terminal may determine whether the per-user content indicates information corresponding to the wireless communication terminal or based on the wireless communication identifier included in the per-user content. At this time, the wireless communication terminal may determine whether the wireless communication terminal identifier indicates the wireless communication terminal based on the range of the wireless communication terminal indicated by the wireless communication terminal identifier. Specifically, the wireless communication terminal may be identified from a wireless communication terminal identifier indicating a small range of wireless communication terminals. For example, the HE-SIG-B field may include N wireless communication terminal identifiers from a wireless communication terminal identifier indicating the first group to a wireless communication terminal identifier indicating the Nth group. At this time, the first group includes a smaller number of wireless communication terminals than the second group, and the second group includes a smaller number of wireless communication terminals than the third group. In this case, the wireless communication terminal may confirm the wireless communication terminal identifier indicating the (N−1)th group from the wireless communication terminal identifier indicating the (N)th group.

When multiple BSSID sets are used, the wireless communication terminal may determine the wireless communication terminal identifier included in the HE-SIG-B field in the following order. When a wireless communication terminal identifier indicating only the wireless communication terminal is included in the per-user content, the wireless communication terminal may receive the payload of the PPDU transmitted through the RU indicated by the per-user content. When the wireless communication terminal identifier indicating only the wireless communication terminal is not included in the per-user content and the wireless communication identifier indicating a broadcast to the wireless communication terminals of the BSS with which the wireless communication terminal is associated is included in the per-user content, the wireless communication terminal may receive the payload of the PPDU transmitted through the RU indicated by the per-user content. The wireless communication terminal identifier indicating only the wireless communication terminal is not included in the per-user content, the wireless communication identifier indicating the broadcast to the wireless communication terminals of the BSS with which the wireless communication terminal is associated is not included in the per-user content, and the wireless communication terminal identifier indicating a broadcast to wireless communication terminals included in all BSSs may be included in the per-user content. At this time, the wireless communication terminal may receive the payload of the PPDU transmitted through the RU indicated by the per-user content including the wireless communication terminal identifier indicating the broadcast to the wireless communication terminals included in all the BSSs. If all of the above cases are not satisfied, the wireless communication terminal may stop decoding the corresponding PPDU. This is because the payload of the PPDU to be decoded by the wireless communication terminal is not included in the PPDU. For convenience of explanation, the wireless communication terminal identifiers are described in three ranges but depending on the number or inclusion relationship of the wireless communication terminals, there may be more range types. In such a case, as described above, the wireless communication terminal may determine the wireless communication terminal identifier according to the size of the range indicated by the wireless communication terminal identifier.

When multiple BSSID sets are not used, the wireless communication terminal may confirm the wireless communication terminal identifier included in the HE-SIG-B field in the following order. When a wireless communication terminal identifier indicating only the wireless communication terminal is included in the per-user content, the wireless communication terminal may receive the payload of the PPDU transmitted through the RU indicated by the per-user content. When the wireless communication terminal identifier indicating only the wireless communication terminal is not included in the per-user content, and a wireless communication identifier indicating at least one of broadcast, group cast, and multicast for a group including a wireless communication terminal is included in the per-user content, the wireless communication terminal may receive the payload of the PPDU transmitted through the RU indicated by the per-user content. The wireless communication terminal identifier indicating only the wireless communication terminal is not included in the per-user content, the wireless communication identifier indicating at least one of broadcast, group cast, and multicast for a group including a wireless communication terminal is not included in the per-user content, and the wireless communication terminal identifier indicating a broadcast to the wireless communication terminals included in the BSS may be included in the per-user content. At this time, the wireless communication terminal may receive the payload of the PPDU transmitted through the RU indicated by the per-user content including the wireless communication terminal identifier indicating the broadcast to the wireless communication terminals included in the BSS. If all of the above cases are not satisfied, the wireless communication terminal may stop decoding the corresponding PPDU. This is because the payload of the PPDU to be decoded by the wireless communication terminal is not included in the PPDU. For convenience of explanation, the wireless communication terminal identifiers are described in three ranges but depending on the number or inclusion relationship of the wireless communication terminals, there may be more range types. In such a case, as described above, the wireless communication terminal may determine the wireless communication terminal identifier according to the size of the range indicated by the wireless communication terminal identifier.

In order for the wireless communication terminal receiving the MAC frame to effectively control the MAC frame, the wireless communication terminal may transmit information on the MAC frame control through the MAC frame header. At this time, there is a need for a method for efficiently transmitting information on MAC frame control. This will be described with reference to FIGS. 25 and 33.

Figure 25:
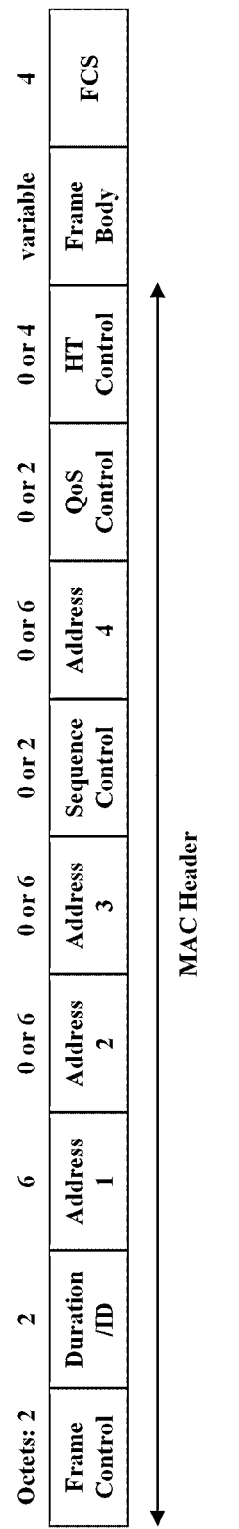
FIG. 25 is a view illustrating a MAC frame format according to an embodiment of the present invention.

FIG. 25 is a view illustrating a MAC frame format according to an embodiment of the present invention.

The MAC frame may include a Frame Control field indicating information on frame control. Also, the MAC frame may indicate a duration used for NAV setting according to the frame type, or may include a Duration/ID field indicating the AID of the wireless communication terminal transmitting the frame. In addition, the MAC frame may include four Address fields indicating information related to the address. Further, the MAC frame may include a Sequence Control field indicating information on sequence control. In addition, the MAC frame may include a QoS Control field indicating information on Quality of Service (QoS) control. In addition, the MAC frame may include a Frame Body field indicating a payload of the MAC frame. In addition, the MAC frame may include an FCS field indicating whether the MAC frame includes an error. The MAC frame may not include the fields described above depending on the frame type or subtype. Also, the MAC frame may include a Frame Control field, a Duration/ID field, an Address 1 field, and an FCS field regardless of a frame type and a subtype.

FIG. 26 is a view illustrating a variant of an HT Control field according to an embodiment of the present invention.

The wireless communication terminal may transmit and modify various HT Control fields. Specifically, the wireless communication terminal may transmit the HT Control field in the format of an HT variant, a VHT variant, or an HE variant. Also, the HT Control field may be a 32-bit field. At this time, the first bit B0 and the second bit B1 of the HT Control field may indicate the type of the HT Control field. When the first bit B0 of the HT Control field is 0, the HT Control field may be an HT variant. At this time, the bits below the second bit B1 of the HT Control field may include the HT Control Middle, the AC Constraint, and the RDG/More PPDU subfields as shown in FIG. 26. Also, when the first bit B0 of the HT Control field is 1 and the second bit B1 is 0, the HT Control field may be a VHT variant. At this time, the bits below the second bit B1 of the HT Control field may include the VHT Control Middle, the AC Constraint, and the RDG/More PPDU subfields as shown in FIG. 26. When the first bit B0 of the HT Control field is 1 and the second bit B1 is 1, the HT Control field may be an HE variant. At this time, the bits below the second bit B1 of the HT Control field may include an aggregated control (A-Control) subfield as shown in FIG. 26. The A-Control subfield may include Control information. The control information included in the A-Control and the format of the A-Control subfield will be described with reference to FIGS. 27 to 33.

FIG. 27 shows the format of the A-Control subfield according to an embodiment of the present invention.

The wireless communication terminal according to the embodiment of the present invention may insert one or a plurality of control subfields into the A-Control subfield to transmit the same. At this time, the number of Control subfields included in the A-Control subfield may be differently applied depending on at least one of the type and the subtype of the MAC frame. At this time, the A-Contorl sub-field may include a padding bit to match the length of the sub-field. In a specific embodiment, the A-Control subfield may be a 30-bit field. Also, the HE variant may be a 32-bit field. The A-Control subfield may include zeros as padding bits. The A-Control subfield may include control subfields consecutively.

In addition, the Control sub-field may include a Control ID sub-field indicating the type of information included in the Control sub-field. In addition, the Control sub-field may include a Control Information sub-field indicating Control information. In a specific embodiment, the Control ID field may be a 4-bit field. The contents and length of the Control Information subfield may be determined according to the Control ID subfield. Specifically, the A-Control subfield may be in the format shown in FIG. 27(a). In addition, the Control sub-field included in the A-Control sub-field may have a format as shown in FIG. 27(b).

The Control subfield may include information related to at least one of UL MU response scheduling, Receive operation mode indication, HE link adaptation, UL PPDU triggering, BlockACK request, and Buffer Status Report Requests. When a bit corresponding to the length of the A-Control sub-field is decoded, the wireless communication terminal that decodes the Control subfield may determine that there is no additional Control information to be decoded. However, when the number of Control subfields included in the A-Control subfield is variable and the length of the A-Control sub-field remains, the wireless communication terminal that decodes the A-Control subfield may not determine whether the current decoding bit is a padding bit or a control subfield. Therefore, there is a need for a method of a wireless communication terminal that decodes the A-Control subfield to determine whether the currently decoded bit is a padding bit.

The wireless communication terminal may insert the Control subfields of the A-Control subfield into the A-Control subfield in the order in which they are arranged according to the Control ID. Specifically, the wireless communication terminal may insert the control subfields of the A-control subfield into the A-control subfields in ascending order of the Control ID. In another specific embodiment, the wireless communication terminal may insert control subfields of the A-Control sub-field into the A-Control sub-field in a descending order of the Control ID. When the Control subfields are inserted into the A-Control subfield in the order in which they were sorted according to the Control ID, the wireless communication terminal decoding the A-Control sub-field may determine the corresponding bit as a padding bit when the value of the Control ID field in the A-Control sub-field is continuously 0. In a specific embodiment, after the Control ID subfield with 0 is decoded, when 0 is decoded again at the position corresponding to the Control ID subfield, the wireless communication terminal that decodes the A-Control sub-field may determine that there is no additional Control information to be decoded. Also, when 0 is decoded at the position corresponding to the Control ID subfield contrary to the Control ID sort order, the wireless communication terminal that decodes the Control subfield may determine that there is no Control information to be decoded further.

In another specific embodiment, the wireless communication terminal may indicate that there is no Control subfield after the corresponding field via a specific Control ID sub-field value. At this time, when the Control ID subfield having the specific Control ID subfield value is decoded, the wireless communication terminal that decodes the A-Control sub-field may determine that there is no additional Control information to be decoded.

FIG. 28 shows the format of an A-Control sub-field of a control sub-field according to another embodiment of the present invention.

The Control sub-field included in the A-Control sub-field may include information indicating whether the corresponding Control field is the last Control sub-field included in the A-Control sub-field. Specifically, the information indicating whether the corresponding Control field is the last Control sub-field included in the A-Control sub-field may be a 1-bit field. Also, the information indicating whether the corresponding Control field is the last Control sub-field included in the A-Control sub-field may be referred to as an End of Control field. In this embodiment, the wireless communication terminal that decodes the A-Control sub-field may stop decoding the A-Control sub-field based on the End of Control field. Specifically, when the End of Control field indicates that the corresponding Control sub-field is the last Control sub-field of the A-Control sub-field, the wireless communication terminal decoding the A-Control sub-field may determine that there is no Control information to be additionally decoded after the field of the corresponding Control sub-field. Specifically, the format of the control subfield may be as shown in FIG. 28.

The length of the HE variant transmitted by the wireless communication terminal according to the embodiment of the present invention may be variable. This is because when the field of the HE variant is fixed, the wireless communication terminal may not be able to insert all the necessary Control information into the HE variant field. This will be described with reference to FIGS. 29 to 32.

Figure 29:
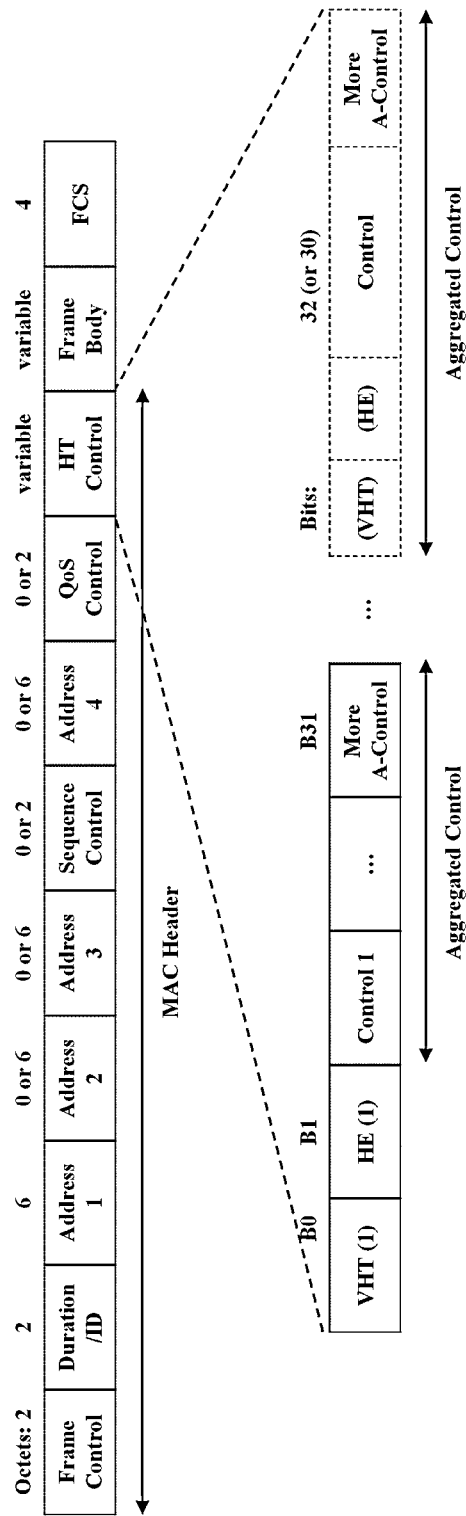
FIGS. 29 to 33 show a frame format and an HE variant format of an HT Control field according to another embodiment of the present invention.

FIG. 29 shows a frame format and an HE variant format of an HT Control field according to another embodiment of the present invention.

Specifically, the wireless communication terminal may insert a plurality of HE variants into the HT Control field to transmit the HT Control field. At this time, the wireless communication terminal may insert a field indicating that there are more HE variants to be decoded in the HE variant. A field indicating that there is more HE variant may be referred to as a More A-Control subfield. For example, when the value of the More A-Control subfield is 1, the wireless communication terminal that decodes the HT Control field may decode the following bits into an HE variant after the corresponding HE variant. The More A-Control subfield may be placed in the last bit of the HE variant. Also, the More A-Control sub-field may be placed in the first bit of the A-Control sub-field. Further, the More A-Control sub-field may be placed immediately after two bits indicating the variant included in the A-Control sub-field. In addition, the More A-Control subfield may be placed in front of the extended HE variant.

In a specific embodiment, the length of the A-Control subfield may be extended in units of 32 bits. Also, even if the A-Control subfield is extended, the first bit B0 and the second bit B1 of the A-Control subfield indicating the variant included in the HT Control field may not be repeated. Also, in a specific embodiment, the length of the HE variant added after the first HE variant may be 30 bits. The specific format of the HT Control field and the concrete form of the HE Variant may be as shown in FIG. 29.

Figure 30:
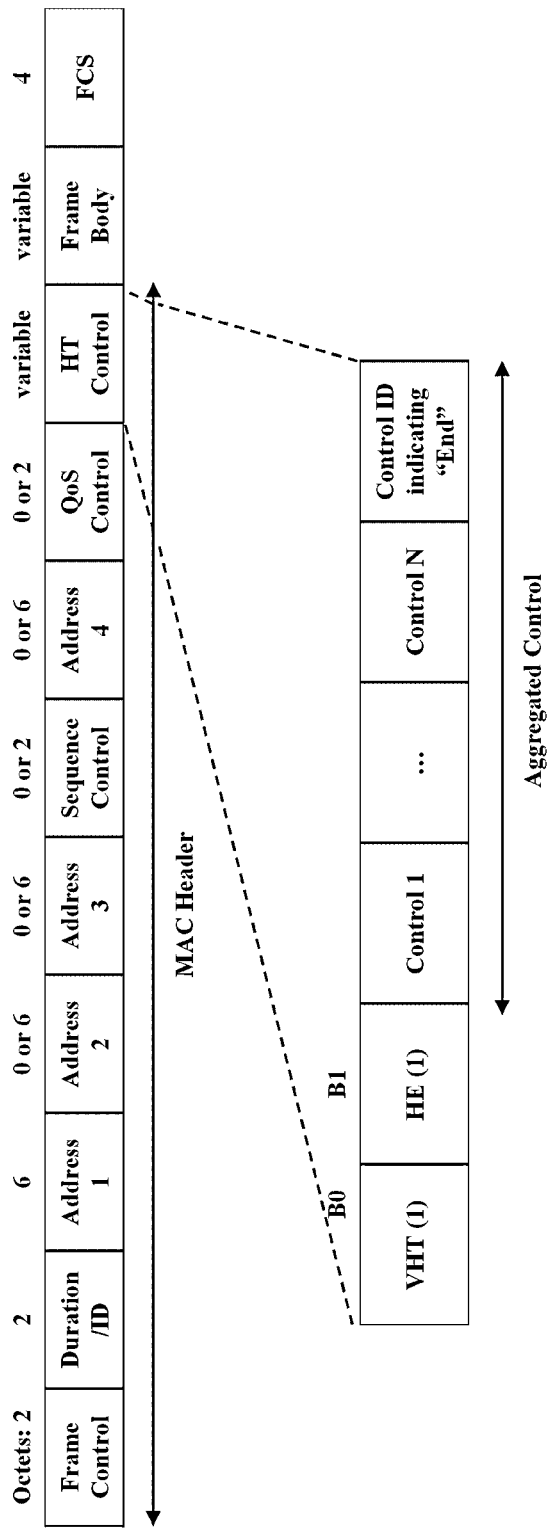

FIG. 30 shows a frame format and an HE variant format of an HT Control field according to another embodiment of the present invention.

When the HE Control subfield is an HE variant, the wireless communication terminal may insert a specific Control ID value indicating the end of the HE variant. At this time, the wireless communication terminal that decodes the HE Control subfield may determine the end of the HE Control subfield by decoding a specific Control ID value indicating the end of the HE variant. The format of the specific HE Control subfield may be as shown in FIG. 30.

Figure 31:
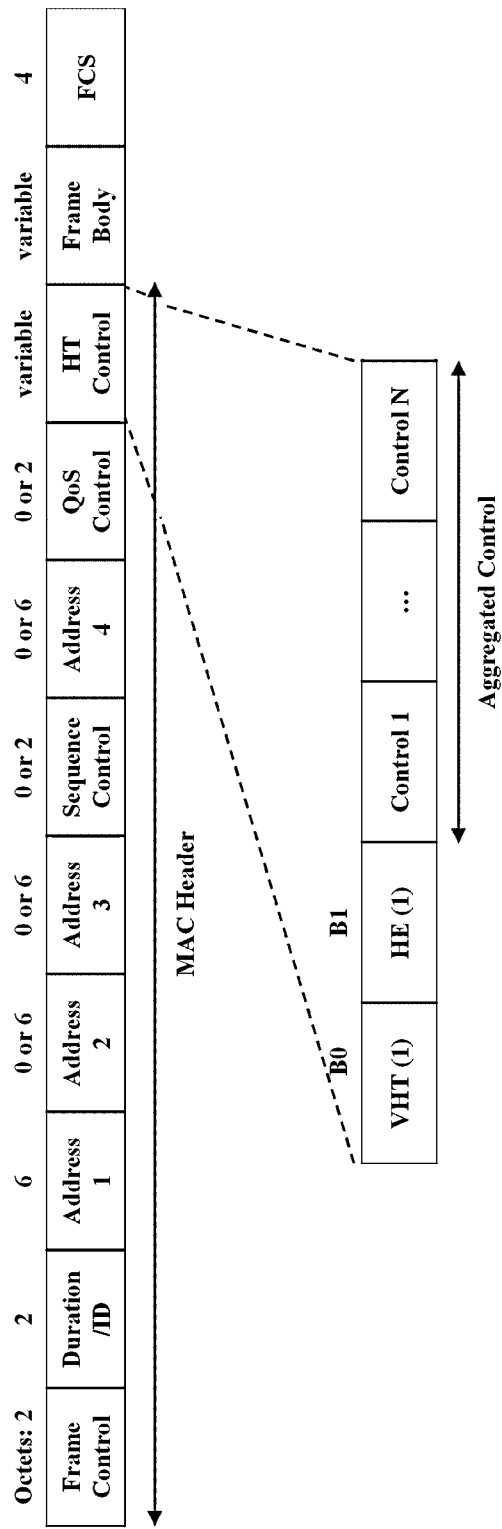

FIG. 31 shows a frame format and an HE variant format of an HT Control field according to another embodiment of the present invention.

When the length of the HE variant transmitted by the wireless communication terminal is variable, the wireless communication terminal may transmit the HE variant by inserting the End of Control field described above into the Control subfield. The wireless communication terminal that decodes the HT Control field may determine the end of the HT Control field based on the End of Control field. The format of the specific HE Control subfield may be as shown in FIG. 31.

Figure 32:
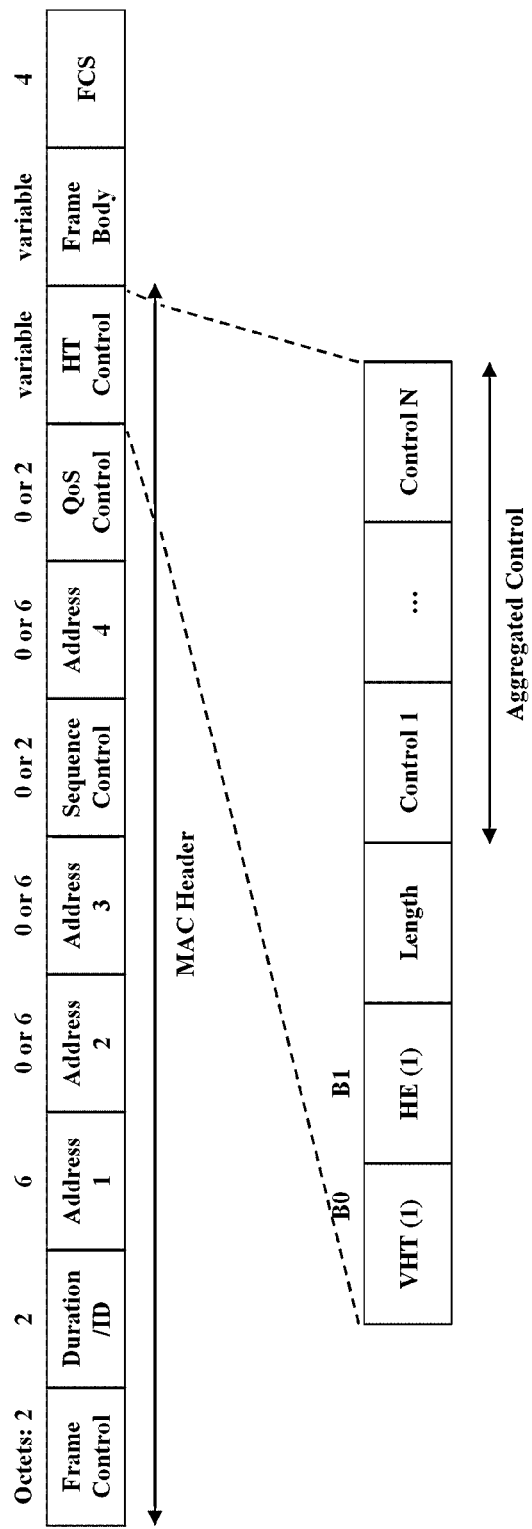

FIG. 32 shows a frame format and an HE variant format of an HT Control field according to another embodiment of the present invention.

When the length of the HE variant transmitted by the wireless communication terminal is variable, the wireless communication terminal may insert a Length subfield indicating the length of the A-control field into the HE variant and transmit the HE subfield. Specifically, the Length subfield may indicate −1, which is the number of Control sub-fields following the Length sub-field. At this time, the Length subfield may have the same number of bits as the Control ID. In another specific embodiment, the Length subfield may indicate the number of unit lengths with which the A-Control subfield extends. For example, when the A-Control subfield is extended in units of bytes, the Length subfield may indicate the total number of bytes of the A-Control subfield or the number of bytes of the extended A-Control subfield. In another specific embodiment, when the A-Control sub-field is extended in units of 32 bits or 30 bits, the Length subfield may indicate a value obtained by dividing the length of the extended A-Control subfield by 32 bits or 30 bits, or may indicate a value obtained by dividing the total length of the A-Control subfield by 32 bits or 30 bits.

Figure 33:
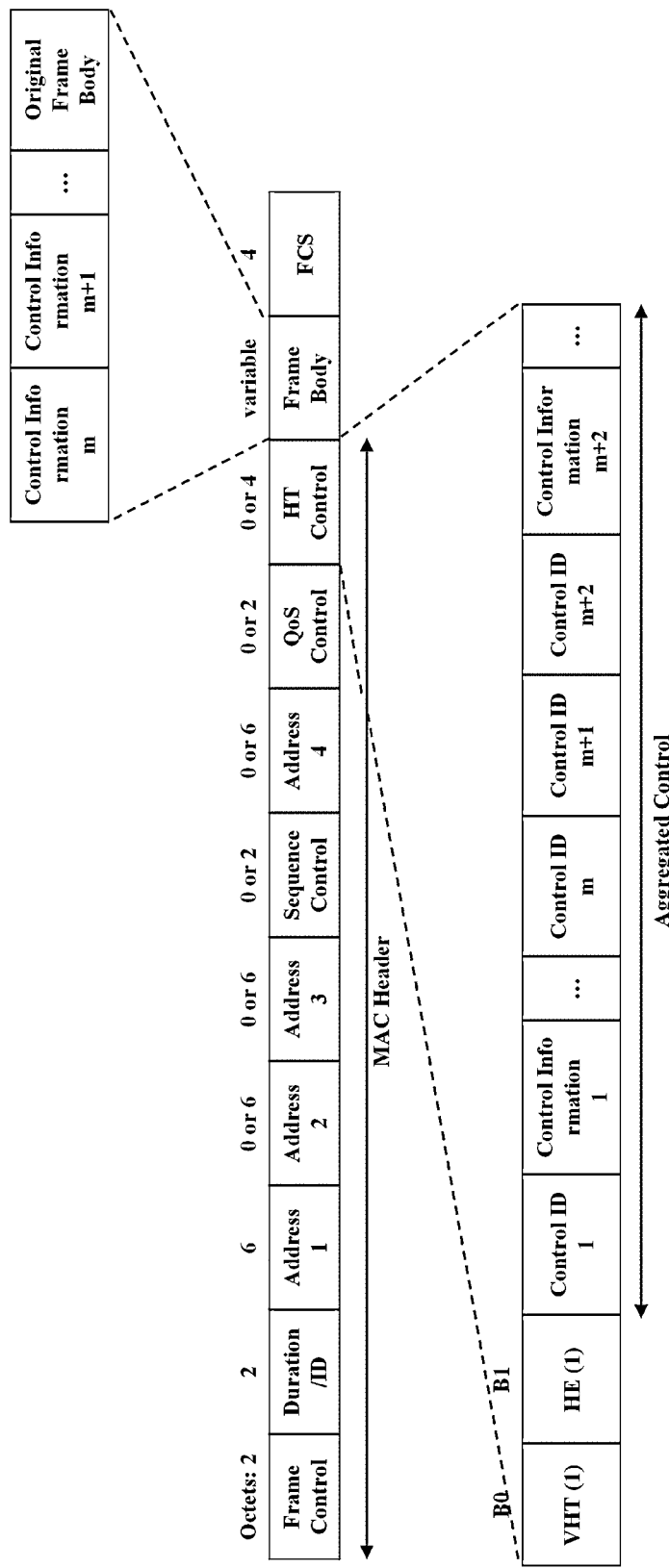

FIG. 33 shows a frame format and an HE variant format of an HT Control field according to another embodiment of the present invention.

The wireless communication terminal may transmit the control information through the body of the frame. Specifically, the wireless communication terminal may transmit Control information that is included in the A-Control field through the body of the frame. The total length of the MAC header or the length of the HT Control field may be limited, and in this case, this is because there is Control information required for a wireless communication terminal receiving a frame without being included in the HT Control. In a specific embodiment, the wireless communication terminal transmits the Control ID field through the HT Control field and transmits the Control Information field corresponding to the Control ID field through the body of the frame. Specifically, the wireless communication terminal transmits the Control ID field corresponding to the specific value through the HT Control field and transmits the Control Information field corresponding to the Control ID field through the body of the frame. In another specific embodiment, when the length of the Control Information field is greater than or equal to the reference value, the wireless communication terminal transmits the Control ID field through the HT Control field and transmits the Control Information field corresponding to the Control ID field through the body of the frame. For example, when the length of the Control Information field is long, such as information on BlockAck or information on BlockAck Request, the wireless communication terminal may transmit the Control Information field through the frame Body. At this time, when a plurality of Control ID fields are transmitted through the HT Control field and a plurality of Control Information fields corresponding to the plurality of Control ID fields are transmitted through the frame Body, the wireless communication terminal may insert a Control Information field corresponding to the Control ID field into the body of the frame according to the sort order of the Control ID field. In the embodiment of FIG. 33, there are Control ID m and Control ID m+1 in the HT Control field, and the wireless communication terminal inserts them into the HT Control field in the order of Control ID m and Control ID m+1. Since the Control Information length corresponding to a plurality of Control IDs is long, the wireless communication terminal inserts the Control Information corresponding to the Control ID into the frame Body. At this time, the wireless communication terminal inserts Control Information into the frame Body in the order of Control Information corresponding to Control ID m and Control Information corresponding to Control ID m+1.

In another specific embodiment, if the HT Control field is of limited length, the wireless communication terminal transmits the Control ID field through the HT Control field and transmits the Control Information field corresponding to the Control ID field through the body of the frame. In addition, the length of the HT Control field may be fixed to 32 bits (4 bytes). In addition, the wireless communication terminal may transmit information indicating that a Control Information field corresponding to the Control ID field is included in the body of the frame. In addition, the wireless communication terminal may transmit information indicating that a Control Information field corresponding to the Control ID field is included in the body of the frame. In another specific embodiment, the wireless communication terminal may transmit information indicating the end of the Control subfield. At this time, the information indicating the end of the Control subfield may be a 1-bit field. At this time, the wireless communication terminal may transmit information indicating the end of the Control subfield as in the embodiment described with reference to FIG. 28 to FIG. 32.

In these embodiments, the wireless communication terminal receiving the frame may obtain the Control ID field in the HT Control field and obtain the Control Information field corresponding to the Control ID field from the Body of the frame.

Any one of the wireless communication terminals may transmit a trigger frame for triggering the transmission of the plurality of wireless communication terminals to the plurality of wireless communication terminals. At this time, the plurality of wireless communication terminals may transmit a response frame to the trigger frame to the wireless communication terminal that transmits the trigger frame based on the trigger frame. Through this operation, a plurality of wireless communication terminals may simultaneously transmit frames to one wireless communication terminal. Operations based on the trigger frame of the wireless communication terminal will be described with reference to FIGS. 34 to 44.

FIG. 34 shows a format of a trigger frame according to an embodiment of the present invention.

The trigger frame may include a Frame Control field indicating information on frame control. Further, the trigger frame may include a Duration/ID field indicating a duration used for NAV setting. In addition, the trigger frame may include an RA field indicating a receiver address and a TA field indicating a transmitter address. When the trigger frame triggers a plurality of wireless communication terminals, the RA field may be a multicast address or a broadcast address indicating a plurality of wireless communication terminals. When the trigger frame triggers one wireless communication terminal, the RA field may indicate the MAC address of the corresponding wireless communication terminal. Further, the trigger frame may include an FCS field indicating whether or not the trigger frame includes an error.

In addition, the trigger frame may include a Common Info field and one or more Per User Info fields. The Common Info field may indicate information that is commonly applied to a plurality of wireless communication terminals triggered by the trigger frame. The Per User Info field may indicate information applied to each of a plurality of wireless communication terminals triggered by the trigger frame. At this time, the number of Per User Info fields may be determined according to the number of the plurality of wireless communication terminals triggered by the trigger frame. The trigger frame may include a Padding field. At this time, the Padding field may allow time for the wireless communication terminal receiving the trigger frame to process the trigger frame. The format of the specific trigger frame may be as shown in FIG. 34.

FIG. 35 shows the format of a Common Info field and a Per User Info field of a trigger frame according to the embodiment of the present invention.

The Common Info field may include a length of the trigger-based PPDU or a Length field indicating the L-SIG Length field of the trigger-based PPDU. At this time, the Length field may be a 12-bit field. In addition, the Common Info field may include a Cascade Indication field indicating that there is a subsequent trigger frame after the trigger frame. The Common Info field may include a CS Required field indicating whether channel sensing is required when transmitting a trigger-based PPDU. At this time, the channel sensing may include virtual channel sensing and energy detection (ED) for determining whether NAV is set or not. In addition, the trigger frame may include a HE-SIG-A Info field indicating information to be inserted in the HE-SIG-A field of the trigger-based PPDU. At this time, the information that the wireless communication terminal receiving the trigger frame may recognize by itself may be omitted in the trigger frame. In addition, the trigger frame may include a CP and LTF Type field indicating a combination of LTF and Cyclic Prefix (CP) of the trigger-based PPDU. In addition, the trigger frame may include a Trigger Type field indicating the type of the trigger frame. At this time, the type of the trigger frame may indicate any one of a basic trigger, a beamforming report, a poll trigger, an MU-BAR, and an MU-RTS. In addition, the trigger frame may include a Trigger Dependent Common Info field whose format is determined according to the trigger type. A specific form of the Common Info field may be the same as that shown in FIG. 35(a).

The Per User Info field may include a User Identifier field indicating a wireless communication terminal corresponding to Per User Info. At this time, the User Identifier field may indicate the AID of the wireless communication terminal corresponding to Per User Info. Also, the Per User Info field may include an RU Allocation field indicating information on an RU allocated to a wireless communication terminal corresponding to the User Identifier field. Also, the Per User Info field may include a Coding Type field to be used by the corresponding wireless communication terminal when the wireless communication terminal corresponding to the User Identifier field transmits the trigger-based PPDU. Specifically, the Coding Type field may indicate either BCC or LDPC. Also, when the wireless communication terminal corresponding to the User Identifier field transmits the trigger-based PPDU, the Per User Info field may include a DCM field indicating whether the corresponding wireless communication terminal uses Dual Carrier Modulation (DCM). In addition, the Per User Info field may include an SS Allocation field indicating a spatial stream to be used by the wireless communication terminal when the wireless communication terminal corresponding to the User Identifier field transmits the trigger-based PPDU. Also, the Per User Info field may include a Trigger Dependent Per User Info field which format is determined according to the type of the trigger frame. Specifically, the format of the Per User Info field may be the same as that shown in FIG. 35(b).

FIG. 36 shows a Common Info field and a Per User Info field of a trigger frame according to another embodiment of the present invention.

When a wireless communication terminal triggered by a trigger frame transmits a trigger-based PPDU, the Common Info field may include a Spatial Reuse field indicating a value of a Spatial Reuse field to be inserted in the HE-SIG-A field of the PPDU by the corresponding wireless communication terminal. Also, when a wireless communication terminal triggered by a trigger frame transmits a trigger-based PPDU, the Common Info field may include a BW field indicating a value to be inserted in the BW field of the HE-SIG-A by the corresponding wireless communication terminal. Also, when a wireless communication terminal triggered by a trigger frame transmits a trigger-based PPDU, the Common Info field may include an MU MIMO LTF Mode field indicating an MU MIMO LTF mode to be used by the corresponding wireless communication terminal. Also, when a wireless communication terminal triggered by a trigger frame transmits a trigger-based PPDU, the Common Info field may include a Number of LTFs field indicating the number of LTFs to be used by the corresponding wireless communication terminal. Also, when a wireless communication terminal triggered by a trigger frame transmits a trigger-based PPDU, the Common Info field may include an STBC field indicating whether the wireless communication terminal uses the STBC. Also, when a wireless communication terminal triggered by a trigger frame transmits a trigger-based PPDU, the Common Info field may include an LDPC Extra Symbol field indicating whether or not the LDPC additional symbol is present when the corresponding wireless communication terminal is used. Also, when a wireless communication terminal triggered by a trigger frame transmits a trigger-based PPDU, the Common Info field may include an AP TX Power field indicating the transmission power to be used by the wireless communication terminal. Also, when a wireless communication terminal triggered by a trigger frame transmits a trigger-based PPDU, the Common Info field may include a Packet Extension field indicating information on a packet extension of a PPDU transmitted by the corresponding wireless communication terminal. Other fields included in the Common Info field may be the same as the embodiment described with reference to FIG. 35(a). Specifically, the Common Info field may be the same as the embodiment of FIG. 35(a).

When a wireless communication terminal corresponding to the User Identifier field transmits a trigger-based PPDU, the Per User Info field or the Target RSSI field may include an RSSI field indicating an RSSI value to be targeted by the wireless communication terminal.

FIG. 37 shows a Trigger Dependent Common Info field and a Trigger Dependent Per User Info field of an MU-BAR type trigger frame according to an embodiment of the present invention.

The wireless communication terminal, which is an AP, may transmit a data frame to a plurality of wireless communication terminals and request transmission of an ACK frame for the corresponding data frame. Specifically, a wireless communication terminal, which is an AP, may trigger ACK frame transmission of a plurality of wireless communication terminals through a trigger frame. At this time, the trigger frame type may be MU-BAR type.

Also, when a wireless communication terminal, which is an AP, transmits a group cast frame to a plurality of wireless communication terminals and one of the non-AP wireless communication terminals fails to receive a group cast frame, Group Cast Retries (GCR) BlockACK may be transmitted. At this time, the wireless communication terminal, which is an AP, may trigger GCR BlockACK transmission of a plurality of wireless communication terminals through a trigger frame. For this, the Common Info field of the trigger frame may include information related to the GCR. At this time, the trigger frame type may be MU-BAR type or MU-BAR type for GCR. Specifically, when the type of the trigger frame is MU-BAR type or MU-BAR type for GCR, the Common Info field of the trigger frame may include a GCR Indication field indicating whether the trigger frame is an MU-BAR for GCR. In addition, the Common Info field of the trigger frame may include a GCR Address field indicating the address of the GCR group triggered by the trigger frame. Specifically, the Common Info field included in the trigger frame of the MU-BAR type may be the same as the embodiment of FIG. 37(a).

In addition, the Trigger Dependent Per User Info field of the trigger frame may include a BAR control field including information about the BAR frame control. In addition, the Trigger Dependent Per User Info field of the trigger frame may include a BAR Information field including information on the BAR frame. In the specific embodiment, the BAR Control field and the BAR Information field may be the same as the format of the trigger frame of the BlockAckReq type. In another specific embodiment, the BAR Control field and the BAR Information field may be a structure in which one or more fields are omitted from the field format of the Trigger of the BlockAckReq type. For example, the wireless communication terminal may use the MU-BAR type or the MU-BAR type trigger frame for the GCR by omitting the information included in the Trigger Dependent Common Info of the Trigger Frame of the BlockAckReq type. Specifically, the wireless communication terminal inserts a GCR Indication field in Trigger Dependent Common Info of a Trigger Frame of BlockAckReq type and omits the GCR Indication field in the BAR Control field. In another specific embodiment, the wireless communication terminal may insert a GCR Address field in the Trigger Dependent Common Info field and omit the GCR Address field in the BAR Information field. In another specific embodiment, even when the wireless communication terminal requests the GCR BlockAck, the wireless communication terminal inserts the GCR Address field in the Trigger Dependent Common Info field and omits the GCR Address field in the BAR Information field.

FIG. 38 shows the format of the Trigger Dependent Common Info field of the MU-BAR type trigger frame according to an embodiment of the present invention.

In a specific embodiment of the present invention, when the type of trigger frame is MU-BAR type or MU-BAR type for GCR, the Trigger Dependent Common Info field of the trigger frame may include only the GCR Address field. At this time, the wireless communication terminal may set the value of the GCR Address field to a predetermined value and indicate that it is not a MU-BAR type trigger frame for GCR. Specifically, the predetermined value may be zero. The wireless communication terminal receiving the trigger frame may determine whether the corresponding trigger frame is the MU-BAR type trigger frame for GCR based on the value of the GCR Address field. Specifically, the wireless communication terminal receiving the trigger frame may determine whether the corresponding trigger frame is a MU-BAR type trigger frame for GCR, according to whether the value of the GCR Address field is a predetermined value.

In another specific embodiment, the wireless communication terminal may indicate that the MU-BAR trigger frame is a MU-BAR type trigger frame for the GCR through a Starting Sequence Control value or a TID value requested by the MU-BAR. At this time, the wireless communication terminal receiving the trigger frame may determine whether the trigger frame is a trigger frame of MU-BAR type for GCR through the Starting Sequence Control value or the TID value requested by the MU-BAR.

Also, even if the wireless communication terminal receiving the trigger frame corresponds to the address indicated by the GCR Address field, when the STA Identifier field in the Per User Info field does not indicate the wireless communication terminal receiving the trigger frame, the wireless communication terminal receiving the trigger frame may determine that the transmission is not triggered by the GCR BlockACK.

The format of the Trigger Dependent Common Info field of the specific MU-BAR type trigger frame may be the same as the embodiment of FIG. 38.

FIG. 39 shows a format of an MU-BAR type trigger frame for GCR according to an embodiment of the present invention.

The wireless communication terminal may set the RA field of the MU-BAR type trigger frame for GCR to the GCR address. Specifically, the wireless communication terminal may set the RA field of the trigger frame to the GCR address and indicate that the type of the trigger frame is the MU-BAR type for GCR. Therefore, the wireless communication terminal may omit the GCR Address field in the Common Info field. In another specific embodiment, the wireless communication terminal may not set a value in the GCR Address field in the Common Info field. Also, when the wireless communication terminal sets the RA field of the MU-BAR type trigger frame for GCR to the GCR address, the wireless communication terminal may insert only the information related to the wireless communication terminal corresponding to the GCR address in the Per User Info field of the trigger frame. The specific trigger frame format may be the same as the embodiment of FIG. 39.

FIG. 40 shows a format of an MU-BAR type trigger frame for GCR according to an embodiment of the present invention.

The wireless communication terminal may set the RA field of the MU-BAR type trigger frame for GCR to the broadcast address. At this time, the wireless communication terminal may set the GCR Address field to the GCR address in the Common Info field. In addition, when the wireless communication terminal sets the RA field of the MU-BAR type trigger frame for GCR to the broadcast address, the wireless communication terminal may request an ACK frame other than GCR BlockACK with the GCR BlockACK via the corresponding trigger frame. Therefore, when the wireless communication terminal sets the RA field of the MU-BAR type trigger frame for GCR to the broadcast address, the wireless communication terminal may insert information on the wireless communication terminal corresponding to the GCR address and information on the wireless communication terminal not corresponding to the GCR address in the Per User Info field of the trigger frame. The specific trigger frame format may be the same as the embodiment of FIG. 40.

FIG. 41 shows the format of the BAR Control field and the encoding value of the BlockACKReq variant according to an embodiment of the present invention.

As described above, when the trigger frame is the MU-BAR type, the Trigger Dependent Per User Info field of the trigger frame may include a BAR Control field. At this time, a plurality of bits included in the Trigger Dependent Per User Info field may indicate a Variant of BlockACKReq. Specifically, the Multi-TID subfield, the Compressed Bitmap subfield, and the GCR subfield included in the Trigger Dependent Per User Info field may indicate Variants of BlockACKReq. For example, the type of the trigger frame may be GCR BlockACKReq, when the value of the Multi-TID subfield is 0, the value of the Compressed Bitmap subfield is 1, and the value of the GCR subfield is 1.

As described above, when a trigger frame of MU-BAR type requests GCR BlockAck, the trigger frame of MU-BAR type may request a GCR BlockAck frame and another ACK frame together. Specifically, the wireless communication terminal may request an ACK for a plurality of TIDs from the wireless communication terminal receiving the trigger frame through the MU-BAR type trigger frame. In a specific embodiment, the wireless communication terminal may request an ACK for a plurality of TIDs including a GCR BlockACK frame from a wireless communication terminal receiving a trigger frame through a trigger frame of an MU-BAR type. For example, the wireless communication terminal may set the Multi-TID Saab field to 1, set the GCR sub-field to 1, request a GCR BlockAck, and request an ACK of another TID together. At this time, the value of the Compressed Bitmap subfield may be 0 or 1. In a specific embodiment, the format of the BAR Control field may be the same as in FIG. 41(*a*). Also, the encoding value of the BlockACKReq variant may be as shown in FIG. 41(*b*).

When the trigger frame requests a GCR BlockAck frame and another ACK frame together, the wireless communication terminal may transmit a Multi-TID BlockACK frame in response to the trigger frame. Also, when the trigger frame requests a GCR BlockAck frame and another ACK frame together, the wireless communication terminal may transmit BlockACK frames for a plurality of TIDs together with other MPDUs. Specifically, the wireless communication terminal may transmit a BlockACK frame for a plurality of TIDs and another MPDU through the A-MDPU. At this time, the BlockACK frame may be a Compressed BlockACK frame.

Figure 42:
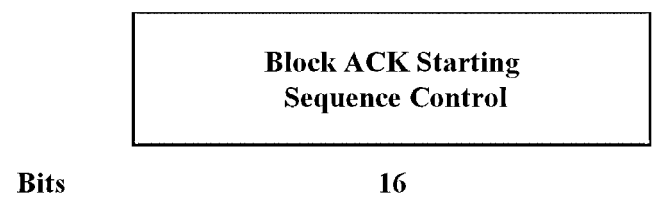
FIG. 42 shows the format of the BAR Information field according to an embodiment of the present invention.

FIG. 42 shows the format of the BAR Information field according to an embodiment of the present invention.

As described above, when the type of the trigger frame is the MU-BAR type, the Trigger Dependent User Info field may include a BAR Information field. At this time, the BAR information field includes a Block ACK Starting Sequence Control field and may not include a GCR Address field. In particular, even when the type of the trigger frame is the MU-BAR type for GCR, the BAR Information field includes the Block ACK Starting Sequence Control field and may not include the GCR Address field. Also, when the type of the trigger frame is the MU-BAR type, the Common Info field may include a GCR Address field. Specifically, when the type of the trigger frame is the MU-BAR type, the Trigger Dependent Common Info field may include a GCR Address field. This is because the GCR Address field is information commonly applied to a plurality of wireless communication terminals through which GCR BlockACK transmission is triggered via the MU-BAR. Specifically, the format of the BAR Information field may be the same as the embodiment of FIG. 42.

Figure 43:
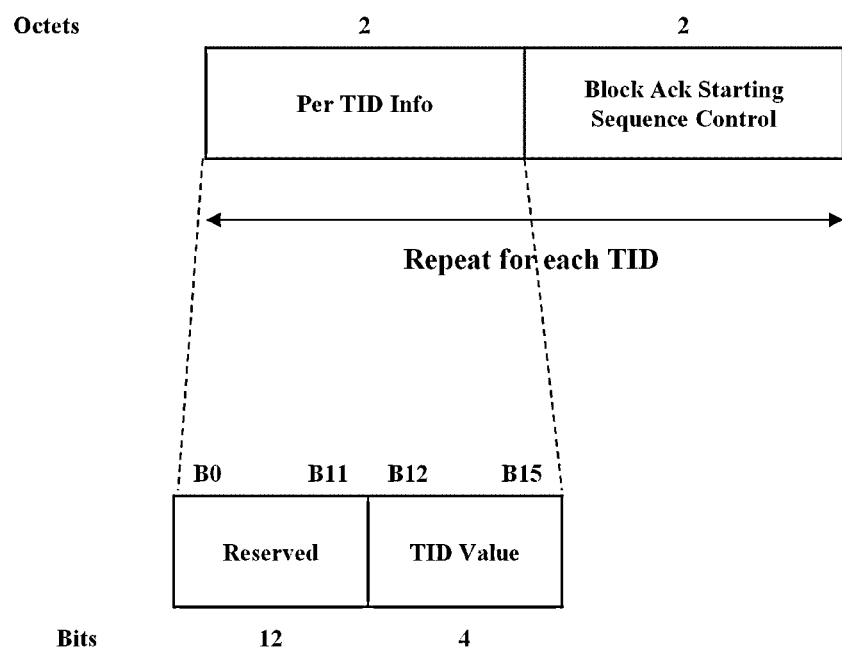
FIG. 43 shows a BAR Information field according to another embodiment of the present invention.

FIG. 43 shows a BAR Information field according to another embodiment of the present invention.

When the type of the trigger frame is the MU-BAR type and the wireless communication terminal requests an ACK for a plurality of TIDs, the wireless communication terminal may generate and transmit a BAR Information field classified by TID. Specifically, when the type of the trigger frame is the MU-BAR type for GCR and the wireless communication terminal requests an ACK for a plurality of TIDs, the wireless communication terminal may generate and transmit a BAR information field for each TID. At this time, the BAR information field may include a Per TID Info field and a Block ACK Starting Sequence field by TID. At this time, the Per TID Info field may include a TID subfield indicating the TID. For example, the concrete format of the BAR Information field may be the same as the embodiment of FIG. 43. The length of the BAR Information field may vary depending on the number of TIDs requesting an ACK. Specifically, the length of the Trigger Dependent Per User Info field may vary depending on the number of TIDs requesting ACK. Therefore, the length of the Per User Info field may vary depending on the number of TIDs requesting ACK. The wireless communication terminal transmitting the trigger frame may signal the number of TIDs through the TID_INFO field of the BAR Control field of the trigger frame. The wireless communication terminal receiving the trigger frame may determine the length of the Per User Info field based on the TID_INFO field of the BAR Control field of the trigger frame.

Figure 44:
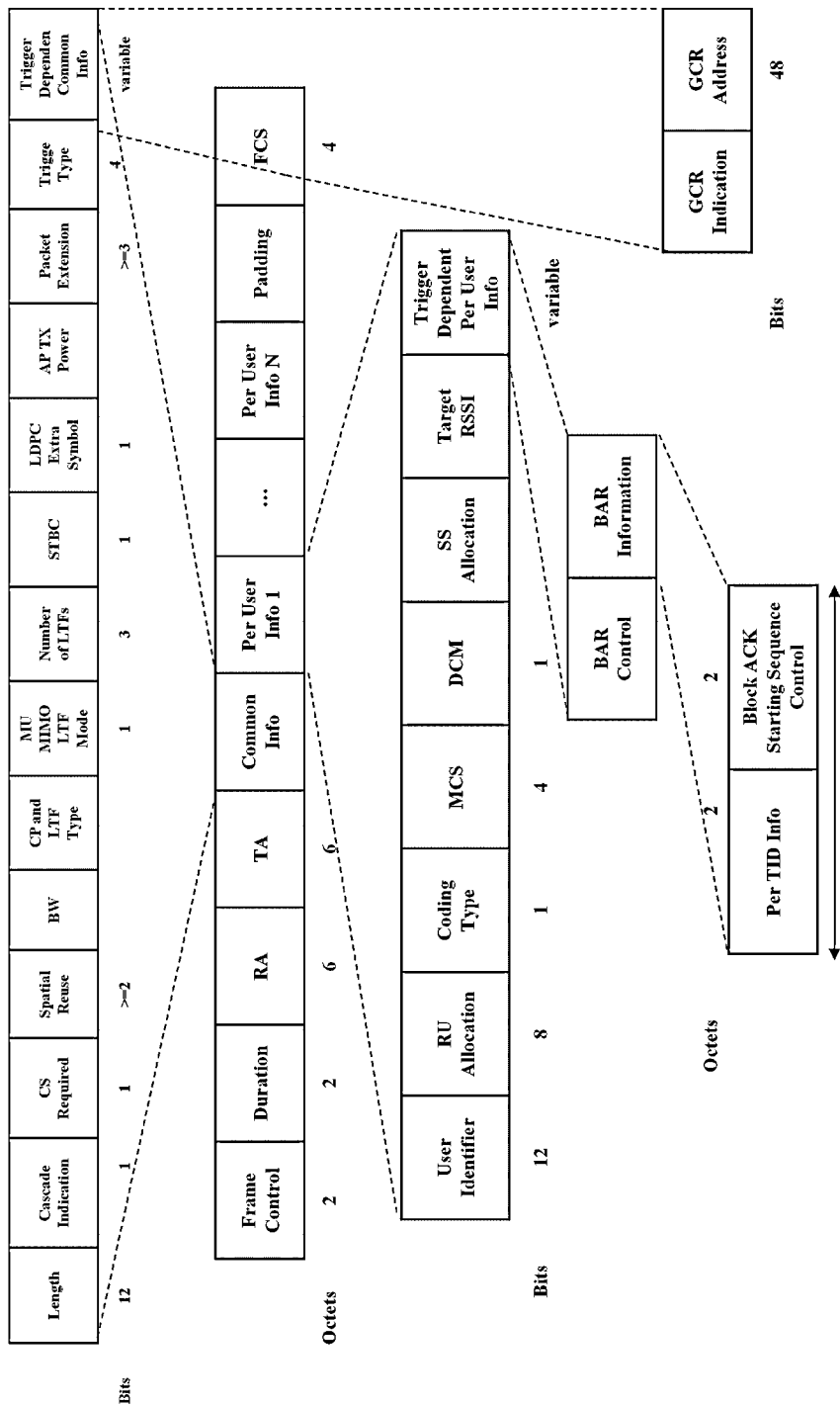
FIG. 44 shows a trigger frame structure according to another embodiment of the present invention.

FIG. 44 shows a trigger frame structure according to another embodiment of the present invention.

The trigger frame may have a format as described in FIG. 34. At this time, the format of the Common Info field and the Per User Info field may be the same as any of the embodiments described with reference to FIGS. 35 to 36. In addition, the format of the Trigger Dependent Per User Info field may be the same as the embodiment described with reference to FIG. 37. Also, the format of the Trigger Dependent Common Info field may be the same as the embodiment described with reference to FIG. 37 and FIG. 38. In addition, the format of the BAR Information field may be the same as the embodiment described with reference to FIG. 43.

Figure 45:
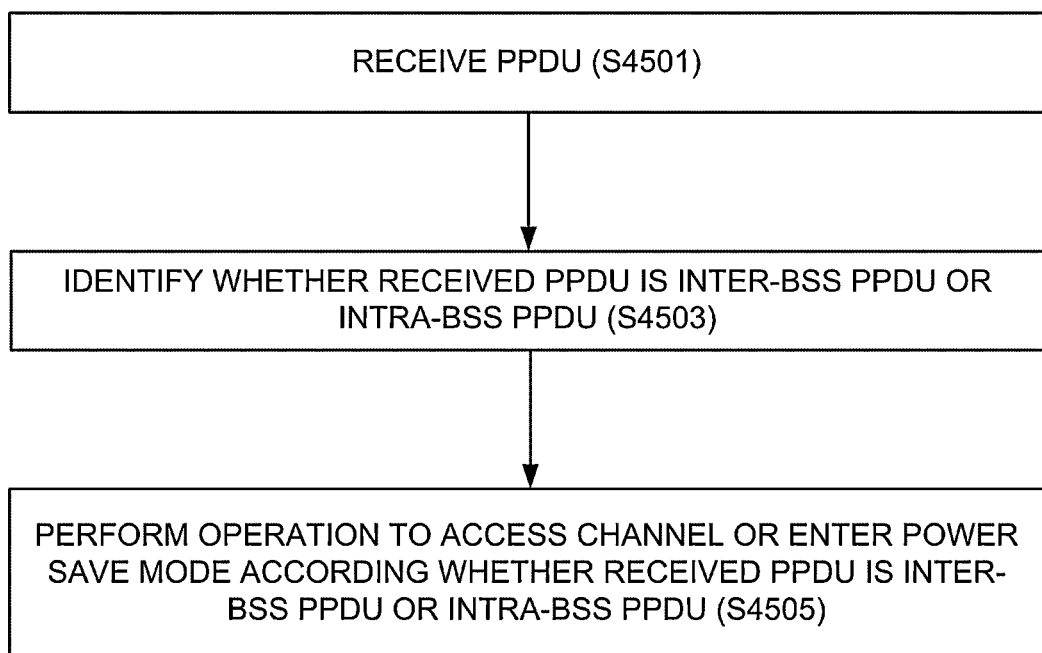
FIG. 45 shows the operation of a wireless communication terminal according to an embodiment of the present invention.

FIG. 45 shows the operation of a wireless communication terminal according to an embodiment of the present invention.

The wireless communication terminal receives the PPDU (S4501).

The wireless communication terminal identifies whether the PPDU is an Inter-BSS PPDU or an Intra-BSS PPDU (S4503). In addition, when the PPDU received by the wireless communication terminal is not identified as Inter-BSS PPDU or Intra-BSS PPDU, this may be a case where the received PPDU lacks information for determining a BSS from which the received PPDU is transmitted. As described above, the wireless communication terminal may identify whether the received PPDU is an Inter-BSS PPDU or an Intra-BSS PPDU based on the MAC header of the MAC frame included in the PPDU. When a wireless communication terminal, which is an AP, receives a trigger-based PPDU from a wireless communication terminal that is not triggered by the wireless communication terminal, which is an AP, the wireless communication terminal, which is an AP, may identify the corresponding PPDU as an Inter-BSS PPDU. In a specific embodiment, when the wireless communication terminal, which is an AP, does not transmit the trigger frame but receives the trigger-based PPDU, the wireless communication terminal, which is an AP, may identify the PPDU as an Inter-BSS PPDU. Also, based on whether the received PPDU includes a trigger frame, the wireless communication terminal, which is an AP, may determine whether the corresponding PPDU is a PPDU for downlink transmission. Specifically, the wireless communication terminal, which is an AP, may identify whether the corresponding PPDU is an Inter-BSS PPDU based on the SR-related information. At this time, the SR-related information may be an SR field signaled by the PPDU described above. The wireless communication terminal may identify whether the PPDU received through at least one of the above conditions is an Inter-BSS PPDU or an Intra-BSS PPDU.

Also, when the PPDU received by the wireless communication terminal satisfies both the Inter-BSS PPDU condition and the Intra-BSS PPDU condition, the wireless communication terminal may identify whether the corresponding PPDU is an Inter-BSS PPDU or an Intra-BSS PPDU based on conditions other than BSS color. As described above, this is because the BSS color value may have a BSS color collision due to the limitation of the value. In a specific embodiment, the wireless communication terminal may identify whether the received PPDU is an Inter-BSS PPDU or an Intra-BSS PPDU according to the embodiments described with reference to FIGS. 6 to 23. Specifically, when the PPDU received by the wireless communication terminal satisfies both the Inter-BSS PPDU condition and the Intra-BSS PPDU condition, the wireless communication terminal may identify the corresponding PPDU as an Inter-BSS PPDU.

The wireless communication terminal may perform an operation related to channel access according to whether the received PPDU is an Inter-BSS PPDU or an Intra-BSS PPDU. In addition, the wireless communication terminal may enter a power save mode depending on whether the received PPDU is an Inter-BSS PPDU or an Intra-BSS PPDU (S4505). At this time, the operation related to the channel access may include at least one of the operation for setting the CCA threshold value and the operation for setting/resetting the NAV.

In addition, when the PPDU received by the wireless communication terminal may not identify the Inter-BSS PPDU or the Intra-BSS PPDU, the following operation may be performed. When the PPDU received by the wireless communication terminal is not identified as Inter-BSS PPDU or Intra-BSS PPDU, the wireless communication terminal may regard the PPDU as an Inter-BSS PPDU. Specifically, when the PPDU received by the wireless communication terminal is not identified as Inter-BSS PPDU or Intra-BSS PPDU, the wireless communication terminal may set Basic NAV based on the received PPDU. For example, when the PPDU received by the wireless communication terminal may not be identified as Inter-BSS PPDU or Intra-BSS PPDU, the wireless communication terminal may set the Basic NAV based on the TXOP Duration field indicated by the HE-SIG-A field of the corresponding PPDU.

When the PPDU received by the wireless communication terminal may not be identified as Inter-BSS PPDU or Intra-BSS PPDU, the wireless communication terminal may not enter the power save mode based on the BSS color signaled by the PPDU.

The wireless communication terminal may reset the currently set NAV when the BSS from which the PPDU setting the currently set NAV is transmitted and the BSS from which the CF-End frame is transmitted are the same. Additionally, the wireless communication terminal may not reset the NAV when the BSS from which the PPDU setting the currently set NAV is transmitted and the BSS from which the CF-End frame is transmitted are different.

Also, when the NAV is set by the PPDU that is not able to identify whether the PPDU is the Intra-BSS PPDU or the Inter-BSS PPDU based on the BSS color value indicated by the signaling field of the PPDU, the wireless communication terminal may not reset the NAV based on the CF-End frame transmitted from the Intra-BSS or the CF-End frame transmitted from the BSS corresponding to the multiple-BSSID set including the BSSID corresponding to the BSS of the wireless communication terminal.

A case where the PPDU received by the wireless communication terminal may not be identified as Inter-BSS PPDU or Intra-BSS PPDU may be a case where it may be impossible to identify whether the PPDU received by the wireless communication terminal based on the BSS color is an Inter-BSS PPDU or an Intra-BSS PPDU, due to the BSS color collision. If the wireless communication terminal is not able to identify whether the PPDU received based on the BSS color is the Inter-BSS PPDU or the Intra-BSS PPDU, the wireless communication terminal may not operate on the basis of the BSS color that the received PPDU signals. Specifically, if the wireless communication terminal is not able to identify whether the PPDU received based on the BSS color is the Inter-BSS PPDU or the Intra-BSS PPDU, the wireless communication terminal may not set the Intra-BSS NAV based on the BSS color and the TXOP Duration field that the HE-SIG-A field of the received PPDU signals. Specifically, when the wireless communication terminal recognizes the BSS color collision, the wireless communication terminal may not set the intra-BSS NAV based on the TXOP Duration field indicated by the HE-SIG-A field. When the wireless communication terminal receives the signaling information indicating that the operation based on the BSS color is not allowed, the wireless communication terminal may not set the Intra-BSS NAV based on the BSS color and the TXOP Duration field of the HE-SIG-A field of the PPDU.

In addition, when the wireless communication terminal is not be able to identify whether the PPDU received is the Inter-BSS PPDU or the Intra-BSS PPDU based on the BSS color, the wireless communication terminal may set the Basic NAV based on the BSS color and the TXOP Duration field that the HE-SIG-A field of the received PPDU signals. Specifically, when the wireless communication terminal recognizes the BSS color collision, the wireless communication terminal may set the Basic NAV based on the TXOP Duration field indicated by the HE-SIG-A field. When the wireless communication terminal receives the signaling information indicating that the operation based on the BSS color is not allowed, the wireless communication terminal may set the Basic NAV based on the BSS color and the TXOP Duration field of the HE-SIG-A field of the PPDU.

Specifically, if the wireless communication terminal is not able to identify whether the PPDU received based on the BSS color is the Inter-BSS PPDU or the Intra-BSS PPDU, the wireless communication terminal may not enter the power save mode based on the BSS color that the HE-SIG-A field of the received PPDU signals.

In addition, when the PPDU received by the wireless communication terminal may not be identified as Inter-BSS PPDU or Intra-BSS PPDU, this may be a case where the received PPDU lacks information for determining the transmitted BSS. Specifically, when the PPDU received by the wireless communication terminal is not identified as Inter-BSS PPDU or Intra-BSS PPDU, the wireless communication terminal may not decode the MAC header of the MAC frame included in the PPDU. Also, a case where the PPDU received by the wireless communication terminal is not identified as Inter-BSS PPDU or Intra-BSS PPDU may be a case where it may be impossible to identify whether the received PPDU is an Inter-BSS PPDU or an Intra-BSS PPDU according to various methods described above.

In addition, the wireless communication terminal may transmit the PPDU by including signaling information indicating that the operation based on the BSS color is not allowed in the signaling field of the PPDU. At this time, the wireless communication terminal receiving the PPDU including the corresponding signaling information may not perform the operation based on the BSS color. In a specific embodiment, the wireless communication terminal may transmit the BSS color value indicated by the signaling field of the PPDU by setting it to a predetermined value. At this time, the predetermined value may be a reserved value which is not used in the BSS color when the BSS color is selected by the AP. For example, the predetermined value may be zero. In addition, when the wireless communication terminal receives the PPDU indicating the predetermined value as the BSS color, the wireless communication terminal may not perform the operation based on the BSS color. Specifically, when the wireless communication terminal receives a PPDU indicating a predetermined value in a BSS color, the wireless communication terminal may not perform the SR operation on the corresponding PPDU. In a specific embodiment, when the wireless communication terminal receives a PPDU indicating a predetermined value in a BSS color, the wireless communication terminal may treat the PPDU as an Intra-BSS PPDU. Accordingly, when the wireless communication terminal receives a PPDU indicating a predetermined value in a BSS color, the wireless communication terminal may not discard the corresponding PPDU.

As described above, the wireless communication terminal may transmit the BSS color indicating the BSS including the wireless communication terminal when communicating with another wireless communication terminal. At this time, when the wireless communication terminal does not receive the information signaling the BSS color, the wireless communication terminal may transmit the predetermined value as the BSS color. At this time, the predetermined value may be a reserved value which is not used in the BSS color when the BSS color is selected by the AP. For example, the predetermined value may be zero. Specifically, when the wireless communication terminal does not receive the information signaling the BSS color, the non-AP wireless communication terminal may transmit a predetermined value as the BSS color when communicating with other wireless communication terminals. In a specific embodiment, if the wireless communication terminal does not receive the information signaling the BSS color, the wireless communication terminal may set the BSS color value that the PPDU transmitted by the wireless communication terminal signals, to a predetermined value. Also, when the wireless communication terminal does not receive information signaling the BSS color, the wireless communication terminal may set the BSS color value that the frame transmitted by the wireless communication terminal signals, to a predetermined value. When the wireless communication terminal does not receive the information that signals the BSS color, there is no BSS color. Specifically, when the wireless communication terminal does not receive the information signaling for the BSS color, the wireless communication terminal may not associate with any AP. Also, a case where the wireless communication terminal does not receive the information signaling the BSS color may include a case where the wireless communication terminal fails to establish a Tunneled Direct Link Setup (TDLS) link, a Direct Link Setup (DLS) link, or an IBSS (Independent) membership. Also, a case where the wireless communication terminal does not receive the information signaling the BSS color may include a case where the wireless communication terminal may not receive information on the changed BSS color value after receiving the information indicating that the operation based on the BSS color value is not allowed. Also, the PPDU signaling the predetermined value as the BSS color may not be identified as the Inter-BSS PPDU or the Intra-BSS PPDU based on the predetermined value of the BSS color.

In a specific embodiment, when the wireless communication terminal does not receive the HE Operation element, the wireless communication terminal may set the BSS color value included in the PPDU transmitted by the wireless communication terminal to a predetermined value. For example, the wireless communication terminal may use a predetermined value as a BSS color value when transmitting a probe request frame. Specifically, when the wireless communication terminal transmits a probe request frame, the wireless communication terminal may set the value of the BSS color field included in the HE Operation element to a predetermined value. Also, when the wireless communication terminal transmits a probe request frame, the value of the BSS color field of the HE-SIG-A field of the PPDU including the probe request frame may be set to a predetermined value.

At this time, when the wireless communication terminal receives the PPDU indicating the predetermined value as the BSS color, the wireless communication terminal may not perform the operation based on the BSS color. Specifically, when the wireless communication terminal receives a PPDU indicating a predetermined value as a BSS color, the wireless communication terminal may not perform the SR operation on the corresponding PPDU. In a specific embodiment, when the wireless communication terminal receives a PPDU indicating a predetermined value as a BSS color, the wireless communication terminal may treat the PPDU as an Intra-BSS PPDU. Accordingly, when the wireless communication terminal receives a PPDU indicating a predetermined value as a BSS color, the wireless communication terminal may not discard the corresponding PPDU.

When the wireless communication terminal accesses the channel or enters the power save mode, the specific operation of the wireless communication terminal may be the same as the embodiments through the embodiments described with reference to FIG. 6 to FIG. 23.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal communicating wirelessly, the wireless communication terminal comprising:
a transceiver; and
a processor,
wherein the processor is configured to receive a signaling information from a base wireless communication terminal to which the wireless communication terminal is associated, receive a physical layer convergence procedure (PLCP) Protocol Data Unit (PPDU) by using the transceiver, and not to use a Basic Service Set (BSS) color indicated by a signaling field of the PPDU when the signaling information indicates that an operation based on the BSS color is not allowed,
wherein the using the BSS color indicated by the signaling field of the PPDU includes classifying the PPDU as an inter-BSS PPDU or an intra-BSS PPDU according to the BSS color,
wherein the BSS color is an identifier of a BSS.

2. The wireless communication terminal of claim 1, wherein the processor is configured not to set an Intra-BSS Network Allocation Vector (NAV) by using the BSS color indicated by the signaling field of the PPDU when the signaling information indicates that the operation based on the BSS color is not allowed,
wherein the Intra-BSS NAV is different from a Basic NAV and is a NAV which is set based on an Intra-BSS PPDU,
wherein the Basic NAV is set based on an Inter-BSS PPDU or a PPDU which is not able to be identified as the Inter-BSS PPDU or the Intra-BSS PPDU.

3. The wireless communication terminal of claim 2, wherein the PPDU includes a transmission opportunity (TXOP) Duration field in the signaling field of the PPDU,
wherein the TXOP Duration field indicates information used for setting the Intra-BSS NAV and the Basic NAV,
wherein a duration field which is included in a signaling field of a medium access control (MAC) frame indicates information used for setting the Intra-BSS NAV and the Basic NAV,
wherein the processor is configured not to use the TXOP Duration field for setting the Intra-BSS NAV or the Basic NAV when the wireless communication terminal determines that the signaling field of the MAC frame is valid.

4. The wireless communication terminal of claim 1, wherein the processor is configured to signal that the operation based on the BSS color is not allowed when the wireless communication terminal recognizes that a BSS color collision has occurred,
wherein the BSS color collision represents that different BSSs correspond to one BSS color.

5. The wireless communication terminal of claim 4, wherein the processor is configured to determine that BSS color collision has occurred based on address fields of a medium access control (MAC) frame.

6. The wireless communication terminal of claim 1, wherein the operation based on the BSS color includes entering a doze state of a power save operation based on a BSS color indicated by the signaling field of the PPDU,
wherein the power save operation is an operation for the wireless communication terminal to enter the doze state until an end of a received PPDU which is an Intra-BSS PPDU.

7. The wireless communication terminal of claim 1, wherein the processor is configured not to perform a spatial reuse operation when the BSS color indicated by the signaling field of the PPDU is a predetermined value.

8. The wireless communication terminal of claim 7, wherein the predetermined value is 0.

9. The wireless communication terminal of claim 1, the processor is configured not to perform a spatial reuse operation when the signaling information indicates that the operation based on the BSS color is not allowed.

10. A method of operating a wireless communication terminal communicating wirelessly, the method comprising:
receiving a signaling information from a base wireless communication terminal to which the wireless communication terminal is associated,
receiving a physical layer convergence procedure (PLCP) Protocol Data Unit (PPDU);
not using a Basic Service Set (BSS) color indicated by a signaling field of the PPDU when the signaling information indicates that an operation based on the BSS color is not allowed,
wherein the using the BSS color indicated by the signaling field of the PPDU comprises classifying the PPDU as an inter-BSS PPDU or an intra-BSS PPDU according to the BSS color, and
wherein the BSS color is an identifier of a BSS.

11. The method of claim 10, wherein the method further comprises not setting an Intra-BSS Network Allocation Vector (NAV) by using the BSS color indicated by the signaling field of the PPDU when the signaling information indicates that the operation based on the BSS color is not allowed,
wherein the Intra-BSS NAV is different from a Basic NAV and is a NAV which is set based on an Intra-BSS PPDU,
wherein the Basic NAV is set based on an Inter-BSS PPDU or a PPDU which is not able to be identified as the Inter-BSS PPDU or the Intra-BSS PPDU.

12. The method of claim 11, wherein the PPDU includes a transmission opportunity (TXOP) Duration field in the signaling field of the PPDU,
wherein the TXOP Duration field indicates information used for setting the Intra-BSS NAV and the Basic NAV,
wherein a duration field which is included in a signaling field of a medium access control (MAC) frame indicates information used for setting the Intra-BSS NAV and the Basic NAV,
wherein the method further comprises not using the TXOP Duration field for setting the Intra-BSS NAV or the Basic NAV when the wireless communication terminal determines that the signaling field of the MAC frame is valid.

13. The method of claim 10, wherein the method further comprises signaling that the operation based on the BSS color is not allowed when the wireless communication terminal recognizes that a BSS color collision has occurred,
wherein the BSS color collision represents that different BSSs correspond to one BSS color.

14. The method of claim 13, wherein the signaling that the BSS color collision has occurred comprises determining that BSS color collision has occurred based on address fields of a medium access control (MAC) frame.

15. The method of claim 10, wherein the operation based on the BSS color includes entering a doze state of a power save operation based on a BSS color indicated by the signaling field of the PPDU,
wherein the power save operation is an operation for the wireless communication terminal to enter the doze state until an end of a received PPDU which is an Intra-BSS PPDU.

16. The method of claim 10, wherein the method further comprises not performing a spatial reuse operation when the BSS color indicated by the signaling field of the PPDU is a predetermined value.

17. The method of claim 16, wherein the predetermined value is 0.

18. The method of claim 10, the not using the BSS color indicated by the signaling field of the PPDU comprises not performing a spatial reuse operation when the signaling information indicates that the operation based on the BSS color is not allowed.

* * * * *